United States Patent
Yin et al.

(10) Patent No.: US 9,882,696 B2
(45) Date of Patent: *Jan. 30, 2018

(54) DEVICES FOR SENDING AND RECEIVING FEEDBACK INFORMATION

(71) Applicant: Sharp Kabushiki Kaisha, Osaka-shi, Osaka (JP)

(72) Inventors: Zhanping Yin, Vancouver, WA (US); Shohei Yamada, Camas, WA (US)

(73) Assignee: Sharp Kabushiki Kaisha, Sakai (JP)

( * ) Notice: Subject to any disclaimer, the term of this patent is extended or adjusted under 35 U.S.C. 154(b) by 365 days.

This patent is subject to a terminal disclaimer.

(21) Appl. No.: 14/565,489

(22) Filed: Dec. 10, 2014

(65) Prior Publication Data

US 2015/0092634 A1 Apr. 2, 2015

Related U.S. Application Data

(63) Continuation of application No. 13/474,467, filed on May 17, 2012, now Pat. No. 8,953,635.

(51) Int. Cl.
*H04J 3/16* (2006.01)
*H04L 5/00* (2006.01)
*H04L 1/18* (2006.01)
*H04W 72/04* (2009.01)

(52) U.S. Cl.
CPC .......... *H04L 5/0055* (2013.01); *H04L 1/1812* (2013.01); *H04L 1/1861* (2013.01); *H04L 5/001* (2013.01); *H04W 72/044* (2013.01); *H04W 72/0413* (2013.01)

(58) Field of Classification Search
None
See application file for complete search history.

(56) References Cited

U.S. PATENT DOCUMENTS

2013/0242813 A1* 9/2013 Wang ..................... H04L 5/001
 370/280
2014/0078981 A1* 3/2014 Larsson ................ H04L 1/1607
 370/329

OTHER PUBLICATIONS

U.S. Appl. No. 61/645,476, Larsson, "System and Method for Physical Uplink Control Channel (PUCCH) Signaling for Interband Time Division Duplex (TDD) Carrier Aggregation with Two or More Configured Serving Cells".*

(Continued)

*Primary Examiner* — Kwang B Yao
*Assistant Examiner* — Juvena Loo
(74) *Attorney, Agent, or Firm* — Keating & Bennett, LLP

(57) ABSTRACT

A User Equipment (UE) for sending feedback information is described. The UE includes a processor and instructions stored in memory that is in electronic communication with the processor. The UE determines a primary cell (PCell) feedback parameter corresponding to a PCell. The UE also determines a secondary cell (SCell) feedback parameter corresponding to an SCell. The SCell feedback parameter is different from the PCell feedback parameter. The UE further performs Physical Uplink Control Channel (PUCCH) Format 1b channel selection based on the PCell feedback parameter and the SCell feedback parameter. The UE additionally sends Hybrid Automatic Repeat Request Acknowledgement/Negative Acknowledgement (HARQ-ACK) information based on the channel selection.

4 Claims, 11 Drawing Sheets

(56) References Cited

OTHER PUBLICATIONS

Official Communication issued in corresponding European Patent Application No. 13791279.6, dated Dec. 18, 2015.
Ericsson, "Remaining Issues in General Frame Work for Aggregation of Carriers with Different UL/DL Configurations", 3GPP TSG-RAN WG1 #68, R1-120070, Jan. 31, 2012, 4 pages.
Yin et al., "Devices for Sending and Receiving Feedback Information", U.S. Appl. No. 13/474,467, filed May 17, 2012.
Qualcomm Incorporated, "On enhanced A/N bunding for CA operation", 3GPP TSG RAN WG1 #68, R1-120531, Feb. 6-10, 2012, pp. 1-3.

\* cited by examiner

DEVICES FOR SENDING AND RECEIVING FEEDBACK INFORMATION

TECHNICAL FIELD

The present disclosure relates generally to communication systems. More specifically, the present disclosure relates to devices for sending and receiving feedback information.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
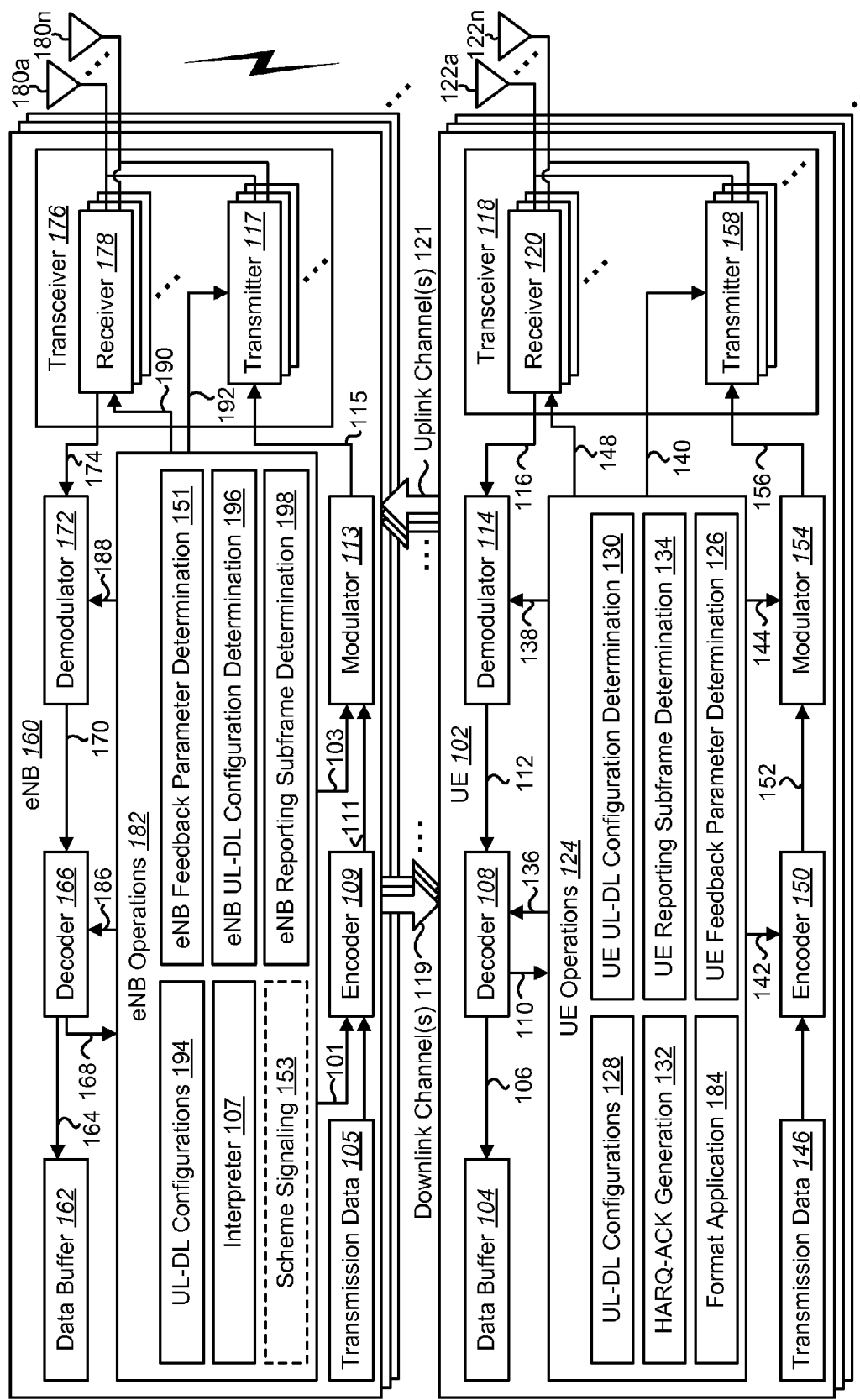
FIG. 1 is a block diagram illustrating one configuration of one or more evolved Node Bs (eNBs) and one or more User Equipments (UEs) in which systems and methods for sending and receiving feedback information may be implemented.

A UE for sending feedback information is described. The UE includes a processor and instructions stored in memory that is in electronic communication with the processor. The UE determines a PCell feedback parameter corresponding to a PCell for an uplink subframe on the PCell. The UE also determines an SCell feedback parameter corresponding to an SCell for the given uplink subframe on the PCell. The SCell feedback parameter may be the same as or different from the PCell feedback parameter in a given uplink subframe on the PCell. The UE further performs Physical Uplink Control Channel (PUCCH) Format 1b channel selection based on the PCell feedback parameter and the SCell feedback parameter. The UE additionally sends Hybrid Automatic Repeat Request Acknowledgement/Negative Acknowledgement (HARQ-ACK) information based on the channel selection. If the PCell feedback parameter or the SCell feedback parameter is 0 in an uplink subframe, performing PUCCH Format 1b channel selection may include performing PUCCH Format 1b channel selection according to methods or techniques and tables for one configured serving cell.

The channel selection may be performed based on a total number of associated subframes between the PCell and the SCell. The channel selection may be performed based on a maximum number of associated subframes between the PCell and the SCell. The channel selection may be performed based on a number of associated subframes of the PCell. Sending the HARQ-ACK information may include sending a first number of SCell HARQ-ACK bits that is the same as or different from a second number of PCell HARQ-ACK bits.

The channel selection may be based on at least one channel selection table. The UE may select a channel selection table based on the PCell feedback parameter and the SCell feedback parameter.

An eNB for receiving feedback information is also described. The eNB includes a processor and instructions stored in memory that is in electronic communication with the processor. The eNB determines a PCell feedback parameter corresponding to a PCell for an uplink subframe on the PCell. The eNB also determines an SCell feedback parameter corresponding to an SCell for the given uplink subframe on the PCell. The SCell feedback parameter may be the same as or different from the PCell feedback parameter. The eNB further performs PUCCH Format 1b channel selection based on the PCell feedback parameter and the SCell feedback parameter. The eNB additionally receives HARQ-ACK information based on the channel selection. If the PCell feedback parameter or the SCell feedback parameter is 0 in an uplink subframe, performing PUCCH Format 1b channel selection may include performing PUCCH Format 1b channel selection according to methods or techniques and tables for one configured serving cell.

The channel selection may be performed based on a total number of associated subframes between the PCell and the SCell. The channel selection may be performed based on a maximum number of associated subframes between the PCell and the SCell. The channel selection may be performed based on a number of associated subframes of the PCell. Sending the HARQ-ACK information may include sending a first number of SCell HARQ-ACK bits that is the same as or different from a second number of PCell HARQ-ACK bits.

The channel selection may be based on at least one channel selection table. The eNB may select a channel selection table based on the PCell feedback parameter and the SCell feedback parameter. The eNB may send at least one of a PCell feedback parameter indicator and an SCell feedback parameter indicator.

A method for sending feedback information by a UE is also described. The method includes determining a PCell feedback parameter corresponding to a PCell. The method also includes determining an SCell feedback parameter corresponding to an SCell. The SCell feedback parameter may be the same as or different from the PCell feedback parameter. The method further includes performing PUCCH Format 1b channel selection based on the PCell feedback parameter and the SCell feedback parameter. The method additionally includes sending HARQ-ACK information based on the channel selection.

A method for receiving feedback information by an eNB is also described. The method includes determining a PCell feedback parameter corresponding to a PCell. The method also includes determining a SCell feedback parameter corresponding to an SCell. The SCell feedback parameter may be the same as or different from the PCell feedback parameter. The method additionally includes performing PUCCH Format 1b channel selection based on the PCell feedback parameter and the SCell feedback parameter. The method further includes receiving HARQ-ACK information based on the channel selection.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a PDSCH. "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe devices for sending and receiving feedback information. This may be done in the context of carrier aggregation. For example, PDSCH HARQ-ACK reporting for carrier aggregation (e.g., inter-band or intra-band carrier aggregation) with different Time-Division Duplexing (TDD) UL-DL configurations is described.

In accordance with the systems and methods disclosed herein, different TDD UL-DL configurations may be used for inter-band carrier aggregation. In other words, the cells or component carriers (CCs) in different bands may have different UL-DL configurations. Carrier aggregation refers to the concurrent utilization of more than one carrier. In one example, carrier aggregation may be used to increase the effective bandwidth available to a UE. One type of carrier aggregation is inter-band carrier aggregation. In inter-band carrier aggregation, multiple carriers from multiple bands may be aggregated. For example, a carrier in a first band may be aggregated with a carrier in a second band. As used herein, the term "concurrent" and variations thereof may denote that at least two events may overlap each other in time, and may or may not mean that the at least two events begin and/or end at precisely the same time. The systems and methods disclosed herein may not be restricted to inter-band carrier aggregation and may also be applied to intra-band carrier aggregation.

As used herein, the term "configuration" may refer to an UL-DL configuration. An UL-DL configuration specifies whether each subframe within a radio frame is an UL subframe, a DL subframe or a special subframe. More detail regarding UL-DL configurations is given in connection with Table (1) below. A "PCell configuration" may refer to an UL-DL configuration that corresponds to a PCell. For example, a PCell configuration is an UL-DL configuration applied by the eNB and UE for communications in the PCell. The PCell configuration may be signaled to a UE by an eNB in a SystemInformationBlockType 1 (SIB-1). The SIB-1 may be transmitted (by an eNB, for example) on a broadcast control channel as a logical channel. An "SCell configuration" may refer to an UL-DL configuration that corresponds to an SCell. For example, an SCell configuration is an UL-DL configuration applied by the eNB and UE for communications in an SCell. An SCell configuration may be signaled to a UE with carrier aggregation by an eNB in dedicated Radio Resource Control (RRC) signaling. The dedicated RRC signaling may be transmitted (by an eNB, for example) on a dedicated control channel as a logical channel.

Additionally or alternatively, an eNB may send the SCell configuration in SIB-1 for UEs using the cell as a PCell. Typically, the eNB sends the same system information parameters between the SIB-1 for UEs using the cell as the PCell and the dedicated RRC signaling for UEs with carrier aggregation, though this is not strictly required. However, the parameters that are cell-specific parameters are signaled to a UE with carrier aggregation via dedicated RRC signaling and may be signaled to UEs using the cell as a PCell may be referred to as an SCell SIB-1 configuration or an SCell configuration.

PDSCH HARQ-ACK may be reported on the uplink of the PCell. The PCell configuration, SCell configuration or a reference configuration may be used for the SCell depending on the combination of the PCell configuration and the SCell configuration. SCell PDSCH HARQ-ACK may be mapped to a PCell UL subframe allocation. An "UL subframe allocation" may refer to one or more subframes that are configured for UL transmissions. For example, a PCell UL subframe allocation may specify one or more UL subframes in accordance with the PCell configuration. A "DL subframe allocation" may refer to one or more subframes that are configured for DL transmissions. For example, a PCell DL subframe allocation may specify one or more DL subframes in accordance with the PCell configuration.

Carrier aggregation may assume that the same eNB scheduler manages communication resources for the PCell and SCell(s). Thus, the scheduler may know the actual configuration of each cell. The UEs may be informed (by an eNB, for example) of the actual UL-DL configuration of each aggregated cell, particularly if a cell has a different UL-DL configuration from the PCell.

Time-Division Duplexing (TDD) Uplink-Downlink (UL-DL) configurations may be referred to as "UL-DL configurations" or a similar term herein for convenience. Additionally, an UL-DL configuration corresponding to a PCell may be referred to as a "PCell configuration" and an UL-DL configuration corresponding to an SCell may be referred to as an "SCell configuration" for convenience herein. Furthermore, "uplink" may be abbreviated as "UL" and "downlink" may be abbreviated as "DL" for convenience herein.

Enhanced carrier aggregation (eCA) may include inter-band or intra-band carrier aggregation (CA) with different UL-DL configurations. For example, the systems and methods disclosed herein may enable inter-band CA with different UL-DL configurations, which may be supported in Rel-11. Furthermore, predetermined PDSCH HARQ-ACK reporting associations may be utilized in accordance with the systems and methods disclosed herein.

In LTE Release-8, 9 and 10 specifications, TDD CA only allows cells with the same UL-DL configuration. Therefore, the same set of parameters is utilized to determine the HARQ-ACK bits of all cells. However, for TDD CA with different UL-DL configurations, different sets of parameters may be utilized for different cells. Thus, new issues arise concerning multiplexing HARQ-ACK bits on different PUCCH formats (e.g., PUCCH Format 3 and PUCCH Format 1a/1b with channel selection).

However, a detailed PUCCH format for PDSCH HARQ-ACK reporting has not been discussed in 3GPP meetings. Reusing Release-10 specifications and adding new extensions may address these issues.

The systems and methods disclosed herein describe multiplexing and reporting HARQ-ACK information (e.g., bit(s)) for CA with different TDD configurations if a UE is configured with PUCCH Format 1b with channel selection. For example, the systems and methods disclosed herein may describe PDSCH HARQ-ACK reporting and multiplexing on PUCCH Format 1b with channel selection for carrier aggregation with different TDD UL-DL configurations. Due to different UL-DL configurations, different parameters may be used for different cells. The systems and methods disclosed herein provide approaches for determining these parameters. In particular, issues and solutions are described for the following cases.

If Format 1b with channel selection is configured on a UE, known specifications support two cells and have some limitations (e.g., the number of subframes M associated with each cell is the same and the PCell always has the same number of more PUCCH resources than the SCell). Format 1b with channel selection can support two cells, a primary cell (PCell) and a secondary cell (SCell). Due to different (TDD) UL-DL configurations, the SCell may have a different M from the PCell in a given uplink subframe. Furthermore, the M from different cells may have different values. The systems and methods disclosed herein provide improved assignment of PUCCH resources and performing channel selection for TDD CA with different UL-DL configurations.

In accordance with the systems and methods disclosed herein, the M of the PCell may be the same as provided in Rel-10 specifications. Furthermore, the systems and methods disclosed herein provide two approaches to determine the M of the SCell. In approach A, the M of the SCell is a reference parameter (e.g., $M_{Ref}$) based on a reference configuration. In approach B, the M of the SCell is an effective parameter (e.g., $M_{Eff}$) based on an effective number of subframes in the reference configuration. Moreover, the systems and methods disclosed herein may categorize possible combinations of the M of the PCell and the M of the SCell into six cases and provide techniques to deal with these cases.

In case I, UL-DL configuration 5 is utilized on the PCell or an SCell or as the reference configuration of the SCell and PUCCH Format 1b with channel selection is not supported (at least in uplink subframe 2, for example). It should be noted that a single-cell reporting mode for other uplinks on the PCell may be implemented in a case where the SCell configuration or SCell reference configuration is UL-DL configuration 5. In case II, the $M_c$ of the PCell and the $M_c$ of the SCell are the same. In case II, Rel-10 approaches may be reused. The single-cell reporting mode means that PUCCH reporting methods or techniques for one configured serving cell, for example, PUCCH format 1a/1b or PUCCH format 1b with channel selection may be performed based on the tables defined in section 10.1.3.1 in 3GPP TS 36.213.

In case III, only the PCell has HARQ-ACK to be reported (e.g., $M_c$ of the PCell>0 and $M_c$ of the SCell=0). In case III, a single cell reporting mode may be enabled or allowed. The single cell reporting mode means that PUCCH reporting methods for one configured serving cell, for example, PUCCH format 1a/1b or PUCCH format 1b with channel selection may be performed based on the tables defined in section 10.1.3.1 in 3GPP TS 36.213. In case IV, only an SCell has HARQ-ACK to be reported (e.g., $M_c$ of the SCell>0 and the $M_c$ of the PCell=0). In case IV, a single cell reporting mode may be enabled or allowed. The introduction of single cell reporting mode for case III and case IV may provide the benefit of better PUCCH resource allocation and better HARQ-ACK channel selection mappings. If the SCell configuration or the SCell reference configuration is configuration 5, single cell PUCCH channel selection reporting may be used in uplink subframes on the PCell except in subframe 2.

In case V, the $M_c$ of the PCell is smaller than the $M_c$ of the SCell. In case VI, the $M_c$ of the PCell is greater than the $M_c$ of the SCell. For case V and case VI, the systems and methods disclosed herein provide four procedures (e.g., procedures 1-4) to handle different M values for the PCell and SCell. In some implementations, case III may be a special case of case VI, and case IV can be a special case of case V. Therefore, the procedures disclosed here for case V and case VI can also be applied for case III and case IV as alternatives to the single cell reporting mode.

In procedure 1, $M_{total}$ is defined as the total number of subframes or total number of HARQ-ACK bits associated with the uplink. For $M_{total}<5$, channel selection tables with A PUCCH resources may be reused, where $A \in \{2, 3, 4\}$. Otherwise, a Rel-10 table with $M=\lceil M_{total}/2 \rceil$ may be reused, allowing multiplexing HARQ-ACK bits from one cell to another cell. Procedure 1 provides the benefit of allowing an M that is a better fit (e.g., best fit) to the actual number of HARQ-ACK bits.

In procedure 2, $M_c$ is defined as the maximum between the $M_c$ of the PCell and the $M_c$ of the SCell. The PUCCH Format 1b with channel selection approach may be applied as special handling of $M_{total}<5$ cases to reuse the channel selection tables with A PUCCH resources, where $A \in \{2, 3, 4\}$.

In procedure 3, the $M_c$ of the PCell (e.g., $M_{PCell}$) may be applied on the SCell, and the Rel-10 channel selection tables may be reused with $M=M_{PCell}$. In this context, case V may be the same as procedure 2. In case VI, where the $M_c$ of the SCell is greater than the $M_c$ of the PCell, the number of HARQ-ACK bits reported for the SCell may be truncated to the same number of HARQ-ACK bits as the PCell. Procedure 2 and procedure 3 may provide a benefit of simple solutions by reusing existing channel selection tables.

In procedure 4, new channel selection tables may be defined for combinations of different $M_c$ values on the PCell and SCell. Procedure 4 may provide improved (e.g., optimized) mapping by adding new channel selection tables.

The systems and methods disclosed herein provide approaches to determine a feedback parameter (e.g., M) value (e.g., a number of subframes associated to an uplink subframe), for the PCell and SCell in case of TDD CA with different UL-DL configurations.

For TDD CA with different UL-DL configurations, PUCCH Format 1b channel selection may be performed based on the combinations of the number of subframes (e.g., PCell feedback parameter and SCell feedback parameter) associated to an uplink subframe for the PCell and SCell. If the number of associated subframes for the PCell or the SCell is 0 in an uplink subframe, single cell PUCCH Format 1b with channel selection techniques and channel selection tables may be applied.

If the number of associated subframes for the PCell and the number of associated subframes for the SCell are different, one or more options may be utilized. In a first option, channel selection may be performed based on a derived number of associated subframes (e.g., M) that is derived from the total number of associated subframes of the PCell and SCell. In some implementations, the channel selection may be performed based on the maximum number of associated subframes between the PCell and SCell. The channel selection may additionally or alternatively be performed based on the number of associated subframes of the PCell, where the SCell reports up to the same number of HARQ-ACK bits as the PCell. In some implementations, new sets of channel selection tables may be defined for combinations of different numbers of subframes for the PCell and the SCell.

eCA may support different TDD UL-DL configurations on different bands. The CA with different UL-DL configurations may also be referred to as inter-band carrier aggregation. For simplicity, an UL-DL configuration of a PCell may be referred to as a PCell configuration. Furthermore, an UL-DL configuration of an SCell may be referred to as an SCell configuration. As used herein, a "conflicting subframe" may be a subframe that has different subframe types (e.g., downlink or special subframes versus uplink subframes) between configurations.

When carrier aggregation is employed in LTE Release 10, HARQ-ACK corresponding to transmitted downlink communications may be transmitted on the PUCCH, according to one of two techniques. In one technique, HARQ-ACK may be transmitted based on Format 1b with "channel selection" or based on Format 3. Some implementations of the systems and methods disclosed herein may utilize Format 1b with channel selection, where carriers being aggregated have different UL-DL configurations.

TDD UL-DL configurations 0-6 are given below in Table (1) (from Table 4.2-2 in 3GPP TS 36.211). UL-DL configurations with both 5 millisecond (ms) and 10 ms downlink-to-uplink switch-point periodicity may be supported. In particular, seven UL-DL configurations are specified in 3GPP specifications, as shown in Table (1) below. In Table (1), "D" denotes a downlink subframe, "S" denotes a special subframe and "U" denotes an UL subframe.

TABLE (1)

| TDD UL-DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The systems and methods disclosed herein may support inter-band carrier aggregation CA of TDD with different UL-DL configurations. In some implementations, PUCCH may be transmitted on the PCell only and no new HARQ-ACK timing table may be utilized beyond those already defined in Rel-8, 9 and 10 specifications. The PCell may utilize the same timing as provided in Rel-8, 9 and 10 specifications, which includes PDSCH HARQ-ACK timing, PUSCH scheduling and PUSCH HARQ-ACK timing.

The PDSCH HARQ-ACK timing issue may be categorized into three cases (cases A, B and C), depending on whether the PCell configuration is a superset of the SCell configuration, a subset of the SCell configuration or neither. In case A, where the set of DL subframes indicated by the SCell configuration is a subset of the DL subframes indicated by the PCell configuration, the SCell may follow the PCell configuration.

PDSCH HARQ-ACK reporting for the case B and case C may be implemented as follows. For the case B, at least in the context of self-scheduling and full duplex communications, where the set of DL subframes indicated by the PCell configuration is a subset of the DL subframes indicated by the SCell configuration, the SCell may follow the SCell configuration. In some implementations, the same rule may be applied in the context of half duplex communications. The systems and methods disclosed herein may present techniques for the cross-carrier scheduling case.

For the case C, at least in the context of self-scheduling and full duplex communications, where the set of DL subframes indicated by the SCell configuration is neither a subset of nor a superset of the DL subframes indicated by the PCell configuration, the SCell may follow a reference configuration as illustrated in Table (2) below. The reference configuration may be selected based on overlapping UL subframes in both the PCell and the SCell. In some implementations, the same rule may be applied in the context of half duplex communications. The systems and methods disclosed herein may present techniques for the cross-carrier scheduling case.

Table (2) below illustrates UL-DL configurations for PDSCH HARQ-ACK reporting. In particular, the columns illustrate PCell (TDD UL-DL) configurations 0-6, while the rows illustrate SCell (TDD UL-DL) configurations 0-6. The grid intersecting the PCell configurations and SCell configurations illustrates an UL-DL configuration with corresponding PDSCH HARQ-ACK timing that the SCell follows based on the case. In Table (2), "A" represents case A described above. In case A, SCell PDSCH HARQ-ACK timing follows the PCell configuration. In Table (2), "B" represents case B as described above. In case B, SCell PDSCH HARQ-ACK timing follows the SCell configuration. In Table (2), "C" represents case C as described above. In case C, SCell PDSCH HARQ-ACK timing follows a reference (TDD UL-DL) configuration indicated by the number that accompanies an instance of "C" in Table (2). In other words, the number in the grid in Table (2) is the reference configuration that SCell PDSCH HARQ-ACK timing follows in instances of case C. For example, when the PCell configuration is UL-DL configuration 3 and the SCell configuration is UL-DL configuration 1, SCell PDSCH HARQ-ACK timing may follow configuration 4.

TABLE (2)

| SCell PDSCH HARQ-ACK Timing Follows | | PCell SIB-1 UL-DL Configuration | | | | | | |
|---|---|---|---|---|---|---|---|---|
| Configuration # | | 0 | 1 | 2 | 3 | 4 | 5 | 6 |
| SCell SIB-1 UL-DL Configuration | 0 | \ | A | A | A | A | A | A |
| | 1 | B | \ | A | C, 4 | A | A | B |
| | 2 | B | B | \ | C, 5 | C, 5 | A | B |
| | 3 | B | C, 4 | C, 5 | \ | A | A | B |
| | 4 | B | B | C, 5 | B | \ | A | B |

TABLE (2)-continued

| SCell PDSCH HARQ-ACK Timing Follows | | PCell SIB-1 UL-DL Configuration | | | | | | |
|---|---|---|---|---|---|---|---|---|
| Configuration # | | 0 | 1 | 2 | 3 | 4 | 5 | 6 |
| | 5 | B | B | B | B | B | \ | B |
| | 6 | B | A | A | A | A | A | \ |

In LTE Rel-10, a UE that supports aggregating more than one serving cell with frame structure type 2 is configured by higher layers. The UE may be configured by higher layers to use HARQ-ACK bundling, to use PUCCH Format 1b with channel selection (according to the set of Tables 10.1.3-2, 3 or 4 or according to the set of Tables 10.1.3-5, 6 or 7 of 3GPP TS 36.213, for example) or to use PUCCH Format 3 for transmission of HARQ-ACK when configured with one serving cell with frame structure type 2. The use of Tables 10.1.3-2, 3 or 4 or the set of Tables 10.1.3-5, 6 or 7 of 3GPP TS 36.213 may be configured by higher layer signaling.

Known PDSCH HARQ-ACK reporting procedures on PUCCH with channel selection are described as follows. PUCCH Format 1b with channel selection is supported for TDD with a single cell or two cells. 3GPP TS 36.213 provides description of these procedures in accordance with the following. For TDD HARQ-ACK multiplexing and a subframe n with M>1, where M is the number of elements in the set K defined in Table 10.1.3.1-1 (from 3GPP TS 36.213, which is illustrated a Table (3) below), spatial HARQ-ACK bundling across multiple codewords within a DL subframe is performed by a logical AND operation of all the corresponding individual HARQ-ACKs. PUCCH Format 1b with channel selection is used in case of one configured serving cell. For TDD HARQ-ACK multiplexing and a subframe n with M=1, spatial HARQ-ACK bundling across multiple codewords within a DL subframe is not performed, 1 or 2 HARQ-ACK bits are transmitted using PUCCH format 1a or PUCCH Format 1b, respectively, for one configured serving cell.

In the case of TDD and more than one configured serving cell with PUCCH Format 1b with channel selection and more than 4 HARQ-ACK bits for M multiple DL subframes associated with a single UL subframe n, where M is the number of elements in the set K defined in Table (3) and for the configured serving cells, spatial HARQ-ACK bundling across multiple codewords within a DL subframe for all configured cells is performed and the bundled HARQ-ACK bits for each configured serving cell is transmitted using PUCCH Format 1b with channel selection. For TDD and more than one configured serving cell with PUCCH Format 1b with channel selection and up to 4 HARQ-ACK bits for M multiple DL subframes associated with a single UL subframe n, where M is the number of elements in the set K defined in Table (3) and for the configured serving cells, spatial HARQ-ACK bundling is not performed and the HARQ-ACK bits are transmitted using PUCCH Format 1b with channel selection.

Further detail regarding PUCCH Format 1b with channel selection for a single configured cell in accordance with known procedures is given as follows. For TDD HARQ-ACK bundling or TDD HARQ-ACK multiplexing for one configured serving cell and a subframe n with M=1, where M is the number of elements in the set K defined in Table (3), the UE shall use PUCCH resource $n_{PUCCH}^{(1,\tilde{p})}$ for transmission of HARQ-ACK in subframe n for $\tilde{p}$ mapped to antenna port p for PUCCH Format 1b.

For TDD HARQ-ACK multiplexing and subframe n with M>1 and one configured serving cell, where M is the number of elements in the set K defined in Table (3), denote $n_{PUCCH,i}^{(1)}$ as the PUCCH resource derived from subframe n−$k_i$ and HARQ-ACK(i) as the Acknowledgement/Negative Acknowledgement/Discontinuous Transmission (ACK/NACK/DTX) response from subframe n−$k_i$, where $k_i \in K$ (defined in Table (3)) and 0≤i≤M−1.

Based on higher layer signaling, a UE configured with a single serving cell will perform channel selection either according to the set of Tables 10.1.3-2, 10.1.3-3, and 10.1.3-4 or according to the set of Tables 10.1.3-5, 10.1.3-6, and 10.1.3-7. For the selected table set indicated by higher layer signaling, the UE shall transmit b(0), b(1) on PUCCH resource $n_{PUCCH}^{(1)}$ in subframe n using PUCCH Format 1b according to section 5.4.1 in 3GPP TS 36.211. The value of b(0), b(1) and the PUCCH resource $n_{PUCCH}^{(1)}$ are generated by channel selection according to the selected set of Tables for M=2, 3, and 4 respectively. PUCCH Format 1b with channel selection according to the set of Tables 10.1.3-2/3/4 or according to the set of Tables 10.1.3-5/6/7 is not supported for TDD UL-DL configuration 5.

Further detail regarding PUCCH Format 1b with channel selection for two configured cells in accordance with known procedures is given as follows. A UE that supports aggregating more than one serving cell with frame structure type 2 is configured by higher layers to use either PUCCH Format 1b with channel selection or PUCCH format 3 for transmission of HARQ-ACK when configured with more than one serving cell with frame structure type 2. TDD UL-DL configuration 5 with PUCCH Format 1b with channel selection for two configured serving cells is not supported.

For TDD HARQ-ACK multiplexing with PUCCH Format 1b with channel selection and two configured serving cells and a subframe n with M=1, where M is the number of elements in the set K defined in Table (3), a UE shall determine the number of HARQ-ACK bits, O, based on the number of configured serving cells and the downlink transmission modes configured for each serving cell. The UE shall use two HARQ-ACK bits for a serving cell configured with a downlink transmission mode that supports up to two transport blocks; and one HARQ-ACK bit otherwise.

For TDD HARQ-ACK multiplexing with PUCCH Format 1b with channel selection and two configured serving cells and a subframe n with M≤2, where M is the number of elements in the set K defined in Table (3), the UE shall transmit b(0), b(1) on PUCCH resource $n_{PUCCH}^{(1)}$ selected from A PUCCH resources, $n_{PUCCH,j}^{(1)}$ where 0≤j≤A−1 and A∈{2, 3, 4}, according to Tables 10.1.3.2-1, 10.1.3.2-2, and 10.1.3.2-3 in subframe n using PUCCH Format 1b.

For a subframe n with M=1, HARQ-ACK(j) denotes the ACK/NACK/DTX response for a transport block or SPS release PDCCH associated with serving cell, where the transport block and serving cell for HARQ-ACK(j) and A PUCCH resources are given by Table 10.1.2.2.1-1. For a subframe n with M=2, HARQ-ACK(j) denotes the ACK/NACK/DTX response for a PDSCH transmission or SPS release PDCCH within subframe(s) given by set K on each serving cell, where the subframes on each serving cell for HARQ-ACK(j) and A PUCCH resources are given by Table 10.1.3.2-4. The UE shall determine the A PUCCH resources, $n_{PUCCH,j}^{(1)}$ associated with HARQ-ACK(j) where 0≤j≤A−1 in Table 10.1.2.2.1-1 for M=1 and Table 10.1.3.2-4 for M=2.

For TDD HARQ-ACK multiplexing with PUCCH Format 1b with channel selection and subframe n with M>2 and two configured serving cells, where M is the number of elements in the set K defined in Table (3), denotes $n_{PUCCH,i}^{(1)}$ 0≤i≤3 as the PUCCH resource derived from the transmissions in M DL subframes associated with the UL subframe n. $n_{PUCCH,0}^{(1)}$ and $n_{PUCCH,1}^{(1)}$ are associated with the PDSCH transmission(s) or a PDCCH indicating downlink semi-persistent scheduling (SPS) release (defined in section 9.2 of 3GPP TS 36.213) on the primary cell and $n_{PUCCH,2}^{(1)}$ and $n_{PUCCH,3}^{(1)}$ are associated with the PDSCH transmission(s) on the secondary cell.

More detail is given hereafter regarding techniques for determining one or more feedback parameters (e.g., M) in CA with different UL-DL configurations (e.g., eCA) in accordance with the systems and methods disclosed herein. In LTE Rel-10 TDD CA, all cells have the same UL-DL configuration. Therefore, when determining the HARQ-ACK reporting, the same parameters are applied to all cells. In eCA, however, TDD with different configurations is supported. Thus, different cells may have different sets of parameters M. Utilizing different sets of parameters M introduces design challenges. Techniques for determining the parameter M in CA with different UL-DL configurations (e.g., eCA) are described as follows.

In LTE Rel-10, M is the number of elements in the set K defined in Table (3) below (from Table 10.1.3.1-1 of 3GPP TS 36.213) associated with subframe n and the set K. In other words, a downlink association set index for TDD may be defined in Table (3) as K: {$k_0, k_1, \ldots, k_{M-1}$}, where M is a number of elements in the set K. The downlink association set depends on the UL-DL configuration, as given in Table (3) below. It should also be noted that PDSCH HARQ-ACK timing may be based on one or more TDD UL-DL configurations in TDD CA with different configurations (as illustrated in Table (2), for example).

A PDSCH HARQ-ACK association means the linkage between a PDSCH transmission and its HARQ-ACK feedback in an uplink subframe. For an uplink subframe n, the downlink association set index for TDD is defined in Table 10.1.3.1-1, which is illustrated as Table (3) below. Thus, a PDSCH transmission in a subframe (n−k) where k belongs to the association set index K: {$k_0, k_1, \ldots, k_{M-1}$}, the corresponding HARQ-ACK of the PDSCH is reported in the associated uplink subframe n. An entry in Table (3) defines a downlink association (e.g., a PDSCH HARQ-ACK association). The set K defines the PDSCH HARQ-ACK association set for a given uplink.

TABLE (3)

| UL-DL Configuration Number | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In eCA, TDD with different configurations is supported. Thus, different cells may have different sets of parameters, such as M. This presents design challenges.

For self scheduling, each cell schedules the PDSCH transmission by the PDCCH or by semi-persistent scheduling (SPS) of the same cell. The PDSCH HARQ-ACK of one or more SCells is reported on the PCell according to the timing reference defined in Table (2).

For eCA with different UL-DL configurations, each cell may have different M values. $M_c$ may be defined as the M for the cell c. In other words, $M_c$ indicates a number of subframes that require PDSCH HARQ-ACK feedback for a cell c in a given uplink subframe. It should be noted, for example, that $M_c$ may depend on the uplink subframe. More specifically, M for a cell (e.g., $M_c$) may be different in different uplink subframes. For the PCell, $M_c$ is the number of elements in the set K defined in Table (3) associated with subframe n and the set K according to the PCell configuration. The set K may include at least one PDSCH HARQ-ACK association k. For an SCell, the PDSCH HARQ-ACK timing may be the same or different from the SCell timing. For an SCell, since the PDSCH HARQ-ACK timing may be the same or different from the SCell timing, the PDSCH HARQ-ACK timing and the SCell timing may be determined differently in some implementations.

In approach A, the $M_c$ of a SCell may be defined as $M_{Ref}$ (e.g., the M of the reference configuration for which the PDSCH HARQ-ACK timing is followed). In other words, $M_{Ref}$ indicates a number of subframes with a PDSCH HARQ-ACK association for a reference configuration. For case A (e.g., if the set of DL subframes indicated by the SCell configuration is a subset of the DL subframes indicated by the PCell configuration) in approach A, the SCell may follow the PCell configuration. Thus, $M_{Ref}=M_{PCell}$ where $M_{PCell}$ is the M of the PCell (e.g., the number of elements in the set K defined in Table (3) associated with subframe n and the set K according to the PCell configuration). In other words, $M_{PCell}$ indicates a number of subframes with a PDSCH HARQ-ACK association for the PCell configuration.

For case B (e.g., if the set of DL subframes indicated by the PCell configuration is a subset of the DL subframes indicated by the SCell configuration) in approach A, the SCell may follow the SCell configuration. Thus, $M_{Ref}=M_{SCell}$ where $M_{SCell}$ is the M of the SCell (e.g., the number of elements in the set K defined in Table (3) associated with subframe n and the set K according to the SCell configuration). In other words, $M_{SCell}$ indicates a number of subframes with a PDSCH HARQ-ACK association for the SCell configuration.

For case C in (e.g., if the set of DL subframes indicated by the PCell configuration is a subset of the DL subframes indicated by the SCell configuration) in approach A, the SCell may follow the reference configuration as shown in Table (2). Thus, $M_{Ref}=M_{RefConf}$ where $M_{RefConf}$ (e.g., a predetermined parameter) is the M of the reference configuration (e.g., the number of elements in the set K defined in Table (3) associated with subframe n and the set K according to the reference UL-DL configuration in Table (2)). In other words, $M_{RefConf}$ indicates a number of subframes with a PDSCH HARQ-ACK association for the reference configuration.

In case A, there are conflicting subframes, where the PCell is configured with a DL subframe (or special subframe, for example) and the SCell is configured with an UL subframe. Thus, the corresponding HARQ-ACK bits will never be generated on the SCell or they may be reported as a discontinuous transmission (DTX). For case A, m may be defined as the number of conflicting subframes, where the PCell configuration includes a DL subframe (or special subframe, for example) and SCell configurations includes an UL subframe in the set K defined in Table (3) associated with subframe n and the set K according to the PCell configuration.

Similarly in case C, there are conflicting subframes, where the reference configuration includes a DL subframe (or special subframe, for example) and the SCell configuration includes an UL subframe. Thus, the corresponding HARQ-ACK bits may never be generated on the SCell or they may be reported as a DTX. For case C, m may be defined as the number of conflicting subframes (where the PCell configuration includes a DL subframe (or special subframe, for example) and the SCell configuration includes an UL subframe) in the set K defined in Table (3) associated with subframe n and the set K according to the reference configuration in Table (2).

In approach B, the $M_c$ of an SCell may be defined as $M_{Eff}$, where $M_{Eff}$ is the effective M of the reference configuration for which the PDSCH HARQ-ACK timing is followed excluding the conflicting subframes, where the PCell configuration or reference configuration includes a DL subframe (or special subframe, for example) and the SCell configuration includes an UL subframe (e.g., $M_{Eff}=M_{Ref}-m$). In other words, $M_{Ref}$ is a number of subframes with PDSCH HARQ-ACK associations for the reference configuration and m is a number of the conflicting subframes that are downlink subframes and special subframes in the reference configuration and uplink subframes in the SCell configuration.

For cross-carrier scheduling, the PDSCH transmission of one cell may be scheduled from another cell with the exception that the PCell may only be scheduled by itself. Several techniques may be utilized to decide the $M_c$ of an SCell in the cross-carrier scheduling context.

In the cross-carrier scheduling context, the same techniques for self scheduling as described above may be applied. This leads to a common design for the PDSCH HARQ-ACK reporting. This may be so, for example, for implementations that support cross-carrier scheduling of a conflicting subframe (e.g., by way of cross-transmission time interval (TTI) or cross-subframe scheduling).

In known techniques, however, cross-carrier PDSCH scheduling only allows the scheduling from another cell in the same TTI. Thus, it may be simpler for an SCell to follow the HARQ-ACK timing of the scheduling cell (e.g., the PCell). Therefore, a cross-carrier scheduled cell may follow the timing of the scheduling cell.

Thus, in another approach, the $M_c$ of the SCell may follow the scheduling cell (e.g., PCell). In one implementation, the $M_c$ of the SCell may be $M_{SchedulingCell}$, where $M_{SchedulingCell}$ is the M of the scheduling cell (where M is the number of elements in the set K defined in Table (3) associated with subframe n and the set K according to the scheduling cell UL-DL configuration). In other words, $M_{SchedulingCell}$ is a number of subframes with a PDSCH HARQ-ACK association for a scheduling cell configuration. In a case where the scheduling cell is not the PCell, the PDSCH reporting reference configuration of the scheduling cell may be used instead of the scheduling cell configuration. In another implementation, the $M_c$ of the SCell may be $M_{Eff\_SchedulingCell}$ where $M_{Eff\_SchedulingCell}$ is the $M_{Eff}$ of the scheduling cell (where $M_{Eff}$ is the effective M of the scheduling cell configuration for which the PDSCH HARQ-ACK timing is followed, excluding the conflicting subframes, for example). In other words, $M_{Eff\_SchedulingCell}$ is a number of subframes with a PDSCH HARQ-ACK association for a scheduling cell configuration excluding conflicting subframes. In this case, a conflicting subframe may be a subframe where the scheduling cell configuration includes a DL subframe (or special subframe, for example) and the SCell configuration includes an UL subframe. In a case where the scheduling cell is not the PCell, the PDSCH reporting reference configuration of the scheduling cell may be used instead of the scheduling cell configuration.

In some implementations a feedback parameter determination scheme (to determine the $M_c$ of the SCell, for example) may be determined by or configured by the eNB. Thus, the eNB and the UE may have the same settings for the $M_c$ of the SCell.

For PDSCH HARQ-ACK reporting on PUCCH Format 1b, if $M_{Ref}$ is configured or selected as the $M_c$ of a SCell, the same M value may be applied based on the reference configuration (e.g., the PCell configuration for case A, SCell configuration for case B, and the reference configuration in Table (2) for case C). Thus, it may be simpler to determine M for the SCell. However, it may include unnecessary bits in the report and may reduce the performance of channel selection.

For PDSCH HARQ-ACK reporting on PUCCH Format 1b, if $M_{Eff}$ is configured or selected as the $M_c$ of a SCell, the M value may be computed based on the reference configuration to eliminate the conflicting subframes (with a DL subframe in the reference configuration and an UL subframe in the SCell configuration). Thus, the M value for the SCell may be different from the M value of the reference configuration. However, a fewer number of bits may be reported, thereby providing a potential performance gain with channel selection.

Some issues associated with CA with different TDD UL-DL configurations are described as follows. In Rel-8, 9 and 10, PUCCH Format 1b with channel selection is supported for TDD HARQ-ACK reporting in Rel-8, 9 and 10 for one configured cell, as described above (regarding PUCCH Format 1b with channel selection for a single configured cell). For M=1, spatial bundling may not be performed if there are two transport blocks in a PDSCH. For M>1, spatial bundling may be performed if there are two transport blocks in a PDSCH.

In Rel-10, channel selection is supported for carrier aggregation of two cells, and all cells have the same TDD configuration. If a UE is configured with Format 1b with channel selection, the PUCCH resources are reserved on both the PCell and the SCell. Up to two resources may be reserved for the PCell and the SCell, and the PCell may have the same number of PUCCH resources as the SCell or one more PUCCH resources than the SCell.

For M=1, spatial bundling may not be performed if there are two transport blocks in a PDSCH. For M>1, spatial bundling may be performed if there are two transport blocks in a PDSCH.

For M≤2, the number of PUCCH resources used for channel selection may be A, where A∈{2, 3, 4}. For a subframe n with M=1, HARQ-ACK(j) denotes the ACK/NACK/DTX response for a transport block or SPS release PDCCH associated with serving cell, where the transport block and serving cell for HARQ-ACK(j) and A PUCCH resources are given by Table 10.1.2.2.1-1.

For a subframe n with M=2, HARQ-ACK(j) denotes the ACK/NACK/DTX response for a PDSCH transmission or SPS release PDCCH within subframe(s) given by set K on each serving cell, where the subframes on each serving cell for HARQ-ACK(j) and A PUCCH resources are given by Table 10.1.3.2-4.

For A=2, one PUCCH Format 1b resource is associated with the PDSCH transmission(s) on the PCell and one PUCCH Format 1b resource is associated with the PDSCH transmission(s) on the SCell. Format 1b with channel selection may be performed according to Table 10.1.3.2-1.

For A=3, two PUCCH Format 1b resources are associated with the PDSCH transmission(s) on the PCell and one PUCCH Format 1b resource is associated with the PDSCH transmission(s) on the SCell. Format 1b with channel selection is performed according to Table 10.1.3.2-2.

For A=4, two PUCCH Format 1b resources are associated with the PDSCH transmission(s) on the PCell and two PUCCH Format 1b resources are associated with the PDSCH transmission(s) on the SCell. Format 1b with channel selection is performed according to Table 10.1.3.2-3.

For M>2, two PUCCH Format 1b resources are associated with the PDSCH transmission(s) on the PCell and two PUCCH Format 1b resources are associated with the PDSCH transmission(s) on the SCell. For M=3, up to 3 bits are reported on each cell. Format 1b with channel selection is performed according to Table 10.1.3.2-5. For M=4, up to 4 bits are reported on each cell. Format 1b with channel selection is performed according to Table 10.1.3.2-6. Any of these PUCCH resources are mapped on the PCell.

For TDD CA with different TDD UL-DL configurations, if PUCCH Format 1b with channel selection is configured, many issues arise due to different parameters on different cells. One of the major issues with different TDD configurations is that the M of different cells may be different in an associated UL subframe. The M of the PCell may be smaller than the M of the SCell, thus less PUCCH resources may be associated to the PCell than the SCell, and vice versa.

The difference between the M of different cells may be greater than 1, thus the PUCCH resources on the PCell and SCell may not be allocated evenly as in Rel-10. In some cases, only the PCell has a PDSCH HARQ-ACK association to an uplink, but no PDSCH-ACK is needed for the SCell (e.g., M=0 for SCell).

If the PCell configuration is UL-DL configuration 0, in subframe 3 and subframe 8, there is no HARQ-ACK to be reported on PCell (e.g., M=0 for the PCell). Thus, only HARQ-ACK bits from the SCell may be reported.

Therefore, in some cases, the Rel-10 resource allocation techniques and channel selection mappings tables may not be used directly for TDD CA with different TDD configurations. Special handling may be needed.

The systems and methods disclosed herein present solutions to the aforementioned issues. As an extension to Rel-10, for TDD CA with different TDD UL-DL configurations, Format 1b with channel selection may be used for two configured cells. Furthermore, Format 1b with channel selection may not be supported if configuration 5 is configured on either the PCell or the SCell, or if configuration 5 is used as the reference configuration for the SCell.

The $M_c$ of the PCell (e.g., $M_{PCell}$) may be the same as in Rel-10 (e.g., the $M_{PCell}$ is the number of elements in the set K defined in Table (3) associated with subframe n and the set K according to the PCell configuration).

In approach A, the $M_c$ of the SCell may be selected as $M_{Ref}$. Thus, the $M_c$ of an SCell may be $M_{PCell}$ in case A, $M_{SCell}$ in case B, and $M_{RefConf}$ in case C in accordance with Table (2).

Table (4) below lists the combinations of the $M_c$ of the PCell and the $M_c$ of the SCell as $M_{Ref}$. The PUCCH Format 1b reports in an uplink may be classified into five cases as follows. In case I, TDD UL-DL Configuration 5 is used on PCell or SCell or as the reference configuration of SCell. In case II, the $M_c$ of the PCell and the $M_c$ of the SCell are the same. In case III, only the PCell has HARQ-ACK to be reported (e.g., the $M_c$ of the PCell>0 and the $M_c$ of the SCell=0). In case IV, only the SCell has HARQ-ACK to be reported (e.g., the $M_c$ of the SCell>0 and the $M_c$ of the PCell=0). In case V, the $M_c$ of the SCell is smaller than the $M_c$ of the SCell.

In approach B, the $M_c$ of the SCell may be selected as $M_{Eff}$ (e.g., the effective M of the reference configuration for the SCell excluding the conflicting subframes (where the reference configuration is configured with a DL subframe (or special subframe) and the SCell is configured with an UL subframe. The reference configuration is defined in Table (2) (e.g., the reference configuration is the PCell configuration in case A, the SCell configuration in case B, and the reference configuration indicated in Table (2) in case C).

In approach B, Table (5) below lists the combinations of the $M_c$ of the PCell and the $M_c$ of the SCell as $M_{Eff}$.

Approach B eliminates the HARQ-ACK bits for conflicting subframes (where the reference configuration is configured with a DL subframe (or special subframe) and the SCell is configured with an UL subframe). Thus, it is beneficial to reduce the required HARQ-ACK bits for PUCCH reporting, and may potentially enhance the HARQ-ACK report performance. The PUCCH Format 1b reports may be classified into six cases. Compared with approach A, there is another case VI, where the $M_c$ of the PCell is greater than the $M_c$ of the SCell. In case VI, the $M_c$ of the PCell is greater than the $M_c$ of the SCell. In some implementations, all cases in approach A may be included in approach B and case VI.

Tables (4A) and (4B) below illustrate combinations of the $M_c$ of the PCell and the $M_c$ of the SCell as $M_{Ref}$. Tables (4A) and (4B) may be collectively referred to as Table (4). In Tables (4) and (5), roman numerals (e.g., I-VI) may denote cases I-VI, respectively.

TABLE (4A)

| PCell | SCell | SCell Ref. | Subframe 2 $M_{PCell}$ | $M_{SCell}$ | Subframe 3 $M_{PCell}$ | $M_{SCell}$ | Subframe 4 $M_{PCell}$ | $M_{SCell}$ |
|---|---|---|---|---|---|---|---|---|
| 0 | 1 | 1 | V, 1 | V, 2 | IV, 0 | IV, 1 | III, 1 | III, 0 |
| 0 | 2 | 2 | V, 1 | V, 4 | | | III, 1 | III, 0 |
| 0 | 3 | 3 | V, 1 | V, 3 | IV, 0 | IV, 2 | V, 1 | V, 2 |
| 0 | 4 | 4 | V, 1 | V, 4 | IV, 0 | IV, 4 | III, 1 | III, 0 |
| 0 | 5 | 5 | I, 1 | I, 9 | | | I, 1 (or III, 1) | I, 0 (or III, 0) |
| 0 | 6 | 6 | II, 1 | II, 1 | IV, 0 | IV, 1 | II, 1 | II, 1 |
| 1 | 0 | 1 | II, 2 | II, 2 | II, 1 | II, 1 | | |
| 1 | 2 | 2 | V, 2 | V, 4 | III, 1 | III, 0 | | |
| 1 | 3 | 4 | V, 2 | V, 4 | V, 1 | V, 4 | | |
| 1 | 4 | 4 | V, 2 | V, 4 | V, 1 | V, 4 | | |
| 1 | 5 | 5 | I, 2 | I, 9 | I, 1 (or III, 1) | I, 0 (or III, 0) | | |
| 1 | 6 | 1 | II, 2 | II, 2 | II, 1 | II, 1 | | |
| 2 | 0 | 2 | II, 4 | II, 4 | | | | |
| 2 | 1 | 2 | II, 4 | II, 4 | | | | |
| 2 | 3 | 5 | I, 4 | I, 9 | | | | |
| 2 | 4 | 5 | I, 4 | I, 9 | | | | |
| 2 | 5 | 5 | I, 4 | I, 9 | | | | |
| 2 | 6 | 2 | II, 4 | II, 4 | | | | |
| 3 | 0 | 3 | II, 3 | II, 3 | II, 2 | II, 2 | II, 2 | II, 2 |
| 3 | 1 | 4 | V, 3 | V, 4 | V, 2 | V, 4 | III, 2 | III, 0 |
| 3 | 2 | 5 | I, 3 | I, 9 | I, 2 (or III, 2) | I, 0 (or III, 0) | I, 2 (or III, 2) | I, 0 or (III, 0) |
| 3 | 4 | 4 | V, 3 | V, 4 | V, 2 | V, 4 | III, 2 | III, 0 |
| 3 | 5 | 5 | I, 3 | I, 9 | I, 2 (or III, 2) | I, 0 or (III, 0) | I, 2 (or III, 2) | I, 0 or (III, 0) |
| 3 | 6 | 3 | II, 3 | II, 3 | II, 2 | II, 2 | II, 2 | II, 2 |
| 4 | 0 | 4 | II, 4 | II, 4 | II, 4 | II, 4 | | |
| 4 | 1 | 4 | II, 4 | II, 4 | II, 4 | II, 4 | | |
| 4 | 2 | 5 | I, 4 | I, 9 | I, 4 | I, 0 or (III, 0) | | |
| 4 | 3 | 4 | II, 4 | II, 4 | II, 4 | II, 4 | | |
| 4 | 5 | 5 | I, 4 | I, 9 | I, 4 | I, 0 or (III, 0) | | |
| 4 | 6 | 4 | II, 4 | II, 4 | II, 4 | II, 4 | | |
| 5 | 0 | 5 | I, 9 | I, 9 | | | | |
| 5 | 1 | 5 | I, 9 | I, 9 | | | | |
| 5 | 2 | 5 | I, 9 | I, 9 | | | | |
| 5 | 3 | 5 | I, 9 | I, 9 | | | | |
| 5 | 4 | 5 | I, 9 | I, 9 | | | | |
| 5 | 6 | 5 | I, 9 | I, 9 | | | | |
| 6 | 0 | 6 | II, 1 | II, 1 | II, 1 | II, 1 | II, 1 | II, 1 |
| 6 | 1 | 1 | V, 1 | V, 2 | II, 1 | II, 1 | III, 1 | III, 0 |
| 6 | 2 | 2 | V, 1 | V, 4 | III, 1 | III, 0 | V, 1 | V, 4 |
| 6 | 3 | 3 | V, 1 | V, 3 | V, 1 | V, 2 | V, 1 | V, 2 |

TABLE (4A)-continued

| PCell | SCell | Ref. | SCell Subframe 2 $M_{PCell}$ | $M_{SCell}$ | Subframe 3 $M_{PCell}$ | $M_{SCell}$ | Subframe 4 $M_{PCell}$ | $M_{SCell}$ |
|---|---|---|---|---|---|---|---|---|
| 6 | 4 | 4 | V, 1 | V, 4 | V, 1 | V, 4 | III, 1 | III, 0 |
| 6 | 5 | 5 | I, 1 | I, 9 | I, 1 (or III, 1) | I, 0 (or III, 0) | I, 1 (or III, 1) | I, 0 (or III, 0) |

Case I - Channel selection not supported
Case II - $M_{PCell} = M_{Ref}$, reuse Rel-10 techniques
Case III - HARQ-ACK on PCell only
Case IV - HARQ-ACK on SCell only
Case V - M of PCell < M of SCell

TABLE (4B)

| PCell | SCell | Ref. | SCell Subframe 7 $M_{PCell}$ | $M_{SCell}$ | Subframe 8 $M_{PCell}$ | $M_{SCell}$ | Subframe 9 $M_{PCell}$ | $M_{SCell}$ |
|---|---|---|---|---|---|---|---|---|
| 0 | 1 | 1 | V, 1 | V, 2 | IV, 0 | IV, 1 | III, 1 | III, 0 |
| 0 | 2 | 2 | V, 1 | V, 4 | | | III, 1 | III, 0 |
| 0 | 3 | 3 | III, 1 | III, 0 | | | III, 1 | III, 0 |
| 0 | 4 | 4 | III, 1 | III, 0 | | | III, 1 | III, 0 |
| 0 | 5 | 5 | I, 1 (or III, 0) | I, 0 (or III, 0) | | | I, 1 (or III, 0) | I, 0 (or III, 0) |
| 0 | 6 | 6 | II, 1 | II, 1 | IV, 0 | IV, 1 | III, 1 | III, 0 |
| 1 | 0 | 1 | II, 2 | II, 2 | II, 1 | II, 1 | | |
| 1 | 2 | 2 | V, 2 | V, 4 | III, 1 | III, 0 | | |
| 1 | 3 | 4 | III, 2 | III, 0 | III, 1 | III, 0 | | |
| 1 | 4 | 4 | III, 2 | III, 0 | III, 1 | III, 0 | | |
| 1 | 5 | 5 | I, 2 (or III, 2) | I, 0 (or III, 0) | I, 1 (or III, 1) | I, 0 (or III, 0) | | |
| 1 | 6 | 1 | II, 2 | II, 2 | II, 1 | II, 1 | | |
| 2 | 0 | 2 | II, 4 | II, 4 | | | | |
| 2 | 1 | 2 | II, 4 | II, 4 | | | | |
| 2 | 3 | 5 | I, 4 (or III, 4) | I, 0 (or III, 0) | | | | |
| 2 | 4 | 5 | I, 4 (or III, 4) | I, 0 (or III, 0) | | | | |
| 2 | 5 | 5 | I, 4 (or III, 4) | I, 0 (or III, 0) | | | | |
| 2 | 6 | 2 | II, 4 | II, 4 | | | | |
| 3 | 0 | 3 | | | | | | |
| 3 | 1 | 4 | | | | | | |
| 3 | 2 | 5 | | | | | | |
| 3 | 4 | 4 | | | | | | |
| 3 | 5 | 5 | | | | | | |
| 3 | 6 | 3 | | | | | | |
| 4 | 0 | 4 | | | | | | |
| 4 | 1 | 4 | | | | | | |
| 4 | 2 | 5 | | | | | | |
| 4 | 3 | 4 | | | | | | |
| 4 | 5 | 5 | | | | | | |
| 4 | 6 | 4 | | | | | | |
| 5 | 0 | 5 | | | | | | |
| 5 | 1 | 5 | | | | | | |
| 5 | 2 | 5 | | | | | | |
| 5 | 3 | 5 | | | | | | |
| 5 | 4 | 5 | | | | | | |
| 5 | 6 | 5 | | | | | | |
| 6 | 0 | 6 | II, 1 | II, 1 | II, 1 | II, 1 | | |
| 6 | 1 | 1 | V, 1 | V, 2 | II, 1 | II, 1 | | |
| 6 | 2 | 2 | III, 1 | III, 0 | III, 1 | III, 0 | | |
| 6 | 3 | 3 | III, 1 | III, 0 | III, 1 | III, 0 | | |
| 6 | 4 | 4 | III, 1 | III, 0 | III, 1 | III, 0 | | |

TABLE (4B)-continued

| PCell | SCell | Ref. | SCell Subframe 7 $M_{PCell}$ | $M_{SCell}$ | Subframe 8 $M_{PCell}$ | $M_{SCell}$ | Subframe 9 $M_{PCell}$ | $M_{SCell}$ |
|---|---|---|---|---|---|---|---|---|
| I, 6 | I, 5 | I, 5 | I, 1 (or III, 1) | I, 0 (or III, 0) | I, 1 (or III, 1) | I, 0 (or III, 0) | | |

Case I - Channel selection not supported
Case II - $M_{PCell} = M_{Ref}$, reuse Rel-10 methods
Case III - HARQ-ACK on PCell only
Case IV - HARQ-ACK on SCell only
Case V - M of PCell < M of SCell Tables (5A) and (5B) below illustrate combinations of the $M_c$ of the PCell and the $M_c$ of the SCell as $M_{Eff}$. Tables (5A) and (5B) may be collectively referred to as Table (5).

TABLE (5A)

| PCell | SCell | Ref. | SCell Subframe 2 $M_{PCell}$ | $M_{SCell}$ | Subframe 3 $M_{PCell}$ | $M_{SCell}$ | Subframe 4 $M_{PCell}$ | $M_{SCell}$ |
|---|---|---|---|---|---|---|---|---|
| 0 | 1 | 1 | V, 1 | V, 2 | IV, 0 | IV, 1 | III, 1 | III, 0 |
| 0 | 2 | 2 | V, 1 | V, 4 | | | III, 1 | III, 0 |
| 0 | 3 | 3 | V, 1 | V, 3 | IV, 0 | IV, 2 | V, 1 | V, 2 |
| 0 | 4 | 4 | V, 1 | V, 4 | IV, 0 | IV, 4 | III, 1 | III, 0 |
| 0 | 5 | 5 | I, 1 | I, 9 | | | I, 1 (or III, 1) | I, 0 (or III, 0) |
| 0 | 6 | 6 | II, 1 | II, 1 | IV, 0 | IV, 1 | II, 1 | II, 1 |
| 1 | 0* | 1* | II, 2 | II, 2 | III, 1 | III, 0 | | |
| 1 | 2 | 2 | V, 2 | V, 4 | III, 1 | III, 0 | | |
| 1 | 3* | 4* | V, 2 | V, 3 | V, 1 | V, 4 | | |
| 1 | 4 | 4 | V, 2 | V, 4 | V, 1 | V, 4 | | |
| 1 | 5 | 5 | I, 2 | I, 9 | I, 1 (or III, 0) | I, 0 (or III, 0) | | |
| 1 | 6* | 1* | II, 2 | II, 2 | II, 1 | II, 1 | | |
| 2 | 0* | 2* | VI, 4 | VI, 2 | | | | |
| 2 | 1* | 2* | VI, 4 | VI, 3 | | | | |
| 2 | 3* | 5* | I, 4 | I, 7 | | | | |
| 2 | 4* | 5* | I, 4 | I, 8 | | | | |
| 2 | 5 | 5 | I, 4 | I, 9 | | | | |
| 2 | 6* | 2* | VI, 4 | VI, 2 | | | | |
| 3* | 0* | 3* | II, 3 | II, 3 | III, 2 | III, 0 | VI, 2 | VI, 1 |
| 3 | 1* | 4* | V, 3 | V, 4 | II, 2 | II, 2 | III, 2 | III, 0 |
| 3 | 2* | 5* | I, 3 | I, 8 | I, 2 (or III, 2) | I, 0 (or III, 0) | I, 2 (or III, 2) | I, 0 (or III, 0) |
| 3 | 4 | 4 | V, 3 | V, 4 | V, 2 | V, 4 | III, 2 | III, 0 |
| 3 | 5 | 5 | I, 3 | I, 9 | I, 2 (or III, 2) | I, 0 (or III, 0) | I, 2 (or III, 2) | I, 0 (or III, 0) |
| 3 | 6* | 3* | II, 3 | II, 3 | III, 2 | III, 0 | II, 2 | II, 2 |
| 4 | 0* | 4* | VI, 4 | VI, 3 | VI, 4 | VI, 1 | | |
| 4 | 1* | 4* | II, 4 | II, 4 | VI, 4 | VI, 2 | | |
| 4 | 2* | 5* | I, 4 | I, 8 | I, 4 (or III, 4) | I, 0 (or III, 0) | | |
| 4 | 3* | 4* | VI, 4 | VI, 3 | II, 4 | II, 4 | | |

TABLE (5A)-continued

| PCell | SCell | Ref. | Subframe 2 M_PCell | Subframe 2 M_SCell | Subframe 3 M_PCell | Subframe 3 M_SCell | Subframe 4 M_PCell | Subframe 4 M_SCell |
|---|---|---|---|---|---|---|---|---|
| 4 | 5 | 5 | I, 4 | I, 9 | I, 4 (or III, 4) | I, 0 (or III, 0) | | |
| 4 | 6* | 4* | VI, 4 | VI, 3 | VI, 4 | VI, 2 | | |
| 5 | 0* | 5* | I, 9 | I, 4 | | | | |
| 5 | 1* | 5* | I, 9 | I, 6 | | | | |
| 5 | 2* | 5* | I, 9 | I, 8 | | | | |
| 5 | 3* | 5* | I, 9 | I, 7 | | | | |
| 5 | 4* | 5* | I, 9 | I, 8 | | | | |
| 5 | 6* | 5* | I, 9 | I, 5 | | | | |
| 6 | 0* | 6* | II, 1 | II, 1 | II, 1 | II, 1 | III, 1 | III, 0 |
| 6 | 1 | 1 | V, 1 | V, 2 | II, 1 | II, 1 | III, 1 | III, 0 |
| 6 | 2 | 2 | V, 1 | V, 4 | III, 1 | III | V, 1 | V, 4 |
| 6 | 3 | 3 | V, 1 | V, 3 | V, 1 | V, 2 | V, 1 | V, 2 |
| 6 | 4 | 4 | V, 1 | V, 4 | V, 1 | V, 4 | III, 1 | III, 0 |
| 6 | 5 | 5 | I, 1 | I, 9 | I, 1 (or III, 1) | I, 0 (or III, 0) | I, 1 (or III, 1) | I, 0 (or III, 0) |

Case I - Channel selection not supported
Case II - $M_{PCell} = M_{Eff}$ of SCell, reuse Rel-10 techniques
Case III - HARQ-ACK on PCell only
Case IV - HARQ-ACK on SCell only
Case V - M of PCell < M of SCell
Case VI - M of PCell > M of SCell
0/1/2/3/4/5/6/7/8- $M_{Eff}$ that is different from $M_{Ref}$
*Reference configuration different from SCell, thus $M_{Eff}$ may be different from $M_{Ref}$

TABLE (5B)

| PCell | SCell | Ref. | Subframe 7 M_PCell | Subframe 7 M_SCell | Subframe 8 M_PCell | Subframe 8 M_SCell | Subframe 9 M_PCell | Subframe 9 M_SCell |
|---|---|---|---|---|---|---|---|---|
| 0 | 1 | 1 | V, 1 | V, 2 | IV, 0 | IV, 1 | III, 1 | III, 0 |
| 0 | 2 | 2 | V, 1 | V, 4 | | | III, 1 | III, 0 |
| 0 | 3 | 3 | III, 1 | III, 0 | | | III, 1 | III, 0 |
| 0 | 4 | 4 | III, 1 | III, 0 | | | III, 1 | III, 0 |
| 0 | 5 | 5 | I, 1 (or III, 1) | I, 0 (or III, 0) | | | I, 1 (or III, 1) | I, 0 (or III, 0) |
| 0 | 6 | 6 | II, 1 | II, 1 | IV, 0 | IV, 1 | III, 1 | III, 0 |
| 1 | 0* | 1* | II, 2 | II, 2 | II, 1 | III, 0 | | |
| 1 | 2 | 2 | V, 2 | V, 4 | III, 1 | III, 0 | | |
| 1 | 3* | 4* | III, 2 | III, 0 | III, 1 | III, 0 | | |
| 1 | 4 | 4 | III, 2 | III, 0 | III, 1 | III, 0 | | |
| 1 | 5 | 5 | I, 2 (or III, 2) | I, 0 (or III, 0) | I, 1 (or III, 1) | I, 0 (or III, 0) | | |
| 1 | 6* | 1* | II, 2 | II, 2 | III, 1 | III, 0 | | |
| 2 | 0* | 2* | VI, 4 | VI, 2 | | | | |
| 2 | 1* | 2* | VI, 4 | VI, 3 | | | | |
| 2 | 3* | 5* | I, 4 (or III, 4) | I, 0 (or III, 0) | | | | |
| 2 | 4* | 5* | I, 4 (or III, 4) | I, 0 (or III, 0) | | | | |
| 2 | 5 | 5 | I, 4 (or III, 4) | I, 0 (or III, 0) | | | | |
| 2 | 6* | 2* | VI, 4 | VI, 3 | | | | |
| 3 | 0* | 3* | | | | | | |
| 3 | 1* | 4* | | | | | | |
| 3 | 2* | 5* | | | | | | |
| 3 | 4 | 4 | | | | | | |
| 3 | 5 | 5 | | | | | | |
| 3 | 6* | 3* | | | | | | |
| 4 | 0* | 4* | | | | | | |
| 4 | 1* | 4* | | | | | | |
| 4 | 2* | 5* | | | | | | |
| 4 | 3* | 4* | | | | | | |
| 4 | 5 | 5 | | | | | | |
| 4 | 6* | 4* | | | | | | |

TABLE (5B)-continued

| PCell | SCell | Ref. | Subframe 7 M_PCell | Subframe 7 M_SCell | Subframe 8 M_PCell | Subframe 8 M_SCell | Subframe 9 M_PCell | Subframe 9 M_SCell |
|---|---|---|---|---|---|---|---|---|
| 5 | 0* | 5* | | | | | | |
| 5 | 1* | 5* | | | | | | |
| 5 | 2* | 5* | | | | | | |
| 5 | 3* | 5* | | | | | | |
| 5 | 4* | 5* | | | | | | |
| 5 | 6* | 5* | | | | | | |
| 6 | 0* | 6* | II, 1 | II, 1 | II, 1 | II, 1 | | |
| 6 | 1 | 1 | V, 1 | V, 2 | II, 1 | II, 1 | | |
| 6 | 2 | 2 | III, 1 | III, 0 | III, 1 | III, 0 | | |
| 6 | 3 | 3 | III, 1 | III, 0 | III, 1 | III, 0 | | |
| 6 | 4 | 4 | III, 1 | III, 0 | III, 1 | III, 0 | | |
| 6 | 5 | 5 | I, 1 (or III, 1) | I, 0 (or III, 0) | I, 1 (or III, 1) | I, 0 (or III, 0) | | |

Case I - Channel selection not supported
Case II - $M_{PCell} = M_{Ref}$, reuse Rel-10 methods
Case III - HARQ-ACK on PCell only
Case IV - HARQ-ACK on SCell only
Case V - M of PCell < M of SCell
Case VI - M of PCell > M of SCell
0/1/2/3/4/5/6/7/8- $M_{Eff}$ that is different from $M_{Ref}$
*Reference configuration different from SCell, thus $M_{Eff}$ may be different from $M_{Ref}$ Procedures for each of the cases listed above are described as follows. In case I, if TDD UL-DL configuration 5 is the reference configuration of the SCell, PUCCH Format 1b with channel selection is not supported. Case I may include when TDD UL-DL configuration 5 is configured on the PCell or the SCell and when TDD UL-DL configuration 5 is the reference configuration in case C in Table (2). This may be an extension of Rel-10. In some implementations, if the SCell configuration or the SCell reference configuration is configuration 5, single cell PUCCH channel selection reporting may be used in uplink subframes on the PCell, except in subframe 2, which is the same as in case III below. Therefore, in Table (4) and Table (5), case III is included in brackets besides case I in this scenario. If the SCell configuration or the SCell reference configuration is configuration 5 and only two cells are configured for carrier aggregation, the single-cell PUCCH Format 1b with channel selection technique may be used in uplink subframes, except subframe 2, because the PDSCH may only be detected on the PCell.

In case II, if the $M_c$ of the PCell and the $M_c$ of the SCell are the same in an uplink subframe, the PUCCH Format 1b with channel selection techniques of Rel-10 may be reused. It should be noted that for case II, the SCell reference configuration may or may not be the same as the PCell TDD UL-DL configuration. Especially, with approach A, all uplink subframes will correspond to case II if the SCell reference configuration is the same as PCell UL-DL configuration. For instance, with approach B, the M of the SCell may be different because SCell UL may be removed from the association set.

With approach A, in some PCell and SCell combinations, there may be conflicting subframes where the reference configuration is configured with a DL subframe (or special subframe) and the SCell configuration is configured with an UL subframe. Thus, the corresponding HARQ-ACK bits may never be generated on the SCell, or they may always be reported as DTX.

In case III, only the PCell needs to report HARQ-ACK information in an uplink (e.g., the $M_c$ of the PCell is greater than 0, and the $M_c$ of the SCell is 0 or there is no PDSCH HARQ-ACK association for the SCell in the given uplink).

The possible values $M_c$ of the PCell are $M_{PCell}=1$ or $M_{PCell}=2$ in case III as illustrated in Table (4) and Table (5). It should be noted that with approach B, uplink reporting may correspond to case III even if the PCell configuration is used as the reference configuration for the SCell (e.g., in subframe 3 and subframe 8 when the PCell is configured with TDD UL-DL configuration 1 and the SCell is configured with TDD UL-DL configuration 0). For instance, by removing the ULs in the SCell association set, the M of SCell may be different from the M of the PCell.

In Rel-10, both the PCell and the SCell have the same M value. Therefore, case III is not supported in current Rel-10 specifications. There are two procedures (denoted procedure III.1 and III.2 for convenience) to solve this issue in accordance with the systems and methods disclosed herein.

In procedure III.1, a single cell reporting procedure is applied for case III UL reports in TDD CA with different TDD UL-DL configurations. In Rel-10, since the M of both the PCell and the SCell are the same, Format 1b with channel selection is used even if no PDSCH is detected on the SCell. Thus, channel selection is always performed based on two configured cells. Up to two PUCCH resources can be allocated for both the PCell and the SCell. With procedure 1, no PUCCH resource needs to be allocated for the SCell, and all PUCCH resources may be dynamically allocated or configured by higher layer signaling for the PCell. Resource allocation and mapping tables may follow the one configured serving cell case in Section 10.1.3.1 of 3GPP TS 36.213. For case III UL reports in TDD CA with different TDD UL-DL configurations and $M_{PCell}=1$, PUCCH format 1a/1b is used on a single PUCCH resource and no channel selection is needed. For case III, UL reports in TDD CA with different TDD UL-DL configurations and $M_{PCell}=2$ based on higher layer signaling, a UE may be configured with channel selection either according to the set of Tables 10.1.3-2 or according to the set of Tables 10.1.3-5.

The benefits of procedure III.1 are the reduced number of PUCCH resources allocated and more accurate HARQ-ACK mapping in the channel selection tables. No PUCCH resources are needed for the SCell. Only one PUCCH Format 1a/1b resource is allocated for the PCell for $M_{PCell}=1$. The UE may allocate two PUCCH Format 1b resources for $M_{PCell}=2$. Spatial HARQ-ACK bundling across multiple codewords within a DL subframe may be performed based on a logical AND operation of all the corresponding individual HARQ-ACKs if a PDSCH has two codewords.

In procedure III.2, if the $M_c$ of the SCell is set with $M_{PCell}$ (e.g., the $M_c$ of the PCell), then PUCCH Format 1b with channel selection procedure may be reused for the more than one cell case in Rel-10 with $M=M_{PCell}$. With procedure III.2, the HARQ-ACK bits corresponding to the SCell may be reported as DTX. The benefit of procedure 2 is to reuse the channel selection tables for more than one configured serving cell (e.g., the sets of channel selection tables for a single configured cell are not used for TDD CA). For M=1, if the PDSCH on the PCell has one codeword, Table 10.1.3.2-1 for A=2 may be used. For M=1, if the PDSCH on the PCell has two codewords, Table 10.1.3.2-2 for A=3 or Table 10.1.3.2-3 for A=4 may be used. For M=2, Table 10.1.3.2-3 for A=4 may be used.

The disadvantages of procedure III.2 are the waste of resource assignment on the SCell and the poor HARQ-ACK bit mapping in the sets of channel selection tables. Even if PUCCH channel resources are configured for the SCell following the rules in 10.1.3.2 in 3GPP TS 36.213, they may not be used to carry the PUCCH feedback due to the mapping table design characteristics. Furthermore, since all SCell HARQ-ACK bits are set with DTX, the actual HARQ-ACK bits of the channel selection are reduced.

In case IV, only the SCell needs to report HARQ-ACK information in an uplink, (e.g., the $M_c$ of the SCell is greater than 0, and the $M_c$ of the PCell is 0 or there is no PDSCH HARQ-ACK association for the PCell in the given uplink). Case IV only happens in subframe 3 and subframe 8 when the PCell is configured with TDD UL-DL configuration 0. In case IV, the possible $M_c$ of the SCell may be 1, 2, and 4 as shown in Table (4) and Table (5).

In Rel-10, both the PCell and the SCell have the same M value. Therefore, case IV is not supported in current Rel-10 specifications. Similar to case III, there are two procedures (denoted procedure IV.1 and IV.2 for convenience) to solve this issue in accordance with the systems and methods disclosed herein.

In procedure IV.1, a single cell reporting procedure is applied for case IV UL reports in TDD CA with different TDD UL-DL configurations. In Rel-10, since the M of both the PCell and the SCell are the same, Format 1b with channel selection is used even if no PDSCH is detected on the PCell. Thus, channel selection is always performed based on two configured cells. Up to two PUCCH resources can be allocated for both the PCell and the SCell. With procedure IV.1, no PUCCH resource needs to be assigned for the PCell. Furthermore, more than two PUCCH resources may be needed on the SCell (e.g., four PUCCH resources may be needed to support M=4 on the SCell). With procedure IV.1, the PUCCH resources for the SCell may be dynamically allocated or configured by higher layer signaling.

For a PDSCH transmission indicated by the detection of a corresponding PDCCH on the secondary cell within the subframe(s) n−k, where k∈K of the reference configuration of the SCell determined based on Table (2), (e.g., PDSCH is self scheduled on the SCell), no dynamic or implicit PUCCH assignment is possible and all PUCCH resources may be configured by higher layer signaling.

For a PDSCH transmission indicated by the detection of a corresponding PDCCH on the primary cell within the subframe(s) n−k, where k∈K of the reference configuration of the secondary cell is determined based on Table (2), (e.g., the PDSCH on the SCell is cross-carrier scheduled by the PCell), the PUCCH resource can be dynamically and implicitly allocated. For example, the PUCCH resource $n_{PUCCH,i}^{(1)}=(M-i-1)\cdot N_c+i\cdot N_{c+1}+n_{CCE,i}+N_{PUCCH}^{(1)}$, where c is selected from $\{0, 1, 2, 3\}$ such that $N_c \leq n_{CCE,i} < N_{c+1}$, $N_c=\max\{0, \lfloor [B_R^{DL} \cdot (N_{sc}^{RB} \cdot c-4)]/36 \rfloor\}$, where $n_{CCE,i}$ is the number of the first Control Channel Element (CCE) used for transmission of the corresponding PDCCH in subframe n−k$_i$ and $N_{PUCCH}^{(1)}$ is configured by higher layers.

With procedure IV.1, the channel selection mapping tables may follow the one configured serving cell case in Section 10.1.3.1 of 3GPP TS 36.213. For case IV UL reports in TDD CA with different TDD UL-DL configurations and when the $M_c$ of the SCell is 1, only one PUCCH Format 1a/1b resource may be used, and no channel selection is performed. Format 1a may be used if there is only one codeword in the PDSCH transmission. Format 1b may be used if there are two codewords blocks in the PDSCH transmission.

For case IV UL reports in TDD CA with different TDD UL-DL configurations and when the $M_c$ of the SCell greater than 1, based on higher layer signaling, a UE may be configured with channel selection either according to the set of Tables 10.1.3-2, 10.1.3-3, and 10.1.3-4 or according to the set of Tables 10.1.3-5, 10.1.3-6, and 10.1.3-7.

The benefits of procedure IV.1 are the reduced number of PUCCH resources allocated and more accurate HARQ-ACK mapping in the channel selection tables. No PUCCH resources are needed for the PCell. One PUCCH format 1a/1b resource may be allocated for the SCell for $M_{SCell}=1$ with one or two codewords. Two PUCCH Format 1b resources may be allocated if the $M_c$ of the SCell is 2. Four PUCCH Format 1b resources may be allocated if the $M_c$ of the SCell is 4. If the $M_c$ of the SCell is greater than 1, and a PDSCH is configured with two codewords, the HARQ-ACK bits of the two codewords may be spatially bundled to one HARQ-ACK bit.

In procedure IV.2, if the $M_c$ of the PCell is set with the $M_c$ of the SCell, then the PUCCH Format 1b with channel selection procedure may be reused for the more than one cell case in Rel-10 with $M=M_c$ of the SCell. With procedure IV.2, the HARQ-ACK bits corresponding to the PCell may be reported with DTX. The advantage of procedure IV.2 is to reuse the channel selection tables for more than one configured serving cell (e.g., the sets of channel selection tables for a single configured cell are not used for TDD CA). For M=1, if the PDSCH on the SCell has one codeword, Table 10.1.3.2-1 for A=2 may be used. For M=1 and PDSCH on SCell has two codewords or M=2, Table 10.1.3.2-3 for A=4 may be used. For M=4, Table 10.1.3.2-6 may be used.

The disadvantages of procedure IV.2 are the waste of resource assignment on the PCell and the poor HARQ-ACK bit mapping in the sets of channel selection tables. Even if PUCCH channel resources are configured for the PCell following the rules in Section 10.1.3.2 in 3GPP TS 36.213, they may not be used to carry the PUCCH feedback due to the mapping table design characteristics. Furthermore, since all PCell HARQ-ACK bits are set with DTX, the actual codeword space of the channel selection tables are greatly reduced. Thus, the HARQ-ACK of the SCell are not reported as accurately as that of a single cell case, especially for the M=4 case.

In case V, the $M_c$ of the PCell is smaller than the $M_c$ of the SCell. In Rel-10, both the PCell and the SCell have the same M value. Therefore, case V is not supported in current Rel-10 specifications.

With approach A as shown in Table (4), the combinations of $M_c$ of the PCell and the SCell in case V include: $M_c$ of the PCell=1, $M_c$ of the SCell=2; $M_c$ of the PCell=1, $M_c$ of the SCell=3; $M_c$ of the PCell=1, $M_c$ of the SCell=4; $M_c$ of the PCell=2, $M_c$ of the SCell=4; and $M_c$ of the PCell=3, $M_c$ of the SCell=4. With approach B as shown in Table (5), in addition to all the combinations of approach A, there is another combination with $M_c$ of the PCell=2, $M_c$ of the SCell=3. The $M_c$ of the PCell is 0 in case IV. Therefore, case IV may be a special instance of case V and may follow the same approaches as case V alternatively from the approaches described for case IV above.

In case VI, the $M_c$ of the PCell is greater than the $M_c$ of the SCell. In Rel-10, both the PCell and the SCell have the same M value. Therefore, case VI is not supported in current Rel-10 specifications.

Case VI may happen in an uplink report only in approach B when the effective value $M_{Eff}$ is used as $M_c$ of the SCell. More specifically, case VI uplink reporting will happen in some uplink subframes for case A and case C in Table (2) where the SCell reference configuration is different from the TDD UL-DL configuration of the SCell. With approach B as shown in Table (5), the combinations of $M_c$ of the PCell and the SCell in case VI include: $M_c$ of the PCell=2, $M_c$ of the SCell=1; $M_c$ of the PCell=4, $M_c$ of the SCell=1; $M_c$ of the PCell=4, $M_c$ of the SCell=2; and $M_c$ of the PCell=4, $M_c$ of the SCell=3. The $M_c$ of the SCell is 0 in case III. Therefore, case III may be a special instance of case V and may follow the same approaches as case V alternatively from the approaches described for case III above.

For both case V and case VI, there are several procedures to solve these issues. In procedure V.1 or VI.1, $M_{total}$ may be defined as the total number of subframes or total number of HARQ-ACK bits associated with the uplink. In way A, $M_{total}$ is the total number of subframes associated to the given uplink for all cells. Therefore, $M_{total}$ is the sum of $M_c$ of the PCell and the $M_c$ of the SCell (e.g., $M_{total}=M_{PCell}+M_c$ of the SCell, where the $M_c$ of the SCell is $M_{Ref}$ with approach A or $M_{Eff}$ with approach B). In way B, in case $M_c$ of one cells is 1, $M_{total}$ may be defined as the total number of HARQ-ACK bits associated with a given uplink. Thus, $M_{total}=\max(M_c$ of the PCell and the Scell)+1 if a transmission mode that supports only one transport block is configured on the serving cell with $M_c=1$, where $\max(M_c$ of the PCell and the Scell) returns the maximum $M_c$ value between the $M_c$ of the PCell and the $M_c$ of the SCell; $M_{total}=\max(M_c$ of the PCell and the Scell)+2 if a transmission mode that supports two transport blocks is configured on the serving cell with $M_c=1$.

Then, $M=\lceil M_{total}/2 \rceil$ may be derived and existing Rel-10 mapping tables may be reused based on $M_{total}$ and the derived M (e.g., $M_{derived}$). For example, if $M_{total}=5$, reuse existing mapping table with derived M=3. If $M_{total}=7$, reuse mapping table with derived M=4. If $M_{total}$ is smaller than or equal to 4, PUCCH Format 1b with channel selection may be performed according to the channel selection Tables 10.1.3.2-123 with $A=M_{total}$ and $A \in \{2,3,4\}$.

If $M_{total}$ is greater than 4, due to different $M_c$ values of the PCell and SCell, one HARQ-ACK bit of the cell with higher $M_c$ may need to be truncated to derived $M=\lceil M_{total}/2 \rceil$ bits and the truncated bit may be multiplexed to the HARQ-ACK bits of the cell with smaller $M_c$. If necessary, a DTX is padded to the end of the cell with smaller $M_c$ to let the total number of bits reach to derived $M=\lceil M_{total}/2 \rceil$.

The benefit of this procedure V.1 or VIA is to provide the best matching M to the actual HARQ-ACK payload. The minimum M value is used to determine the channel selection mapping table. The potentially smaller M may lead to better HARQ-ACK accuracy for a PUCCH report.

The main disadvantage of procedure V.1 or VIA is extra complexity for the HARQ-ACK bit multiplexing of different cells. Another issue with procedure V.1 or VIA is the error propagation to the truncated bit of the cell with higher $M_c$ from the HARQ-ACK bits of the cell with higher $M_c$. If a HARQ-ACK bit in the cell with lower $M_c$ is a DTX, the truncated bit of the cell with higher $M_c$ may be considered "any" in the channel selection table (e.g., the bit may not be considered in the decoding). However, the truncated bit may only carry HARQ-ACK information when DAI of the PDCCH on the cell with higher $M_c$ is the same as the higher $M_c$ value (e.g., all DL subframes are scheduled with PDSCH transmission to a given UE). The chance is very low, and the benefit of enhanced HARQ-ACK accuracy with reduced M can be justified and compensated for by the very low probability of all DL subframes that are scheduled with PDSCH transmissions to the given UE in the cell with higher $M_c$.

For the tables below, in Tables with A=3 and A=4, the nth subframe of a serving cell is the nth subframe in the association set of the serving cell in time ordering. For a cell with $M_c=1$ and $M_c=2$, HARQ-ACK(j) of the cell is the HARQ-ACK response of the (j+1)th subframe in the association set with time ordering.

For the tables below, for the PCell and $M_c>2$, if there is a PDSCH transmission on the primary cell without a corresponding PDCCH detected within the subframe(s) n–k, where k∈K, HARQ-ACK(0) is the ACK/NACK/DTX response for the PDSCH transmission without a corresponding PDCCH. HARQ-ACK(j), where $1 \leq j \leq M_c-1$, is the ACK/NACK/DTX response for the PDSCH transmission with a corresponding PDCCH and DAI value in the PDCCH equal to 'j', or for the PDCCH indicating downlink SPS release and with a DAI value in the PDCCH equal to 'j'. Otherwise, HARQ-ACK(j), where $1 \leq j \leq M_c-1$, is the ACK/NACK/DTX response for the PDSCH transmission with corresponding PDCCH and a DAI value in the PDCCH equal to 'j+1' or for the PDCCH indicating downlink SPS release and with DAI value in the PDCCH equal to 'j+1'. For the tables below, for the SCell and $M_c>2$, the HARQ-ACK(j) of the serving cell, where $1 \leq j \leq M_c-1$, is the ACK/NACK/DTX response for the PDSCH transmission with a corresponding PDCCH and a DAI value in the PDCCH equal to 'j+1'.

In Rel-10, all cells have the same M. If M=1, no HARQ-ACK spatial bundling is performed. Thus 1 or 2 bits of HARQ-ACK are reported in a subframe for PDSCH with one or two codewords, respectively. If M>1, HARQ-ACK spatial bundling may be always performed, and thus only 1 bit of HARQ-ACK is reported in a subframe for PDSCH with either one or two codewords.

For case V uplink reporting, in way V.1.A, $M_{total}$ is defined as the total number of subframes and spatial bundling is performed according to the derived $M=\lceil M_{total}/2 \rceil$. Since the derived M is always greater than 1, spatial bundling is always performed. Table (6), Table (7), Tables (8A) and (8B) (referred to collectively as Table (8)) and Tables (9A) and (9B) (referred to collectively as Table 9) list the possible combinations for case V with way V.1.A, which may be applicable to both approach A and approach B.

TABLE (6)

A = $M_{total}$ = 3 with Spatial Bundling in all Subframes

| $M_c$ of PCell | $M_c$ of SCell | A = $M_{total}$ | Derived M | HARQ-ACK(0) | HARQ-ACK(1) | HARQ-ACK(2) |
|---|---|---|---|---|---|---|
| | | | | HARQ-ACK(j) | | |
| 1 | 2 | 3 | 2 | The subframe of Primary cell | The first subframe of Secondary cell | The second subframe of Secondary cell |

TABLE (7)

A = $M_{total}$ = 4 with Spatial Bundling in all Subframes

| $M_c$ of PCell | $M_c$ of SCell | A = $M_{total}$ | Derived M | HARQ-ACK(0) | HARQ-ACK(1) | HARQ-ACK(2) | HARQ-ACK(3) |
|---|---|---|---|---|---|---|---|
| | | | | HARQ-ACK(j) | | | |
| 1 | 3 | 4 | 2 | The subframe of Primary cell | The first subframe of Secondary cell | The second subframe of Secondary cell | The third subframe of Secondary cell |

TABLE (8A)

$M_{total} > 4$ and Derived M = 3 with Spatial Bundling in all Subframes

| $M_c$ of PCell | $M_c$ of SCell | $M_{total}$ | Derived M | HARQ-ACK(0) | HARQ-ACK(1) | HARQ-ACK(2) |
|---|---|---|---|---|---|---|
| | | | | HARQ-ACK(j) First M set of HARQ-ACK(j) | | |
| 1 | 4 | 5 | 3 | The subframe of Primary cell | The HARQ-ACK(3) of Secondary cell | DTX |
| 2 | 3 | 5 | 3 | The first subframe of Primary cell | The second subframe of Primary cell | DTX |
| 2 | 4 | 6 | 3 | The first subframe of Primary cell | The second subframe of Primary cell | The HARQ-ACK(3) of Secondary cell |

TABLE (8B)

$M_{total} > 4$ and Derived M = 3 with Spatial Bundling in all Subframes

| $M_c$ of PCell | $M_c$ of SCell | $M_{total}$ | Derived M | HARQ-ACK(0) | HARQ-ACK(1) | HARQ-ACK(2) |
|---|---|---|---|---|---|---|
| | | | | HARQ-ACK(j) Second M set of HARQ-ACK(j) | | |
| 1 | 4 | 5 | 3 | The HARQ-ACK(0) of Secondary cell | The HARQ-ACK(1) of Secondary cell | The HARQ-ACK(2) of Secondary cell |
| 2 | 3 | 5 | 3 | The HARQ-ACK(0) of Secondary cell | The HARQ-ACK(1) of Secondary cell | The HARQ-ACK(2) of Secondary cell |
| 2 | 4 | 6 | 3 | The HARQ-ACK(0) of Secondary cell | The HARQ-ACK(1) of Secondary cell | The HARQ-ACK(2) of Secondary cell |

TABLE (9A)

$M_{total} > 4$ and Derived M = 4 with Spatial Bundling in all Subframes

| $M_c$ of PCell | $M_c$ of SCell | $M_{total}$ | Derived M | HARQ-ACK(0) | HARQ-ACK(1) | HARQ-ACK(2) | HARQ-ACK(3) |
|---|---|---|---|---|---|---|---|
| | | | | HARQ-ACK(j) First M set of HARQ-ACK(j) | | | |
| 3 | 4 | 7 | 4 | The HARQ-ACK(0) of Primary cell | The HARQ-ACK(1) of Primary cell | The HARQ-ACK(2) of Primary cell | DTX |

TABLE (9B)

$M_{total} > 4$ and Derived M = 4 with Spatial Bundling in all Subframes

| $M_c$ of PCell | $M_c$ of SCell | $M_{total}$ | Derived M | HARQ-ACK(0) | HARQ-ACK(1) | HARQ-ACK(2) | HARQ-ACK(3) |
|---|---|---|---|---|---|---|---|
| | | | | HARQ-ACK(j) Second M set of HARQ-ACK(j) | | | |
| 3 | 4 | 7 | 4 | The HARQ-ACK(0) of | The HARQ-ACK(1) of | The HARQ-ACK(2) of | The HARQ-ACK(3) of |

TABLE (9B)-continued $M_{total} > 4$ and Derived M = 4 with Spatial Bundling in all Subframes

| $M_c$ of PCell | $M_c$ of SCell | Derived $M_{total}$ M | HARQ-ACK(0) | HARQ-ACK(1) | HARQ-ACK(2) | HARQ-ACK(3) |
|---|---|---|---|---|---|---|
| | | | \multicolumn{4}{c}{HARQ-ACK(j)} |
| | | | \multicolumn{4}{c}{Second M set of HARQ-ACK(j)} |
| | | | Secondary cell | Secondary cell | Secondary cell | Secondary cell |

For case V uplink reporting, in way V.1.B, if one cell with $M_c=1$, and $M_{total}$ is set as the total number of HARQ-ACK bits that are associated with a given uplink subframe, and the derived $M=\lceil M_{total}/2 \rceil$, no HARQ-ACK spatial bundling may be performed for the cell with $M_c=1$. The possible combinations in case V with $M_c=1$ for PCell with way V.1.B are listed in Table (10), Tables (11A) and (11B) (collectively referred to as Table (11)) and Tables (13A) and (13B) (collectively referred to as Table (13)). Tables (12A) and (12B) (collectively referred to as Table (12)) provides an alternative mapping to Table (11) for the $M_c$ of PCell=1 for PUSCH with one codeword, and the $M_c$ of SCell=3. With A=4, the 4-bit HARQ-ACK from the SCell may be in regular order other than the truncation from the cell with higher $M_c$, then multiplexed on the cell with lower $M_c$.

TABLE (10)

A = $M_{total}$ = 3, and no Spatial Bundling on Cell with $M_c$ = 1

| $M_c$ of PCell | $M_c$ of SCell | A = $M_{total}$ | Derived M | HARQ-ACK(0) | HARQ-ACK(1) | HARQ-ACK(2) |
|---|---|---|---|---|---|---|
| 1, PDSCH with 1 codeword | 2 | 3 | 2 | TB1 Primary cell | The first subframe of Secondary cell | The second subframe of Secondary cell |

TABLE (11A)

A = $M_{total}$ = 4, and no Spatial Bundling on Cell with $M_c$ = 1

| $M_c$ of PCell | $M_c$ of SCell | A = $M_{total}$ | Derived M | HARQ-ACK(0) | HARQ-ACK(1) |
|---|---|---|---|---|---|
| 1, PDSCH with 2 codewords | 2 | 4 | 2 | TB1 Primary cell | TB2 Primary cell |
| 1, PDSCH with 1 codeword | 3 | 4 | 2 | TB1 Primary cell | The HARQ-ACK(2) of Secondary cell |

TABLE (11B)

A = $M_{total}$ = 4, and no Spatial Bundling on Cell with $M_c$ = 1

| $M_c$ of PCell | $M_c$ of SCell | A = $M_{total}$ | Derived M | HARQ-ACK(2) | HARQ-ACK(3) |
|---|---|---|---|---|---|
| 1, PDSCH with 2 codewords | 2 | 4 | 2 | The first subframe of Secondary cell | The second subframe of Secondary cell |
| 1, PDSCH with 1 codeword | 3 | 4 | 2 | The HARQ-ACK(0) of Secondary cell | The HARQ-ACK(1) of Secondary cell |

TABLE (12A)

Alternative mapping for $M_c$ of PCell = 1 for PUSCH with One Codeword, and $M_c$ of SCell = 3

| $M_c$ of PCell | $M_c$ of SCell | A = $M_{total}$ | Derived M | HARQ-ACK(0) | HARQ-ACK(1) |
|---|---|---|---|---|---|
| 1, PDSCH with 1 codeword | 3 | 4 | 2 | TB1 Primary cell | The HARQ-ACK(0) of Secondary cell |

TABLE (12B)

Alternative mapping for $M_c$ of PCell = 1 for PUSCH with One Codeword, and $M_c$ of SCell = 3

| $M_c$ of PCell | $M_c$ of SCell | A = $M_{total}$ | Derived M | HARQ-ACK(2) | HARQ-ACK(3) |
|---|---|---|---|---|---|
| 1, PDSCH with 1 codeword | 3 | 4 | 2 | The HARQ-ACK(1) of Secondary cell | The HARQ-ACK(2) of Secondary cell |

TABLE (13A)

$M_{total} > 4$, Derived M = 3 and no Spatial Bundling on Cell with $M_c$ = 1

| $M_c$ of PCell | $M_c$ of SCell | $M_{total}$ | Derived M | HARQ-ACK(0) | HARQ-ACK(1) | HARQ-ACK(2) |
|---|---|---|---|---|---|---|
| | | | | \multicolumn{3}{c}{HARQ-ACK(j)} |
| | | | | \multicolumn{3}{c}{First M set of HARQ-ACK(j)} |
| 1, PDSCH with 2 codewords | 3 | 5 | 3 | TB1 Primary cell | TB2 Primary cell | DTX |
| 1, PDSCH with 1 codeword | 4 | 5 | 3 | TB1 Primary cell | The HARQ-ACK(3) of Secondary cell | DTX |
| 1, PDSCH with 2 codewords | 4 | 6 | 3 | TB1 Primary cell | TB2 Primary cell | The HARQ-ACK(3) of Secondary cell |

TABLE (13B)

$M_{total} > 4$, Derived M = 3 and no Spatial Bundling on Cell with $M_c = 1$

| $M_c$ of PCell | $M_c$ of SCell | $M_{total}$ | Derived M | HARQ-ACK(j) Second M set of HARQ-ACK(j) | | |
|---|---|---|---|---|---|---|
| | | | | HARQ-ACK(0) | HARQ-ACK(1) | HARQ-ACK(2) |
| 1, PDSCH with 2 codewords | 3 | 5 | 3 | The HARQ-ACK(0) of Secondary cell | The HARQ-ACK(1) of Secondary cell | The HARQ-ACK(2) of Secondary cell |
| 1, PDSCH with 1 codeword | 4 | 5 | 3 | The HARQ-ACK(0) of Secondary cell | The HARQ-ACK(1) of Secondary cell | The HARQ-ACK(2) of Secondary cell |
| 1, PDSCH with 2 codewords | 4 | 6 | 3 | The HARQ-ACK(0) of Secondary cell | The HARQ-ACK(1) of Secondary cell | The HARQ-ACK(2) of Secondary cell |

In case V, the $M_c$ of the SCell is always greater than 1 and the PUCCH resources associated with the SCell may be allocated in the same way as in Rel-10 Section 10.1.3.2.1 in 3GPP TS 36.213. If the $M_c$ of the PCell is greater than 1, the PUCCH resources associated with the PCell may be allocated in the same way as in Rel-10 Section 10.1.3.2.1 in 3GPP TS 36.213. If the $M_c$ of the PCell is 1, the PUCCH resources associated with the PCell may be allocated in the same way as in Rel-10 Section 10.1.3.2.1 in 3GPP TS 36.213, assuming a transmission mode that supports up to two transport blocks on the serving cell.

For case VI uplink reporting, in way VI.1.A, $M_{total}$ is defined as the total number of subframes and spatial bundling is performed according to the derived $M=\lceil M_{total}/2 \rceil$. Since the derived M is always greater than 1 in this case, spatial bundling is always performed. Table (14), Tables (15A) and (15B) (collectively referred to as Table (15)) and Tables (16A) and (16B) (collectively referred to as Table (16)) list the possible combinations for case VI with way VI.1.A, which is only applicable to approach B.

TABLE (14)

$M_{total} = 3$ with Spatial Bundling in all Subframes

| $M_c$ of PCell | $M_c$ of SCell | $A = M_{total}$ | Derived M | HARQ-ACK(j) | | |
|---|---|---|---|---|---|---|
| | | | | HARQ-ACK(0) | HARQ-ACK(1) | HARQ-ACK(2) |
| 2 | 1 | 3 | 2 | The first subframe of Primary cell | The second subframe of Primary cell | The first subframe of Secondary cell |

TABLE (15A)

$M_{total} > 4$ and Derived M = 3 with Spatial Bundling in all Subframes

| $M_c$ of PCell | $M_c$ of SCell | $M_{total}$ | Derived M | HARQ-ACK(j) First M set of HARQ-ACK(j) | | |
|---|---|---|---|---|---|---|
| | | | | HARQ-ACK(0) | HARQ-ACK(1) | HARQ-ACK(2) |
| 4 | 1 | 5 | 3 | The HARQ-ACK(0) of Primary cell | The HARQ-ACK(1) of Primary cell | The HARQ-ACK(2) of Primary cell |
| 4 | 2 | 6 | 3 | The HARQ-ACK(0) of Primary cell | The HARQ-ACK(1) of Primary cell | The HARQ-ACK(2) of Primary cell |

TABLE (15B)

$M_{total} > 4$ and Derived M = 3 with Spatial Bundling in all Subframes

| $M_c$ of PCell | $M_c$ of SCell | $M_{total}$ | Derived M | HARQ-ACK(j) Second M set of HARQ-ACK(j) | | |
|---|---|---|---|---|---|---|
| | | | | HARQ-ACK(0) | HARQ-ACK(1) | HARQ-ACK(2) |
| 4 | 1 | 5 | 3 | The first subframe of Secondary cell | The HARQ-ACK(3) of Primary cell | DTX |
| 4 | 2 | 6 | 3 | The first subframe of Secondary cell | The second subframe of Secondary cell | The HARQ-ACK(3) of Primary cell |

TABLE (16A)

$M_{total} > 4$ and Derived M = 4 with Spatial Bundling in all Subframes

| $M_c$ of PCell | $M_c$ of SCell | $M_{total}$ | Derived M | HARQ-ACK(j) First M set of HARQ-ACK(j) | | | |
|---|---|---|---|---|---|---|---|
| | | | | HARQ-ACK(0) | HARQ-ACK(1) | HARQ-ACK(2) | HARQ-ACK(3) |
| 4 | 3 | 7 | 4 | The HARQ-ACK(0) of Primary cell | The HARQ-ACK(1) of Primary cell | The HARQ-ACK(2) of Primary cell | The HARQ-ACK(3) of Primary cell |

TABLE (16B)

$M_{total} > 4$ and Derived M = 4 with Spatial Bundling in all Subframes

| $M_c$ of PCell | $M_c$ of SCell | $M_{total}$ | Derived M | HARQ-ACK(j) Second M set of HARQ-ACK(j) | | | |
|---|---|---|---|---|---|---|---|
| | | | | HARQ-ACK(0) | HARQ-ACK(1) | HARQ-ACK(2) | HARQ-ACK(3) |
| 4 | 3 | 7 | 4 | The HARQ-ACK(0) of Secondary cell | The HARQ-ACK(1) of Secondary cell | The HARQ-ACK(2) of Secondary cell | DTX |

For case VI uplink reporting, in way VI.1.B, if one cell with $M_c=1$, and $M_{total}$ is defined as the total number of HARQ-ACK bits, and $M=\lceil M_{total}/2 \rceil$, no HARQ-ACK spatial bundling may be performed for the cell with $M_c=1$. The possible combinations in case VI with way VI.1.B are listed in Table (17), Table (18) and Tables (19A) and (19B) (collectively referred to as Table (19)).

TABLE (17)

A = $M_{total}$ = 3, and no Spatial Bundling for Cell with $M_c$ = 1

| $M_c$ of PCell | $M_c$ of SCell | A = $M_{total}$ | Derived M | HARQ-ACK(j) | | |
|---|---|---|---|---|---|---|
| | | | | HARQ-ACK(0) | HARQ-ACK(1) | HARQ-ACK(2) |
| 2 | 1, PDSCH with 1 codeword | 3 | 2 | The first subframe of Primary cell | The second subframe of Primary cell | TB1 Secondary cell |

TABLE (18)

A = $M_{total}$ = 4, and no Spatial Bundling for Cell with $M_c$ = 1

| $M_c$ of PCell | $M_c$ of SCell | A = $M_{total}$ | Derived M | HARQ-ACK(j) | | | |
|---|---|---|---|---|---|---|---|
| | | | | HARQ-ACK(0) | HARQ-ACK(1) | HARQ-ACK(2) | HARQ-ACK(3) |
| 2 | 1, PDSCH with 2 codeword | 4 | 2 | The subframe of Primary cell | The first subframe of Secondary cell | TB1 Secondary cell | TB2 Secondary cell |

TABLE (19A)

$M_{total}$ > 4, Derived M = 3 and no Spatial Bundling for Cell with $M_c$ = 1

| $M_c$ of PCell | $M_c$ of SCell | $M_{total}$ | Derived M | HARQ-ACK(j) First M set of HARQ-ACK(j) | | |
|---|---|---|---|---|---|---|
| | | | | HARQ-ACK(0) | HARQ-ACK(1) | HARQ-ACK(2) |
| 4 | 1, PDSCH with 1 codeword | 5 | 3 | The HARQ-ACK(0) of Primary cell | The HARQ-ACK(1) of Primary cell | The HARQ-ACK(2) of Primary cell |
| 4 | 1, PDSCH with 2 codeword | 6 | 3 | The HARQ-ACK(0) of Primary cell | The HARQ-ACK(1) of Primary cell | The HARQ-ACK(2) of Primary cell |

TABLE (19B)

$M_{total}$ > 4, Derived M = 3 and no Spatial Bundling for Cell with $M_c$ = 1

| $M_c$ of PCell | $M_c$ of SCell | $M_{total}$ | Derived M | HARQ-ACK(j) Second M set of HARQ-ACK(j) | | |
|---|---|---|---|---|---|---|
| | | | | HARQ-ACK(0) | HARQ-ACK(1) | HARQ-ACK(2) |
| 4 | 1, PDSCH with 1 codeword | 5 | 3 | TB1 Secondary cell | The HARQ-ACK(3) of Primary cell | DTX |
| 4 | 1, PDSCH with 2 codewords | 6 | 3 | TB1 Secondary cell | TB2 Secondary cell | The HARQ-ACK(3) of Primary cell |

In case VI, the $M_c$ of the PCell is always greater than 1 and the PUCCH resources associated with the PCell may be allocated in the same way as in Rel-10 Section 10.1.3.2.1 in 3GPP TS 36.213. If the $M_c$ of the SCell is greater than 1, the PUCCH resources associated with the PCell may be allocated in the same way as in Rel-10 Section 10.1.3.2.1 in 3GPP TS 36.213. If the $M_c$ of the SCell is 1, the PUCCH resources associated with the PCell may be allocated in the same way as in Rel-10 Section 10.1.3.2.1 in 3GPP TS 36.213, assuming a transmission mode that supports up to two transport blocks on the serving cell. The PUCCH resources associated with the SCell are configured by higher layer (signalling, for example) if the PDSCH transmission is self-scheduled on the SCell. The PUCCH resources associated with the SCell may be dynamically allocated if the PDSCH transmission is cross-carrier scheduled by the PDCCH of the PCell, as described in in Rel-10 Section 10.1.3.2.1 in 3GPP TS 36.213.

In procedure V.2 or VI.2, $M_{max}$ may be defined as the maximum between the $M_c$ of the PCell and the $M_c$ of the SCell. In procedure V.2 or VI.2, the PUCCH Format 1b with channel selection technique may be reused for the more than one cell case in Rel-10 with M=$M_{max}$. With procedure V.2 or VI.2, the extra HARQ-ACK bits of the configured cell with smaller $M_c$ may be padded with DTX to a total of $M_{max}$ bits. The sets of Tables 10.1.3.2-4/5/6 may be used for $M_{max}$=2, $M_{max}$=3 and $M_{max}$=4, respectively, as shown in Table (20), Tables (21A) and (21B) (collectively referred to as Table (21) and Tables (22A) and (22B) (collectively referred to as Table (22)), respectively. For $M_{max}$=2, Table (23) uses the channel selection Table 10.1.3.2-4 for A=4.

TABLE (20)

$M_{max}$ = 2 with Spatial Bundling in All Subframes

| $M_c$ of PCell | $M_c$ of SCell | $M_{max}$ | HARQ-ACK(j) | | | |
|---|---|---|---|---|---|---|
| | | | HARQ-ACK(0) | HARQ-ACK(1) | HARQ-ACK(2) | HARQ-ACK(3) |
| 1 | 2 | 2 | The subframe of Primary cell | DTX | The first subframe of Secondary cell | The second subframe of Secondary cell |
| 2 | 1 | 2 | The first subframe of Primary cell | The second subframe of Primary cell | The first subframe of Secondary cell | DTX |

TABLE (21A)

$M_{max}$ = 3 with Spatial Bundling in All Subframes

| $M_c$ of PCell | $M_c$ of SCell | $M_{max}$ | HARQ-ACK(j) Primary cell | | |
|---|---|---|---|---|---|
| | | | HARQ-ACK(0) | HARQ-ACK(1) | HARQ-ACK(2) |
| 1 | 3 | 3 | The subframe of Primary cell | DTX | DTX |
| 2 | 3 | 3 | The first subframe of Primary cell | The second subframe of Primary cell | DTX |

TABLE (21B)

$M_{max} = 3$ with Spatial Bundling in All Subframes

| $M_c$ of PCell | $M_c$ of SCell | $M_{max}$ | HARQ-ACK(0) | HARQ-ACK(1) | HARQ-ACK(2) |
|---|---|---|---|---|---|
| | | | HARQ-ACK(j) Secondary cell | | |
| 1 | 3 | 3 | The HARQ-ACK(0) of Secondary cell | The HARQ-ACK(1) of Secondary cell | The HARQ-ACK(2) of Secondary cell |
| 2 | 3 | 3 | The HARQ-ACK(0) of Secondary cell | The HARQ-ACK(1) of Secondary cell | The HARQ-ACK(2) of Secondary cell |

TABLE (22A)

$M_{max} = 4$ with Spatial Bundling in All Subframes

| $M_c$ of PCell | $M_c$ of SCell | $M_{max}$ | HARQ-ACK(0) | HARQ-ACK(1) | HARQ-ACK(2) | HARQ-ACK(3) |
|---|---|---|---|---|---|---|
| | | | HARQ-ACK(j) Primary Cell | | | |
| 1 | 4 | 4 | The first subframe of Primary cell | DTX | DTX | DTX |
| 2 | 4 | 4 | The first subframe of Primary cell | The second subframe of Primary cell | DTX | DTX |
| 3 | 4 | 4 | The HARQ-ACK(0) of Primary cell | The HARQ-ACK(1) of Primary cell | The HARQ-ACK(2) of Primary cell | DTX |
| 4 | 1 | 4 | The HARQ-ACK(0) of Primary cell | The HARQ-ACK(1) of Primary cell | The HARQ-ACK(2) of Primary cell | The HARQ-ACK(3) of Primary cell |
| 4 | 2 | 4 | The HARQ-ACK(0) of Primary cell | The HARQ-ACK(1) of Primary cell | The HARQ-ACK(2) of Primary cell | The HARQ-ACK(3) of Primary cell |
| 4 | 3 | 4 | The HARQ-ACK(0) of Primary cell | The HARQ-ACK(1) of Primary cell | The HARQ-ACK(2) of Primary cell | The HARQ-ACK(3) of Primary cell |

TABLE (22B)

$M_{max} = 4$ with Spatial Bundling in All Subframes

| $M_c$ of PCell | $M_c$ of SCell | $M_{max}$ | HARQ-ACK(0) | HARQ-ACK(1) | HARQ-ACK(2) | HARQ-ACK(3) |
|---|---|---|---|---|---|---|
| | | | HARQ-ACK(j) Secondary cell | | | |
| 1 | 4 | 4 | The HARQ-ACK(0) of Secondary cell | The HARQ-ACK(1) of Secondary cell | The HARQ-ACK(2) of Secondary cell | The HARQ-ACK(3) of Secondary cell |
| 2 | 4 | 4 | The HARQ-ACK(0) of Secondary cell | The HARQ-ACK(1) of Secondary cell | The HARQ-ACK(2) of Secondary cell | The HARQ-ACK(3) of Secondary cell |
| 3 | 4 | 4 | The HARQ-ACK(0) of Secondary cell | The HARQ-ACK(1) of Secondary cell | The HARQ-ACK(2) of Secondary cell | The HARQ-ACK(3) of Secondary cell |
| 4 | 1 | 4 | The first subframe of Secondary cell | DTX | DTX | DTX |
| 4 | 2 | 4 | The first subframe of Secondary cell | The second subframe of Secondary cell | DTX | DTX |
| 4 | 3 | 4 | The HARQ-ACK(0) of Secondary cell | The HARQ-ACK(1) of Secondary cell | The HARQ-ACK(2) of Secondary cell | DTX |

One benefit of procedure V.2 or VI.2 is simplicity. It provides a simple technique to reuse the channel selection tables for more than one configured serving cells. However, it has several disadvantages too. First, for TDD HARQ-ACK multiplexing and a subframe n with M>1, where M is the number of elements in the set K defined in Table (3) and spatial HARQ-ACK bundling across multiple codewords within a DL subframe is performed by a logical AND operation of all the corresponding individual HARQ-ACKs. Because $M_{max}$ is always greater than 1 in this case, HARQ-ACK spatial bundling is always performed if two codewords are transmitted on PDSCH, even if the $M_c$ of the PCell in case V or the $M_c$ of the SCell in case VI is 1. Therefore, HARQ-ACK spatial bundling may follow the $M_c$ of the cell itself. Therefore, two HARQ-ACK bits may be reported if two codewords are transmitted on the PDSCH for the cell with $M_c=1$. Table (23), Tables (24A) and (24B) (collectively referred to as Table (24)) and Tables (25A) and (25B) (collectively referred to as Table (25) show the mappings for one of the cell with $M_c=1$ and $M_{max}=2$, $M_{max}=3$, $M_{max}=4$, respectively. For $M_{max}=2$, Table 21 uses the channel selection Table 10.1.3.2-4 for A=4.

TABLE (23)

$M_{max} = 2$ with no Spatial Bundling for Cell with $M_c = 1$

| $M_c$ of PCell | $M_c$ of SCell | $M_{max}$ | HARQ-ACK(0) | HARQ-ACK(1) | HARQ-ACK(2) | HARQ-ACK(3) |
|---|---|---|---|---|---|---|
| | | | HARQ-ACK(j) | | | |
| 1, PDSCH with 1 codeword | 2 | 2 | TB1 Primary cell | DTX | The first subframe of Secondary cell | The second subframe of Secondary cell |
| 1, PDSCH with 2 codewords | 2 | 2 | TB1 Primary cell | TB2 Primary cell | The first subframe of Secondary cell | The second subframe of Secondary cell |

TABLE (23)-continued $M_{max} = 2$ with no Spatial Bundling for Cell with $M_c = 1$

| $M_c$ of PCell | $M_c$ of SCell | $M_{max}$ | HARQ-ACK(0) | HARQ-ACK(1) | HARQ-ACK(2) | HARQ-ACK(3) |
|---|---|---|---|---|---|---|
| 2 | 1, PDSCH with 1 codeword | 2 | The first subframe of Primary cell | The second subframe of Primary cell | TB1 Secondary cell | DTX |
| 2 | 1, PDSCH with 2 codewords | 2 | The first subframe of Primary cell | The second subframe of Primary cell | TB1 Secondary cell | TB2 Secondary cell |

TABLE (24A)

$M_{max} = 3$ with no Spatial Bundling for Cell with $M_c = 1$

| $M_c$ of PCell | $M_c$ of SCell | $M_{max}$ | HARQ-ACK(j) Primary cell | | |
|---|---|---|---|---|---|
| | | | HARQ-ACK(0) | HARQ-ACK(1) | HARQ-ACK(2) |
| 1, PDSCH with 1 codeword | 3 | 3 | TB1 Primary cell | DTX | DTX |
| 1, PDSCH with 2 codewords | 3 | 3 | TB1 Primary cell | TB2 Primary cell | DTX |

TABLE (24B)

$M_{max} = 3$ with no Spatial Bundling for Cell with $M_c = 1$

| $M_c$ of PCell | $M_c$ of SCell | $M_{max}$ | HARQ-ACK(j) Secondary cell | | |
|---|---|---|---|---|---|
| | | | HARQ-ACK(0) | HARQ-ACK(1) | HARQ-ACK(2) |
| 1, PDSCH with 1 codeword | 3 | 3 | The HARQ-ACK(0) of Secondary cell | The HARQ-ACK(1) of Secondary cell | The HARQ-ACK(2) of Secondary cell |
| 1, PDSCH with 2 codewords | 3 | 3 | The HARQ-ACK(0) of Secondary cell | The HARQ-ACK(1) of Secondary cell | The HARQ-ACK(2) of Secondary cell |

TABLE (25A)

$M_{max} = 4$ with no Spatial Bundling for Cell with $M_c = 1$

| $M_c$ of PCell | $M_c =$ of SCell | $M_{max}$ | HARQ-ACK(0) | HARQ-ACK(1) | HARQ-ACK(2) | HARQ-ACK(3) |
|---|---|---|---|---|---|---|
| 1, PDSCH with 1 codeword | 4 | 4 | TB1 Primary cell | DTX | DTX | DTX |
| 1, PDSCH with 2 codewords | 4 | 4 | TB1 Primary cell | TB2 Primary cell | DTX | DTX |
| 4 | 1, PDSCH with 1 codeword | 4 | The HARQ-ACK(0) of Primary cell | The HARQ-ACK(1) of Primary cell | The HARQ-ACK(2) of Primary cell | The HARQ-ACK(3) of Primary cell |
| 4 | 1, PDSCH with 2 codewords | 4 | The HARQ-ACK(0) of Primary cell | The HARQ-ACK(1) of Primary cell | The HARQ-ACK(2) of Primary cell | The HARQ-ACK(3) of Primary cell |

TABLE (25B)

$M_{max} = 4$ with no Spatial Bundling for Cell with $M_c = 1$

| $M_c$ of PCell | $M_c$ of SCell | $M_{max}$ | HARQ-ACK(0) | HARQ-ACK(1) | HARQ-ACK(2) | HARQ-ACK(3) |
|---|---|---|---|---|---|---|
| 1, PDSCH with 1 codeword | 4 | 4 | The HARQ-ACK(0) of Secondary cell | The HARQ-ACK(1) of Secondary cell | The HARQ-ACK(2) of Secondary cell | The HARQ-ACK(3) of Secondary cell |
| 1, PDSCH with 2 codewords | 4 | 4 | The HARQ-ACK(0) of Secondary cell | The HARQ-ACK(1) of Secondary cell | The HARQ-ACK(2) of Secondary cell | The HARQ-ACK(3) of Secondary cell |
| 4 | 1, PDSCH with 1 codeword | 4 | TB1 Secondary cell | DTX | DTX | DTX |
| 4 | 1, PDSCH with 2 codewords | 4 | TB1 Secondary cell | TB2 Secondary cell | DTX | DTX |

Secondly, since extra HARQ-ACK bits are padded with DTX, the actual codeword spaces of the channel selection tables are greatly reduced. For the same number of actual information carrying HARQ-ACK bits, a PUCCH Format 1b with channel selection with a higher M value is normally worse than a PUCCH Format 1b with channel selection with a lower M value.

Therefore, there can be several special handlings for $M_{total} < 5$, thus the tables in Rel-10 with A=3, 4 can also be reused. The same sets of mapping tables as in procedure V.1 or VI.A above may be reused as special handling cases in procedure V.2 or VI.2 with and without spatial bundling for the cell with $M_c = 1$.

In the following description, A=3. For A=3, Table (6), Table (10), Table (14), and Table (17) in procedure V.1 or VI.1 may be applied: $M_c$ of the SCell is 2, $M_c$ of the PCell is 1 and PDSCH transmission with one codeword or two codewords with spatial bundling; $M_c$ of the PCell is 2, $M_c$ of the SCell is 1 and PDSCH transmission with one codeword or two codewords with spatial bundling.

In the following description, A=4. For A=4, Table (7), Table (12) (or Table (11)) and Table (18) in procedure V.1 or VI.1 may be applied: $M_c$ of the SCell is 2, $M_c$ of the PCell is 1 and PDSCH transmission with two codewords and no spatial bundling; $M_c$ of the PCell is 2, $M_c$ of the SCell is 1 and PDSCH transmission with two codewords and no spatial bundling; $M_c$ of the SCell is 3, $M_c$ of the PCell is 1 and PDSCH transmission with one codeword or two codewords with spatial bundling.

In procedure V.3 or VI.3, the $M_c$ of the PCell (e.g., $M_{PCell}$) may be applied to the SCell, and the Rel-10 channel selection tables may be reused with $M=M_{PCell}$. For case VI, where the $M_c$ of the PCell is greater than the $M_c$ of the SCell, procedure VI.3 is the same as procedure VI.2.

For case V, where the $M_c$ of the PCell is smaller than the $M_c$ of the SCell, HARQ-ACK bundling may be performed on the SCell to generate the same number of HARQ-ACK bits as the PCell. This technique has better backward compatibility in terms of PUCCH resource allocation and mapping tables. However, the HARQ-ACK bundling of SCell bits leads to worse HARQ-ACK reporting results. Especially, in this case, if cross subframe or cross TTI bundling is applied, ACK feedback is possible only if all DL subframes in the SCell are scheduled with PDSCH transmission.

A more subtle technique is to report the same number of HARQ-ACK bits of the SCell as the PCell. If the $M_c$ of the PCell is 1 with a transmission mode that supports one codeword on the PCell, one HARQ-ACK bit is reported for the first subframe on the SCell (e.g., the subframe for a PDSCH transmission on the SCell with a corresponding PDCCH in subframe $n-k_m$, where $k_m \epsilon K$ of the reference configuration of the SCell) with the DAI value in the PDCCH equal to '1'. DTX may be reported if the corresponding DAI is not received. Channel selection is performed on Table 10.1.3.2-1: transmission of HARQ-ACK multiplexing for A=2, as shown in Table (26). The HARQ-ACK is not reported for PDSCH transmissions of a corresponding PDCCH with DAI values greater than 1. Thus, the eNB may attempt to avoid scheduling such PDSCH transmissions.

If the $M_c$ of the PCell is 1 with a transmission mode that supports two codewords on the PCell, two HARQ-ACK bits are reported for the SCell for the first subframe and the second subframe on the SCell (e.g., PDSCH transmissions on the SCell with corresponding PDCCH in subframe $n-k_m$, where $k_m \epsilon K$ of the reference configuration of the SCell) with the DAI value in the PDCCH equal to either '1' or '2'. DTX is reported if the corresponding DAI is not received. Channel selection is performed on Table 10.1.3.2-3: transmission of HARQ-ACK multiplexing for A=4, as shown in Table (27). The HARQ-ACK is not reported for PDSCH transmissions of a corresponding PDCCH with DAI values greater than 2. Thus, the eNB may attempt to avoid scheduling such PDSCH transmissions.

If the $M_c$ of the PCell is 2, up to two HARQ-ACK bits are reported for the SCell for the first subframe and the second subframe on the SCell (e.g., PDSCH transmissions on the SCell with corresponding PDCCH in subframe $n-k_m$, where $k_m \epsilon K$ of the reference configuration of the SCell) with the DAI value in the PDCCH equal to either '1' or '2'. DTX is reported if the corresponding DAI is not received. Channel selection is performed on Table 10.1.3.2-3: transmission of HARQ-ACK multiplexing for A=4, as shown in Table (28). The HARQ-ACK is not reported for PDSCH transmissions of a corresponding PDCCH with DAI values greater than 2. Thus, the eNB may attempt to avoid scheduling such PDSCH transmissions.

If the $M_c$ of the PCell is 3, up to three HARQ-ACK bits are reported for the SCell for the first subframe, the second subframe and the third subframe on the SCell (e.g., PDSCH transmissions on the SCell with corresponding PDCCH in subframe $n-k_m$, where $k_m \epsilon K$ of the reference configuration of the SCell) with the DAI value in the PDCCH equal to either '1', or '2' or '3' respectively, as shown in Tables (29A) and (29B) (collectively referred to as Table (29). DTX is reported if the corresponding DAI is not received. The HARQ-ACK is not reported for PDSCH transmissions of a corresponding PDCCH with DAI values greater than 3. Thus, the eNB may attempt to avoid scheduling such PDSCH transmissions.

TABLE (26)

PCell $M_c$ = 1, with Spatial Bundling or Only one Codeword on PCell

| $M_c$ of PCell | $M_c$ of SCell | A | HARQ-ACK(j) | |
|---|---|---|---|---|
| | | | HARQ-ACK(0) | HARQ-ACK(1) |
| 1 | 2, 3 or 4 | 2 | The subframe of Primary cell | The HARQ-ACK(0) of Secondary cell |

TABLE (27)

PCell $M_c$ = 1, with no Spatial Bundling and two Codewords on PCell

| $M_c$ of PCell | $M_c$ of SCell | A | HARQ-ACK(j) | | | |
|---|---|---|---|---|---|---|
| | | | HARQ-ACK(0) | HARQ-ACK(1) | HARQ-ACK(2) | HARQ-ACK(3) |
| 1 | 2, 3 or 4 | 4 | TB1 Primary cell | TB2 Primary cell | The HARQ-ACK(0) of Secondary cell | The HARQ-ACK(1) of Secondary cell |

TABLE (28)

PCell $M_c$ = 2

| $M_c$ of PCell | $M_c$ of SCell | A | HARQ-ACK(j) | | | |
|---|---|---|---|---|---|---|
| | | | HARQ-ACK(0) | HARQ-ACK(1) | HARQ-ACK(2) | HARQ-ACK(3) |
| 2 | 3 or 4 | 4 | The first subframe of Primary cell | The second subframe of Primary cell | The HARQ-ACK(0) of Secondary cell | The HARQ-ACK(1) of Secondary cell |

TABLE (29A)

PCell $M_c = 3$

| $M_c$ of PCell | $M_c$ of SCell | M | HARQ-ACK(0) | HARQ-ACK(1) Primary Cell | HARQ-ACK(2) |
|---|---|---|---|---|---|
| 3 | 4 | 3 | The HARQ-ACK(0) of Primary cell | The HARQ-ACK(1) of Primary cell | The HARQ-ACK(2) of Primary cell |

TABLE (29B)

PCell $M_c = 3$

| $M_c$ of PCell | $M_c$ of SCell | M | HARQ-ACK(0) | HARQ-ACK(1) Secondary cell | HARQ-ACK(2) |
|---|---|---|---|---|---|
| 3 | 4 | 3 | The HARQ-ACK(0) of Secondary cell | The HARQ-ACK(1) of Secondary cell | The HARQ-ACK(2) of Secondary cell |

In procedure V.4 and VI.4, new channel selection mapping tables can be defined for the case V and case VI, where the $M_c$ of the PCell is different from the $M_c$ of the SCell. The sets of mapping tables may be derived from existing mapping tables for M=3 and M=4 by padding DTX to the cells with smaller $M_c$, similar to procedure V.2 or VI.2 above. The tables may also be designed to better match the combinations of the $M_c$ of the PCell and the $M_c$ of the SCell.

For reference, additional Tables from 3GPP specifications are provided as follows. It should be noted that "Transport Block" is abbreviated as "TB" in the Tables for convenience herein.

TABLE 10.1.2.2.1-1

Mapping of Transport Block and Serving Cell to HARQ-ACK(j) for PUCCH format 1b HARQ-ACK channel selection

| A | HARQ-ACK(0) | HARQ-ACK(1) | HARQ-ACK(2) | HARQ-ACK(3) |
|---|---|---|---|---|
| 2 | TB1 Primary cell | TB1 Secondary cell | NA | NA |
| 3 | TB1 Serving cell1 | TB2 Serving cell1 | TB1 Serving cell2 | NA |
| 4 | TB1 Primary cell | TB2 Primary cell | TB1 Secondary cell | TB2 Secondary cell |

TABLE 10.1.3-2

Transmission of HARQ-ACK multiplexing for M = 2

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |

TABLE 10.1.3-2-continued

Transmission of HARQ-ACK multiplexing for M = 2

| HARQ-ACK(0), HARQ-ACK(1) | $n_{PUCCH}^{(1)}$ | b(0), b(1) |
|---|---|---|
| NACK, DTX | $n_{PUCCH,0}^{(1)}$ | 1, 0 |
| DTX, DTX | No transmission | |

TABLE 10.1.3-3

Transmission of HARQ-ACK multiplexing for M = 3

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | No transmission | |

TABLE 10.1.3-4

Transmission of HARQ-ACK multiplexing for M = 4

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | No transmission | |

TABLE 10.1.3-5

Transmission of HARQ-ACK multiplexing for M = 2

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | No Transmission | |

TABLE 10.1.3-6

Transmission of HARQ-ACK multiplexing for M = 3

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | No Transmission | |

TABLE 10.1.3-7

Transmission of HARQ-ACK multiplexing for M = 4

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | |

TABLE 10.1.3.2-1

Transmission of HARQ-ACK multiplexing for A = 2

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | No Transmission | |

TABLE 10.1.3.2-2

Transmission of HARQ-ACK multiplexing for A = 3

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | No Transmission | |

TABLE 10.1.3.2-3

Transmission of HARQ-ACK multiplexing for A = 4

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | |

TABLE 10.1.3.2-4

Mapping of subframes on each serving cell to HARQ-ACK(j) for PUCCH format 1b HARQ-ACK channel selection for TDD with M = 2

| | HARQ-ACK(j) | | | |
|---|---|---|---|---|
| A | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

TABLE 10.1.3.2-5

Transmission of HARQ-ACK multiplexing for M = 3

| Primary Cell HARQ-ACK(0), HARQ-ACK(1), HARQ-ACK(2) | Secondary Cell HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |

TABLE 10.1.3.2-5-continued

Transmission of HARQ-ACK multiplexing for M = 3

| Primary Cell HARQ-ACK(0), HARQ-ACK(1), HARQ-ACK(2) | Secondary Cell HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | NACK/DTX, any, any | $n_{PUCCH,1}^{(1)}$ | 1, 0 | 1, 0, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

TABLE 10.1.3.2-6

Transmission of HARQ-ACK multiplexing for M = 4

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |

TABLE 10.1.3.2-6-continued

Transmission of HARQ-ACK multiplexing for M = 4

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |

TABLE 10.1.3.2-6-continued

Transmission of HARQ-ACK multiplexing for M = 4

| Primary Cell<br>HARQ-ACK(0),<br>HARQ-ACK(1),<br>HARQ-ACK(2),<br>HARQ-ACK(3) | Secondary Cell<br>HARQ-ACK(0),<br>HARQ-ACK(1),<br>HARQ-ACK(2),<br>HARQ-ACK(3) | Resource<br>$n_{PUCCH}^{(1)}$ | Constel-<br>lation<br>b(0),<br>b(1) | RM Code<br>Input Bits<br>o(0), o(1),<br>o(2), o(3) |
|---|---|---|---|---|
| (ACK, NACK/<br>DTX, any, any),<br>except for<br>(ACK, DTX,<br>DTX, DTX) | (ACK, NACK/<br>DTX, any, any),<br>except for<br>(ACK, DTX,<br>DTX, DTX) | $n_{PUCCH,\,0}^{(1)}$ | 0, 0 | 0, 0, 0, 0 |
| DTX, any,<br>any, any | NACK/DTX,<br>any, any,<br>any | No Transmission | | 0, 0, 0, 0 |
| DTX, any,<br>any, any | (ACK, NACK/<br>DTX, any, any),<br>except for<br>(ACK, DTX,<br>DTX, DTX) | No Transmission | | 0, 0, 0, 0 |

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more eNBs 160 and one or more UEs 102 in which systems and methods for sending and receiving feedback information may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of UL-DL configurations 128, a UE UL-DL configuration determination module 130, a HARQ-ACK generation module 132, a UE reporting subframe determination module 134, a UE feedback parameter determination module 126 and a format application module 184.

The UL-DL configurations 128 may specify a set of UL-DL configurations that may be used for communication between the UE 102 and the eNB 160. Examples of UL-DL configurations include the UL-DL configurations 0-6 illustrated in Table (1) above. The UL-DL configurations 128 may specify UL, DL and special subframes for communication with the eNB(s) 160. For example, the UL-DL configurations 128 may indicate DL subframes for the UE 102 to receive information from the eNB 160 and may indicate UL subframes for the UE 102 to transmit information to the eNB 160. For proper communication on a cell, the UE 102 and the eNB 160 may apply the same UL-DL configuration 128 on the same cell. However, different UL-DL configurations 128 may be applied on different cells (e.g., PCell and SCell(s)).

The UL-DL configurations 128 may also indicate PDSCH HARQ-ACK associations (as illustrated in Table (3) above, for example). A PDSCH HARQ-ACK association may specify a particular (PDSCH HARQ-ACK) timing for sending HARQ-ACK information corresponding to a PDSCH. For example, the HARQ-ACK generation module 132 may generate HARQ-ACK information corresponding to a PDSCH based on whether a signal (e.g., data) in the PDSCH was correctly received or not. A PDSCH HARQ-ACK association may specify a reporting subframe in which the UE 102 reports (e.g., transmits) the HARQ-ACK information corresponding to the PDSCH. The reporting subframe may be determined based on the subframe that includes the PDSCH.

The UE UL-DL configuration determination module 130 may determine which of the UL-DL configuration(s) 128 for the UE 102 to apply for one or more cells. For example, the UE 102 may receive one or more RRC configuration (e.g., SIB-1 broadcasted information or dedicated signaling) indicating UL-DL configuration(s) 128 for a PCell and for one or more SCells. For instance, a PCell and an SCell may be utilized in carrier aggregation. The UE UL-DL configuration determination module 130 may determine which UL-DL configuration 128 is assigned to the PCell and which UL-DL configuration 128 is assigned to the SCell. The UL-DL configurations 128 for the PCell and SCell(s) may be the same or different.

The UE reporting subframe determination module 134 may determine a reporting subframe for sending HARQ-ACK information. For example, the UE reporting subframe determination module 134 may determine a HARQ-ACK reporting subframe in which the UE 102 sends SCell HARQ-ACK information (e.g., PDSCH HARQ-ACK information corresponding to an SCell). For example, the UE reporting subframe determination module 134 may determine a reporting subframe for sending SCell HARQ-ACK information on the PCell according to the timing reference described above in Table (3). For instance, Table (3) above (e.g., the PDSCH HARQ-ACK association table) gives the location of a corresponding PDSCH by the index set K:{$k_0$, $k_1$, ..., $k_{M-1}$} for a subframe (e.g., UL subframe) number n, where the HARQ-ACK of a PDSCH in subframe n−k (e.g., n−$k_1$) is reported in UL subframe n. The UE 102 may send the SCell HARQ-ACK information in the determined HARQ-ACK reporting subframe.

The UE feedback parameter determination module 126 may determine one or more feedback parameters corresponding to one or more cells (e.g., PCell, SCell(s)). For example, the UE feedback parameter determination module 126 may determine a feedback parameter $M_c$ for one or more cells c. This determination may be accomplished as described above (and in connection with FIG. 2, for instance), for example. In some implementations, the determination may be based on one or more of a PCell configuration, an SCell configuration, a reference configuration, a number of conflicting subframes and a feedback parameter determination scheme.

The format application module 184 may apply a particular format to the HARQ-ACK information in certain cases. For example, the format application module 184 may determine which of cases I-VI described above are applicable. For instance, if one of cases III-VI is applicable, the format application module 184 may perform PUCCH Format 1b channel selection based on the PCell feedback parameter and the SCell feedback parameter as described above. In particular, the format application module 184 may apply one or more of the approaches, procedures, ways and techniques described above in accordance with a corresponding case. For instance, the format application module 184 may multiplex HARQ-ACK information corresponding to one or more of the PCell and SCell as described above.

In some implementations, the UE 102 may receive a channel selection determination scheme indicator from the eNB 160. For example, the channel selection determination scheme indicator may specify one or more of the approaches, procedures, ways and techniques described above. For instance, the UE 102 may receive a channel selection determination scheme indicator that indicates whether the channel selection to be performed is based on a total number of associated subframes (e.g., $M_{total}$) between the PCell and SCell or a maximum number of associated subframes (e.g., $M_{max}$) between the PCell and SCell. The format application module 184 may apply a particular format in accordance with the specified one or more of the approaches, procedures, ways and techniques described above. This may allow the UE 102 and the eNB 160 to utilize the same channel selection determination scheme in implementations where multiple channel selection determination schemes may be applied.

The UE operations module 124 may provide information 148 to the one or more receivers 120. For example, the UE operations module 124 may inform the receiver(s) 120 when or when not to receive transmissions based on the UL-DL configurations 128.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. In some configurations, this may be based on a UL-DL configuration 128. For instance, the one or more transmitters 158 may transmit during an UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of UL-DL configurations 194, an eNB reporting subframe determination module 198, an eNB UL-DL configuration determination module 196, an eNB feedback parameter determination module 151 and an interpreter 107. In some implementations, the eNB operations module 182 may also include a scheme signaling module 153.

The UL-DL configurations 194 may specify a set of UL-DL configurations that may be used for communication between the eNB 160 and the UE(s) 102. Examples of UL-DL configurations 194 include the UL-DL configurations 0-6 illustrated in Table (1) above. The UL-DL configurations 194 may specify UL and DL subframes for communication with the UE(s) 102. For example, the UL-DL configurations 194 may indicate DL subframes for the eNB 160 to send information to the UE(s) 102 and may indicate UL subframes for the eNB 160 to receive information from the UE(s) 102. For proper communication on a cell, the UE 102 and the eNB 160 may apply the same UL-DL configuration 194 on the same cell. However, different UL-DL configurations 194 may be applied on different cells (e.g., PCell and SCell(s)).

The UL-DL configurations 194 may also indicate PDSCH HARQ-ACK associations (as illustrated in Table (3), for example). A PDSCH HARQ-ACK association may specify a particular (PDSCH HARQ-ACK) timing for receiving HARQ-ACK information corresponding to a PDSCH. A PDSCH HARQ-ACK association may specify a reporting subframe in which the UE 102 reports (e.g., transmits) the HARQ-ACK information corresponding to the PDSCH to the eNB 160. The reporting subframe may be determined based on the subframe that includes the PDSCH sent by the eNB 160.

The eNB UL-DL configuration determination module 196 may determine which of the UL-DL configuration(s) 194 for the UE 102 to apply for one or more cells. For example, the eNB 160 may send one or more RRC configuration (e.g., SIB-1 broadcasted information or dedicated signaling) indicating UL-DL configuration(s) 194 for a PCell and for one or more SCells. For instance, a PCell and an SCell may be utilized in carrier aggregation. The eNB UL-DL configuration determination module 196 may assign UL-DL configuration(s) 194 to the PCell and to the SCell. The eNB 160 may signal one or more of these assignments to a UE 102. The UL-DL configurations 194 for the PCell and SCell(s) may be the same or different.

The eNB reporting subframe determination module 198 may determine a reporting subframe for receiving HARQ-ACK information. For example, the eNB reporting subframe determination module 198 may determine a HARQ-ACK reporting subframe in which the eNB 160 receives SCell PDSCH HARQ-ACK information (e.g., PDSCH HARQ-ACK information corresponding to an SCell) from a UE 102. For example, the eNB reporting subframe determination module 198 may determine a reporting subframe for receiving SCell HARQ-ACK information on the PCell according to the timing reference described above in Table (3). For instance, Table (3) above (e.g., the PDSCH HARQ-ACK association table) gives the location of a corresponding PDSCH by the index set K:{$k_0$, $k_1$, . . . , $k_{M-1}$}, for a subframe (e.g., UL subframe) number n, where the HARQ-ACK of a PDSCH in subframe n-k (e.g., n-$k_1$) is reported in UL subframe n. The eNB 160 may receive the SCell HARQ-ACK information in the determined HARQ-ACK reporting subframe.

The eNB feedback parameter determination module 151 may determine one or more feedback parameters corresponding to one or more cells (e.g., PCell, SCell(s)). For example, the eNB feedback parameter determination module 151 may determine a feedback parameter $M_c$ for one or more cells c. This determination may be accomplished as described above (and in connection with FIG. 3, for instance), for example. In some implementations, the determination may be based on one or more of a PCell configuration, an SCell configuration, a reference configuration, a number of conflicting subframes and a feedback parameter determination scheme.

The optional scheme signaling module 153 may generate one or more of a feedback parameter determination scheme indicator and a channel selection determination scheme indicator. In some implementations, one of multiple feedback parameter determination schemes may be utilized. In these implementations, the eNB 160 may signal which scheme is utilized. For example, the eNB 160 may send a feedback parameter determination scheme indicator that indicates whether the feedback parameter (e.g., $M_c$) is determined based on a reference parameter (e.g., $M_{Ref}$) or based on the reference parameter and a number of conflicting subframes (e.g., $M_{Eff}=M_{Ref}-m$). In other implementations, only one feedback parameter determination scheme may be utilized by the eNB 160 and UE 102. In these implementations, the eNB 160 may not signal a feedback parameter determination scheme.

Additionally or alternatively, in some implementations, one of multiple channel selection determination schemes may be utilized. In these implementations, the eNB 160 may signal which scheme is utilized. For example, the eNB 160 may send a channel selection determination scheme indicator that indicates whether the channel selection to be performed is based on a total number of associated subframes (e.g., $M_{total}$) between the PCell and SCell or a maximum number of associated subframes (e.g., $M_{max}$) between the PCell and SCell. Additionally or alternatively, the channel selection determination scheme indicator may indicate one or more of the approaches, procedures, way and techniques described above (for application by the UE 102 in performing channel selection, for example). In other implementations, only one channel selection determination scheme may be utilized by the eNB 160 and UE 102. In these implementations, the eNB 160 may not signal a channel selection determination scheme.

The interpreter 107 may interpret formats of the HARQ-ACK information in certain cases. For example, the interpreter 107 may interpret Format 1b with channel selection. For instance, the interpreter 107 may interpret received HARQ-ACK information based on PUCCH Format 1b with channel selection in accordance with one or more of the approaches, procedures, techniques and ways described above.

The eNB operations module 182 may provide information 190 to the one or more receivers 178. For example, the eNB operations module 182 may inform the receiver(s) 178 when or when not to receive transmissions based on a UL-DL configuration 194 for a given cell.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101. The other information 101 may include one or more of RRC configuration (e.g., SIB-1 broadcasted information or dedicated signaling) (e.g., PCell configuration indicator, SCell configuration indicator), a channel scheme determination indicator and a feedback parameter determination scheme indicator, for example.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on an UL-DL configuration 194. The one or more transmitters 117 may upconvert and transmit the modulated signal(s) 115 to one or more UEs 102.

It should be noted that a DL subframe may be transmitted from the eNB 160 to one or more UEs 102 and that an UL subframe may be transmitted from one or more UEs 102 to the eNB 160. Furthermore, both the eNB 160 and the one or more UEs 102 may transmit data in a standard special subframe.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
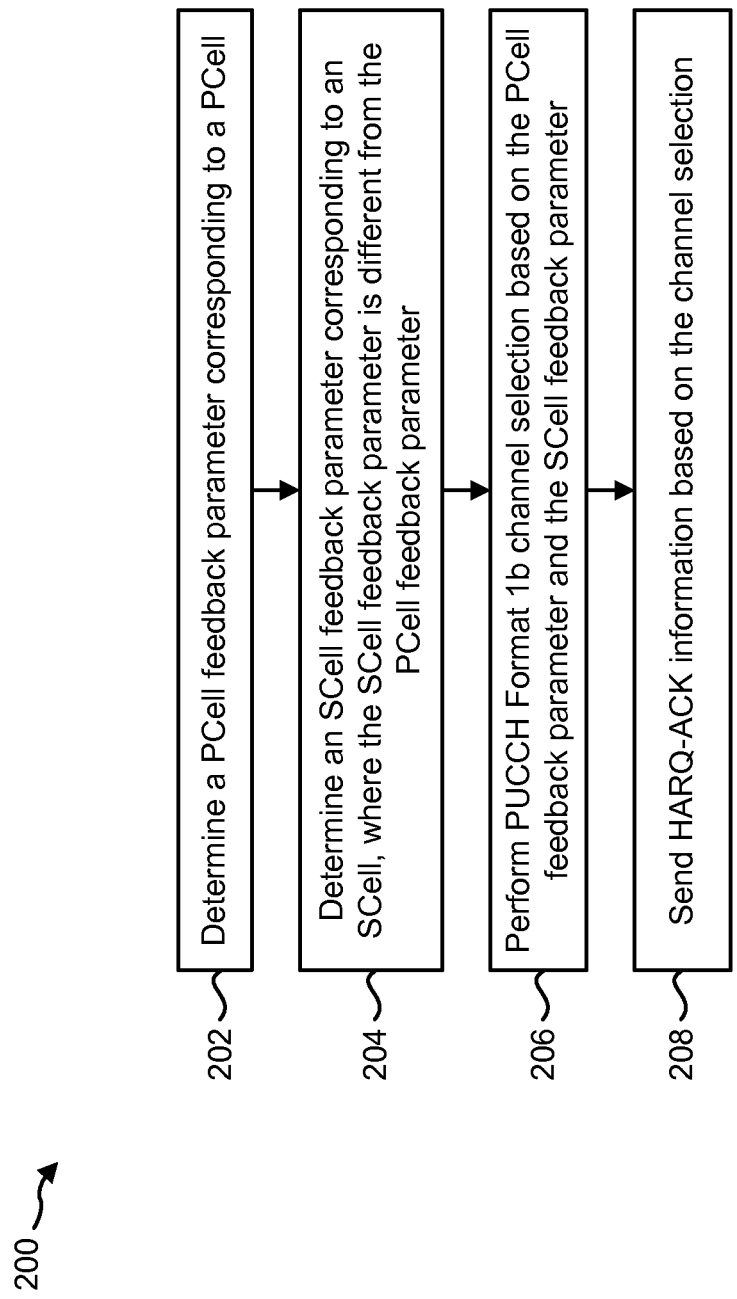
FIG. 2 is a flow diagram illustrating one configuration of a method for sending feedback information.

FIG. 2 is a flow diagram illustrating one configuration of a method 200 for sending feedback information. A UE 102 may determine 202 a PCell feedback parameter corresponding to a PCell (for an uplink subframe on the PCell, for instance). For example, the UE 102 may determine 202 the $M_c$ of the PCell in accordance with the above description. For instance, the PCell feedback parameter (e.g., $M_c$ of the PCell) may be the M corresponding to the PCell configuration signaled to the UE 102 from the eNB 160 as provided by Table (3) above. For example, the UE 102 may receive a PCell feedback parameter indicator from the eNB 160 that specifies the PCell feedback parameter.

The UE 102 may determine 204 an SCell feedback parameter corresponding to an SCell (for the given uplink subframe on the PCell, for instance). For example, the UE 102 may determine 204 the SCell feedback parameter (e.g., the $M_c$ of the SCell) in accordance with the above description. For instance, the UE 102 may determine 204 the SCell feedback parameter based on the PCell configuration and the SCell configuration. For example, the UE 102 may determine 204 the SCell feedback parameter based on whether a set of DL subframes for the SCell configuration is a subset of a set of DL subframes for the PCell configuration (case A), whether a set of DL subframes for the PCell configuration is a subset of a set of DL subframes for the SCell configuration (case B) or neither (case C).

In some implementations, the UE 102 may determine 204 the SCell feedback parameter in accordance with one or more of the approaches described above. Additionally or alternatively, the UE 102 may receive an SCell feedback parameter indicator from the eNB 160 that specifies the SCell feedback parameter. The SCell feedback parameter may indicate a number of subframes with a PDSCH HARQ-ACK association for the SCell for a particular UL-DL configuration. For instance, the UE 102 may determine 204 the SCell feedback parameter of an SCell as a reference parameter (e.g., $M_{Ref}$). The reference parameter may indicate a number of subframes with a PDSCH HARQ-ACK association for a reference configuration.

For example, the reference parameter may be set to a PCell parameter (e.g., $M_{PCell}$) if a set of DL subframes for the SCell configuration is a subset of a set of DL subframes for the PCell configuration (e.g., case A). Alternatively, the reference parameter may be set to an SCell parameter (e.g., $M_{SCell}$) if a set of DL subframes for the PCell configuration is a subset of a set of DL subframes for the SCell configuration (e.g., case B). Alternatively, the reference parameter may be set to a predetermined parameter (e.g., $M_{RefConf}$) if a set of DL subframes for the SCell configuration is neither a subset nor a superset of a set of DL subframes for the PCell configuration (e.g., case C). It should be noted that the predetermined parameter (e.g., $M_{RefConf}$) may correspond to a reference configuration specified in Table (2) for case C.

In some implementations, the UE 102 may determine 204 the SCell feedback parameter based on a number of conflicting subframes (e.g., m) and the reference parameter (e.g., $M_{Ref}$). For example, the UE 102 may determine the reference parameter (e.g., $M_{Ref}$) as described above and may set the SCell feedback parameter (e.g., $M_c$ of the SCell) equal to $M_{Eff}=M_{Ref}-m$. In other words, $M_{Eff}$ may be a number of downlink subframes and special subframes with PDSCH HARQ-ACK associations for an SCell that is following a reference configuration, excluding the conflicting subframes. Conflicting subframes may be subframes that are DL subframes or special subframes in the reference configuration and are UL subframes in the SCell configuration.

In some implementations, a similar approach may be applied for cross-carrier scheduling. For example, the UE 102 may determine 204 the SCell feedback parameter based on a reference parameter (e.g., $M_{Ref}$) (in addition to or alternatively from a number of conflicting subframes (e.g., m)) when the SCell is cross-carrier scheduled. Alternatively, the UE 102 may determine 204 the SCell feedback parameter as a scheduling cell parameter (e.g., $M_{SchedulingCell}$) when the SCell is cross-carrier scheduled. $M_{SchedulingCell}$ may be a number of subframes with a PDSCH HARQ-ACK association for a scheduling cell (UL-DL) configuration. In a case where the scheduling cell is not the PCell, the ($M_c$ of the) PDSCH reporting reference configuration of the scheduling cell may be used instead of the ($M_c$ of the) scheduling cell configuration.

In another implementation, the feedback parameter $M_c$ of the SCell may be $M_{Eff\_SchedulingCell}$ where $M_{Eff\_SchedulingCell}$ is the $M_{Eff}$ of the scheduling cell (where $M_{Eff}$ is the effective M of the scheduling cell (e.g., the PCell) configuration for which the PDSCH HARQ-ACK timing is followed, excluding the conflicting subframes, for example). In this context, a conflicting subframe may be a subframe that is a DL or special subframe in the scheduling cell configuration and is an UL subframe in the SCell configuration. In a case where the scheduling cell is not the PCell, the ($M_c$ of the) PDSCH reporting reference configuration of the scheduling cell may be used instead of the ($M_c$ of the) scheduling cell configuration. The remaining method 200 steps may be performed when the PCell feedback parameter and the SCell feedback parameter are different. For example, the UE 102 may determine which of cases I-VI described above are applicable. For instance, in case I, UL-DL configuration 5 is at least one of the PCell configuration and SCell configuration. In case I, the UE 102 may not perform channel selection. In case II, the PCell feedback parameter (e.g., $M_c$ of the PCell) and the SCell feedback parameter (e.g., $M_c$ of the SCell) are the same. In case II, known techniques (in Rel-10) may be reused. For cases III-VI, however, the following method 200 steps may be applied by a UE 102.

The UE 102 may perform 206 PUCCH Format 1b channel selection based on the PCell feedback parameter and the SCell feedback parameter. This may be done in accordance with the above description. For example, the UE 102 may perform 206 PUCCH Format 1b channel selection based on the PCell feedback parameter and the SCell feedback parameter for one of cases III, IV, V and VI as described above. In particular, the UE 102 may apply one or more of the approaches, procedures, ways and techniques described above.

For example, in case III, where only the PCell has HARQ-ACK to be reported (e.g., the PCell feedback parameter (e.g., $M_c$ of the PCell) is greater than zero and the SCell feedback parameter (e.g., $M_c$ of the SCell) is zero in an uplink subframe), performing 206 PUCCH Format 1b channel selection may include performing single-cell PUCCH Format 1b channel selection as described above (e.g., PUCCH reporting methods or techniques for one configured serving cell, for example, PUCCH Format 1a/1b or PUCCH Format 1b with channel selection may be performed based on the tables defined in section 10.1.3.1 in 3GPP TS 36.213). Furthermore, in case IV, where only the SCell has HARQ-ACK to be reported (e.g., the PCell feedback parameter (e.g., $M_c$ of the PCell) is zero and the SCell feedback parameter (e.g., $M_c$ of the SCell) is greater than zero in an uplink subframe), performing 206 PUCCH Format 1b channel selection may include performing single-cell PUCCH Format 1b channel selection as described above.

In case V, where the PCell feedback parameter (e.g., $M_c$ of the PCell) is smaller than the SCell feedback parameter (e.g., $M_c$ of the SCell), performing 206 PUCCH Format 1b channel selection may include applying one or more of the approaches, procedures, ways and techniques described above. Furthermore, in case VI, where the PCell feedback parameter (e.g., $M_c$ of the PCell) is greater than the SCell feedback parameter (e.g., $M_c$ of the SCell), performing 206 PUCCH Format 1b channel selection may include applying one or more of the approaches, procedures, ways and techniques described above.

For instance, in case V or case VI, the channel selection may be based on a total number of associated subframes (e.g., $M_{total}$) between the PCell and SCell as described above. Additionally or alternatively, in case V or case VI, the channel selection may be based on a maximum number of associated subframes (e.g., $M_{max}$) between the PCell and SCell as described above. Additionally or alternatively, in case V or case VI, the channel selection may be based on a number of associated subframes of the PCell, where sending 208 HARQ-ACK information includes sending a first number of SCell HARQ-ACK bits that is the same as or different from (e.g., less than or equal to) a second number of PCell HARQ-ACK bits as described above. Additionally or alternatively, in case V or case VI, the channel selection may be based on a channel selection table. For instance, the UE 102 may select a channel selection table based on the PCell feedback parameter and the SCell feedback parameter. The channel selection table may be a channel selection table as defined by 3GPP Rel-10 specifications or may be another (new) channel selection table (not defined by Rel-10 specifications) as described above.

It should be noted that in some implementations, the UE 102 may receive a channel selection determination scheme from the eNB 160. For example, the channel selection determination scheme may specify one or more of the approaches, procedures, ways and techniques described above. This may allow the UE 102 and the eNB 160 to utilize the same channel selection determination scheme in implementations where multiple channel selection determination schemes may be applied.

It should be noted that UE 102 may determine HARQ-ACK information. For example, the UE 102 may determine whether one or more PDSCH signals (e.g., voice, data) were correctly received on at least one of the PCell and the SCell. For instance, the UE 102 may generate an Acknowledgement (ACK) bit for each packet that is correctly received on a PDSCH. However, the UE 102 may generate a Negative Acknowledgement (NACK) bit for each packet that is not correctly received on a PDSCH.

The UE 102 may send 208 the HARQ-ACK information based on the channel selection. For example, the channel selection may specify how the HARQ-ACK information is multiplexed and reported in an uplink report.

Figure 3:
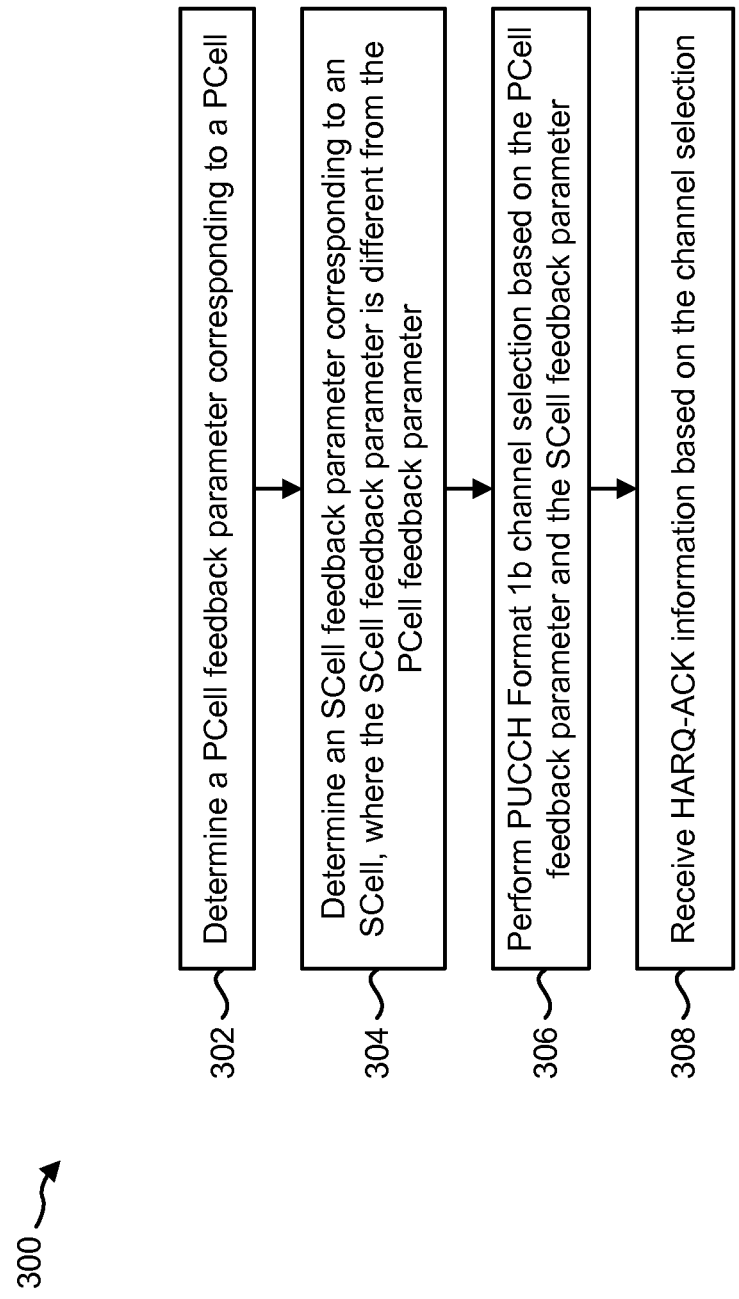
FIG. 3 is a flow diagram illustrating one configuration of a method for receiving feedback information.

FIG. 3 is a flow diagram illustrating one configuration of a method 300 for receiving feedback information. An eNB 160 may determine 302 a PCell feedback parameter corresponding to a PCell (for an uplink subframe on the PCell, for instance). For example, the eNB 160 may determine 302 the $M_c$ of the PCell in accordance with the above description. For instance, the PCell feedback parameter (e.g., $M_c$ of the PCell) may be the M corresponding to the PCell configuration determined by the eNB 160 as provided by Table (3) above. In some implementations, the eNB 160 may send a PCell feedback parameter indicator to the UE 102 that specifies the PCell feedback parameter.

The eNB 160 may determine 304 an SCell feedback parameter corresponding to an SCell (for the given uplink subframe on the PCell, for instance). For example, the eNB 160 may determine 304 the SCell feedback parameter (e.g., the $M_c$ of the SCell) in accordance with the above description. For instance, the eNB 160 may determine 304 the SCell feedback parameter based on the PCell configuration and the SCell configuration. For example, the eNB 160 may determine 304 the SCell feedback parameter based on whether a set of DL subframes for the SCell configuration is a subset of a set of DL subframes for the PCell configuration (case A), whether a set of DL subframes for the PCell configuration is a subset of a set of DL subframes for the SCell configuration (case B) or neither (case C). In some implementations, the eNB 160 may send an SCell feedback parameter indicator to the UE 102 that specifies the SCell feedback parameter.

In some implementations, the eNB 160 may determine 304 the SCell feedback parameter in accordance with one or more of the approaches described above. The SCell feedback parameter may indicate a number of subframes with a PDSCH HARQ-ACK association for the SCell for a particular UL-DL configuration. For instance, the eNB 160 may determine 304 the SCell feedback parameter of an SCell as a reference parameter (e.g., $M_{Ref}$). The reference parameter may indicate a number of subframes with a PDSCH HARQ-ACK association for a reference configuration.

For example, the reference parameter may be set to a PCell parameter (e.g., $M_{PCell}$) if a set of DL subframes for the SCell configuration is a subset of a set of DL subframes for the PCell configuration (e.g., case A). Alternatively, the reference parameter may be set to an SCell parameter (e.g., $M_{SCell}$) if a set of DL subframes for the PCell configuration is a subset of a set of DL subframes for the SCell configuration (e.g., case B). Alternatively, the reference parameter may be set to a predetermined parameter (e.g., $M_{RefConf}$) if a set of DL subframes for the SCell configuration is neither a subset nor a superset of a set of DL subframes for the PCell configuration (e.g., case C). It should be noted that the predetermined parameter (e.g., $M_{RefConf}$) may correspond to a reference configuration specified in Table (2) for case C.

In some implementations, the eNB 160 may determine 304 the SCell feedback parameter based on a number of conflicting subframes (e.g., m) and the reference parameter (e.g., $M_{Ref}$). For example, the eNB 160 may determine the reference parameter (e.g., $M_{Ref}$) as described above and may set the SCell feedback parameter (e.g., $M_c$ of the SCell) equal to $M_{Eff}=M_{Ref}-m$. In other words, $M_{Eff}$ may be a number of downlink subframes and special subframes with PDSCH HARQ-ACK associations for an SCell that is following a reference configuration, excluding the conflicting subframes. Conflicting subframes may be subframes that are DL subframes or special subframes in the reference configuration and are UL subframes in the SCell configuration.

In some implementations, a similar approach may be applied for cross-carrier scheduling. For example, the eNB 160 may determine 304 the SCell feedback parameter based on a reference parameter (e.g., $M_{Ref}$) (in addition to or alternatively from a number of conflicting subframes (e.g., m)) when the SCell is cross-carrier scheduled. Alternatively, the eNB 160 may determine 304 the SCell feedback parameter as a scheduling cell parameter (e.g., $M_{SchedulingCell}$) when the SCell is cross-carrier scheduled. $M_{SchedulingCell}$ may be a number of subframes with a PDSCH HARQ-ACK association for a scheduling cell (UL-DL) configuration. In a case where the scheduling cell is not the PCell, the ($M_c$ of the) PDSCH reporting reference configuration of the scheduling cell may be used instead of the ($M_c$ of the) scheduling cell configuration.

In another implementation, the feedback parameter $M_c$ of the SCell may be $M_{Eff\_SchedulingCell}$ where $M_{Eff\_SchedulingCell}$ is the $M_{Eff}$ of the scheduling cell (where $M_{Eff}$ is the effective M of the scheduling cell (e.g., the PCell) configuration for which the PDSCH HARQ-ACK timing is followed, excluding the conflicting subframes, for example). In this context, a conflicting subframe may be a subframe that is a DL or special subframe in the scheduling cell configuration and is an UL subframe in the SCell configuration. In a case where the scheduling cell is not the PCell, the ($M_c$ of the) PDSCH reporting reference configuration of the scheduling cell may be used instead of the ($M_c$ of the) scheduling cell configuration. The remaining method 300 steps may be performed when the PCell feedback parameter and the SCell feedback parameter are different. For example, the eNB 160 may determine which of cases I-VI described above are applicable. For instance, in case I, UL-DL configuration 5 is at least one of the PCell configuration and SCell configuration. In case I, the eNB 160 may not perform channel selection. In case II, the PCell feedback parameter (e.g., $M_c$ of the PCell) and the SCell feedback parameter (e.g., $M_c$ of the SCell) are the same. In case II, known techniques (in Rel-10) may be reused. For cases III-VI, however, the following method 300 steps may be applied by an eNB 160.

The eNB 160 may perform 306 PUCCH Format 1b channel selection based on the PCell feedback parameter and the SCell feedback parameter. This may be done in accordance with the above description. For example, the eNB 160 may perform 306 PUCCH Format 1b channel selection based on the PCell feedback parameter and the SCell feedback parameter for one of cases III, IV, V and VI as described above. In particular, the eNB 160 may apply one or more of the approaches, procedures, ways and techniques described above.

For example, in case III, where only the PCell has HARQ-ACK to be reported (e.g., the PCell feedback parameter (e.g., $M_c$ of the PCell) is greater than zero and the SCell feedback parameter (e.g., $M_c$ of the SCell) is zero in an uplink subframe), performing 306 PUCCH Format 1b channel selection may include performing single-cell PUCCH Format 1b channel selection as described above (e.g., PUCCH reporting methods or techniques for one configured serving cell, for example, PUCCH Format 1a/1b or PUCCH Format 1b with channel selection may be performed based on the tables defined in section 10.1.3.1 in 3GPP TS 36.213). Furthermore, in case IV, where only the SCell has HARQ-ACK to be reported (e.g., the PCell feedback parameter (e.g., $M_c$ of the PCell) is zero and the SCell feedback parameter (e.g., $M_c$ of the SCell) is greater than zero in an uplink subframe), performing 306 PUCCH Format 1b channel selection may include performing single-cell PUCCH Format 1b channel selection as described above.

In case V, where the PCell feedback parameter (e.g., $M_c$ of the PCell) is smaller than the SCell feedback parameter (e.g., $M_c$ of the SCell), performing 306 PUCCH Format 1b channel selection may include applying one or more of the approaches, procedures, ways and techniques described above. Furthermore, in case VI, where the PCell feedback parameter (e.g., $M_c$ of the PCell) is greater than the SCell feedback parameter (e.g., $M_c$ of the SCell), performing 306 PUCCH Format 1b channel selection may include applying one or more of the approaches, procedures, ways and techniques described above.

For instance, in case V or case VI, the channel selection may be based on a total number of associated subframes (e.g., $M_{total}$) between the PCell and SCell as described above. Additionally or alternatively, in case V or case VI, the channel selection may be based on a maximum number of associated subframes (e.g., $M_{max}$) between the PCell and SCell as described above. Additionally or alternatively, in case V or case VI, the channel selection may be based on a number of associated subframes of the PCell, where receiving 308 HARQ-ACK information includes receiving a first number of SCell HARQ-ACK bits that is the same as or different from (e.g., less than or equal to) a second number of PCell HARQ-ACK bits as described above. Additionally or alternatively, in case V or case VI, the channel selection may be based on a channel selection table. For instance, the eNB 160 may select a channel selection table based on the PCell feedback parameter and the SCell feedback parameter. The channel selection table may be a channel selection table as defined by Rel-10 specifications or may be another (new) channel selection table (not defined by Rel-10 specifications) as described above.

It should be noted that in some implementations, the eNB 160 may send a channel selection determination scheme to the UE 102. For example, the channel selection determination scheme may specify one or more of the approaches, procedures, ways and techniques described above. This may allow the eNB 160 and the UE 102 to utilize the same channel selection determination scheme in implementations where multiple channel selection determination schemes may be applied.

It should be noted that eNB 160 may send PDSCH signals (e.g., voice, data) to the UE 102. For example, the eNB 160 may send a voice call to a UE 102 in addition to or alternatively from data (e.g., text messages, Internet browsing data, etc.) via a PDSCH.

The eNB 160 may receive 308 HARQ-ACK information based on the channel selection. For example, the channel selection may specify how the received HARQ-ACK information is multiplexed and reported in an uplink report. The eNB 160 may interpret the received 308 HARQ-ACK information based on the channel selection.

Figure 4:
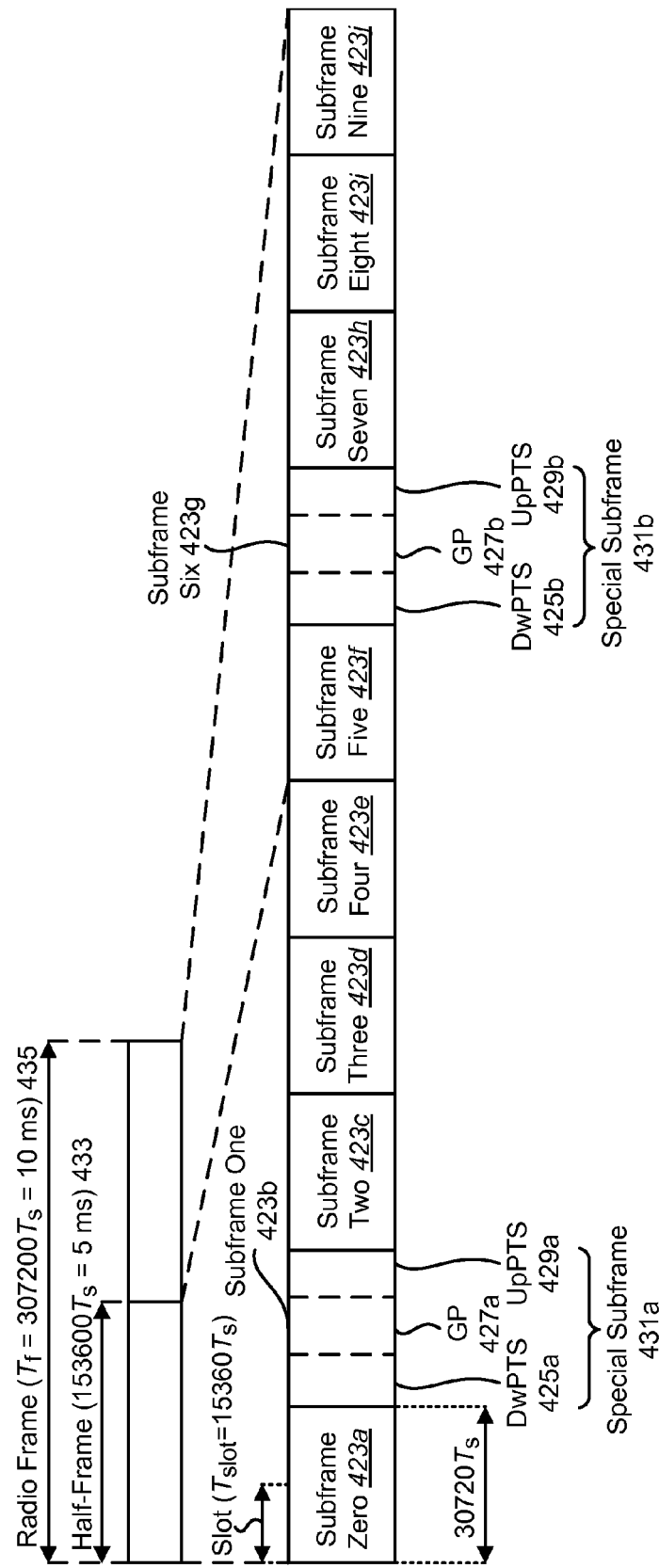
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure may be applicable in TDD approaches. Each radio frame 435 may have a length of $T_f = 307200 \cdot T_s = 10$ ms, where $T_f$ is a radio frame 435 duration and $T_s$ is a time unit equal to $$\frac{1}{(15000 \times 2048)}$$

seconds. The radio frame 435 may include two half-frames 433, each having a length of $153600 \cdot T_s = 5$ ms. Each half-frame 433 may include five subframes 423a-e, 423f-j each having a length of $30720 \cdot T_s = 1$ ms.

In Table (1) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (30) (from Table 4.2-1 of 3GPP TS 36.211) subject to the total length of DwPTS, GP and UpPTS being equal to $30720 \cdot T_s = 1$ ms. Table (5) illustrates several configurations of (standard) special subframes. Each subframe i is defined as two slots, 2i and 2i+1 of length $T_{slot} = 15360 \cdot T_s = 0.5$ ms in each subframe. In Table (30), "cyclic prefix" is abbreviated as "CP" and "configuration" is abbreviated as "Config" for convenience.

TABLE (30)

| Special Subframe Config | Normal CP in downlink | | | Extended CP in downlink | | |
| --- | --- | --- | --- | --- | --- | --- |
| | DwPTS | UpPTS | | DwPTS | UpPTS | |
| | | Normal CP in uplink | Extended CP in uplink | | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL-DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 423 that may be used include a downlink subframe, an uplink subframe and a special subframe 431. In the example illustrated in FIG. 4, which has a 5 ms periodicity, two standard special subframes 431a-b are included in the radio frame 435.

The first special subframe 431a includes a downlink pilot time slot (DwPTS) 425a, a guard period (GP) 427a and an uplink pilot time slot (UpPTS) 429a. In this example, the first standard special subframe 431a is included in subframe one 423b. The second standard special subframe 431b includes a downlink pilot time slot (DwPTS) 425b, a guard period (GP) 427b and an uplink pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table (5) above) subject to the total length of each set of DwPTS 425, GP 427 and UpPTS 429 being equal to $30720 \cdot T_s = 1$ ms.

Each subframe i 423a-j (where i denotes a subframe ranging from subframe zero 423a (e.g., 0) to subframe nine 423j (e.g., 9) in this example) is defined as two slots, 2i and 2i+1 of length $T_{slot} = 15360 \cdot T_s = 0.5$ ms in each subframe 423. For example, subframe zero (e.g., 0) 423a may include two slots, including a first slot.

UL-DL configurations with both 5 ms and 10 ms downlink-to-uplink switch-point periodicity may be used in accordance with the systems and methods disclosed herein. FIG. 4 illustrates one example of a radio frame 435 with 5 ms switch-point periodicity. In the case of 5 ms downlink-to-uplink switch-point periodicity, each half-frame 433 includes a standard special subframe 431a-b. In the case of 10 ms downlink-to-uplink switch-point periodicity, a special subframe may exist in the first half-frame 433 only.

Subframe zero (e.g., 0) 423a and subframe five (e.g., 5) 423f and DwPTS 425a-b may be reserved for downlink transmission. The UpPTS 429a-b and the subframe(s) immediately following the special subframe(s) 431a-b (e.g., subframe two 423c and subframe seven 423h) may be reserved for uplink transmission. It should be noted that, in some implementations, special subframes 431 may be considered DL subframes in order to determine a number of conflicting subframes.

Figure 5:
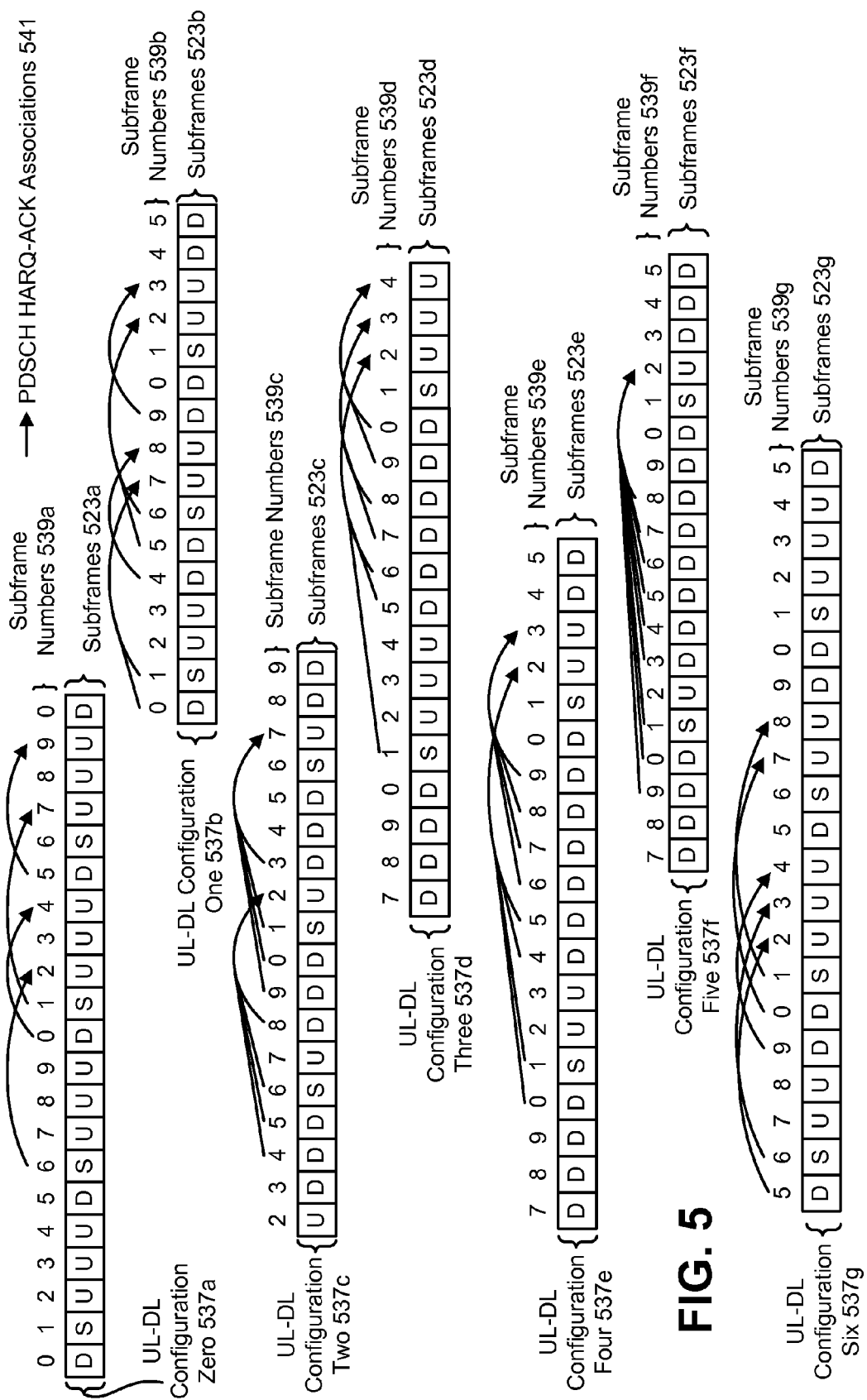
FIG. 5 is a diagram illustrating some uplink-downlink (UL-DL) configurations in accordance with the systems and methods described herein.

FIG. 5 is a diagram illustrating some UL-DL configurations 537a-g in accordance with the systems and methods described herein. In particular, FIG. 5 illustrates UL-DL configuration zero 537a (e.g., "UL-DL configuration 0") with subframes 523a and subframe numbers 539a, UL-DL configuration one 537b (e.g., "UL-DL configuration 1") with subframes 523b and subframe numbers 539b, UL-DL configuration two 537c (e.g., "UL-DL configuration 2") with subframes 523c and subframe numbers 539c and UL-DL configuration three 537d (e.g., "UL-DL configuration 3") with subframes 523d and subframe numbers 539d. FIG. 5 also illustrates UL-DL configuration four 537e (e.g., "UL-DL configuration 4") with subframes 523e and subframe numbers 539e, UL-DL configuration five 537f (e.g., "UL-DL configuration 5") with subframes 523f and subframe numbers 539f and UL-DL configuration six 537g (e.g., "UL-DL configuration 6") with subframes 523g and subframe numbers 539g.

FIG. 5 further illustrates PDSCH HARQ-ACK associations 541 (e.g., PDSCH HARQ-ACK feedback on PUCCH or PUSCH associations). The PDSCH HARQ-ACK associations 541 may indicate HARQ-ACK reporting subframes corresponding to subframes for PDSCH transmissions (e.g., subframes in which PDSCH transmissions may be sent and/or received). It should be noted that some of the radio frames illustrated in FIG. 5 have been truncated for convenience.

The systems and methods disclosed herein may be applied to one or more of the UL-DL configurations 537a-g illustrated in FIG. 5. For example, one or more PDSCH HARQ-ACK associations 541 corresponding to one of the UL-DL configurations 537a-g illustrated in FIG. 5 may be applied to communications between a UE 102 and eNB 160. For example, an UL-DL configuration 537 may be determined (e.g., assigned to, applied to) a PCell. In this case, PDSCH HARQ-ACK associations 541 may specify PDSCH HARQ-ACK timing (e.g., a HARQ-ACK reporting subframe) for HARQ-ACK feedback transmissions corresponding to the PCell. For SCell HARQ-ACK feedback transmissions, the PDSCH HARQ-ACK associations 541 corresponding to a reference UL-DL configuration in accordance with the feedback parameters may be utilized. In some instances, the PDSCH HARQ-ACK information may be formatted and reported in an uplink subframe based on Format 1b with channel selection as described above.

Figure 6:
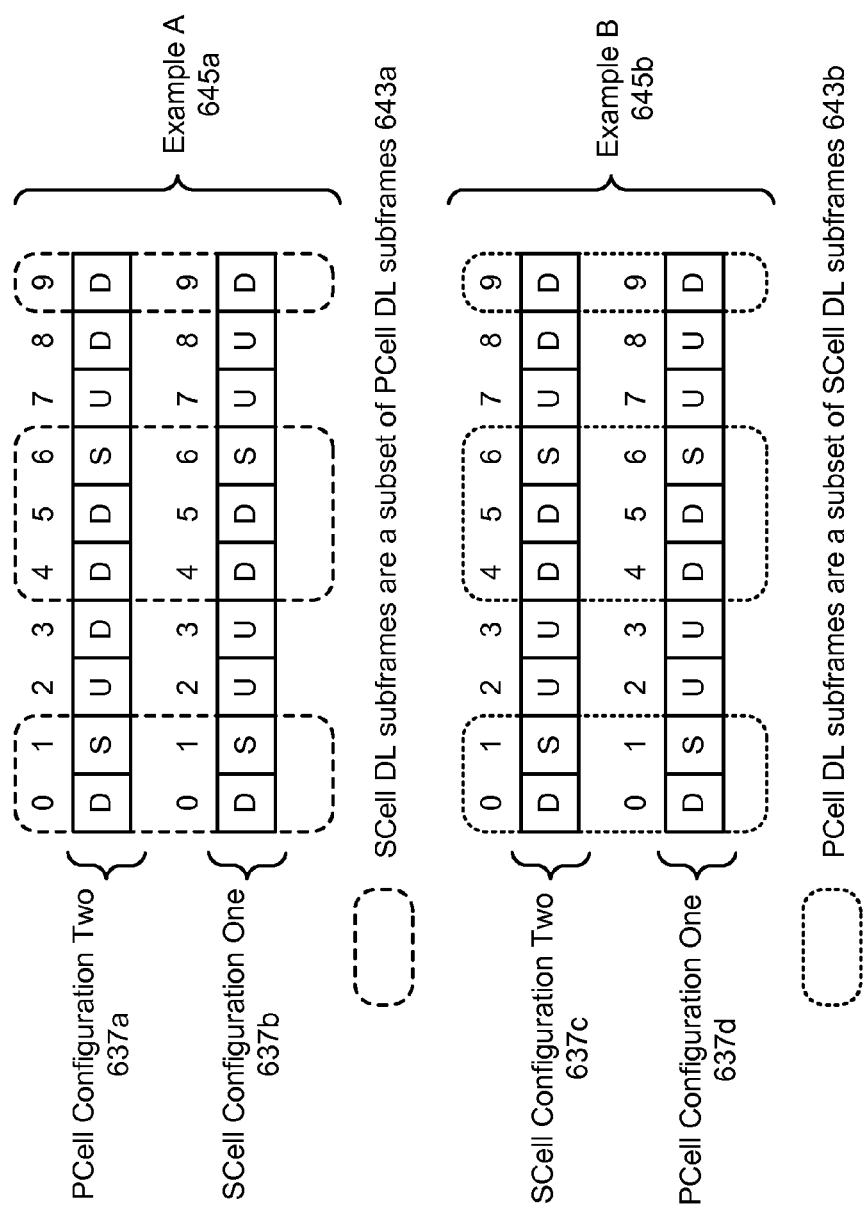
FIG. 6 is a diagram illustrating examples of primary cell (PCell) and secondary cell (SCell) configurations.

FIG. 6 is a diagram illustrating examples of PCell and SCell configurations. More specifically, example A 645a illustrates a set of DL subframes for an SCell configuration that are a subset of a set of DL subframes for a PCell configuration (e.g., case A). Example B 645b illustrates a set of DL subframes for a PCell configuration that are a subset of a set of DL subframes for an SCell configuration (e.g., case B).

In accordance with the systems and methods disclosed herein, the SCell PDSCH HARQ-ACK timing (e.g., reports) may follow the PCell configuration if the set of DL subframes indicated by the SCell configuration (as determined based on a SIB-1, for example) is a subset of the DL subframes indicated by the PCell configuration (as determined based on a SIB-1, for example) as dictated by the feedback parameter $M_c$. In this case, all DL subframes in the SCell configuration are also DL subframes in the PCell configuration. It should be noted that the PCell may have extra DL subframes allocated beyond those of the SCell. In FIG. 6, DL subframes are denoted with a "D," UL subframes are denoted with a "U," and special subframes (which may include both an UL component and a DL component, for example) are denoted as an "S" for convenience.

In particular, FIG. 6 illustrates example A 645a, where the set of DL subframes indicated by the SCell configuration is a subset of the DL subframes indicated by the PCell configuration. More specifically, example A 645a illustrates PCell configuration two (e.g., "2") 637a and SCell configuration one (e.g., "1") 637b. In example A 645a, SCell DL subframes 0, 1, 4, 5, 6 and 9 are a subset of PCell DL subframes 643a.

In accordance with the systems and methods disclosed herein, the SCell PDSCH HARQ-ACK timing (e.g., reports) may follow the SCell configuration if the set of DL subframes indicated by the PCell configuration (as determined based on a SIB-1, for example) is a subset of the DL subframes indicated by the SCell configuration (as determined based on a SIB-1, for example) as dictated by the feedback parameter $M_c$. In this case, all DL subframes in the PCell configuration are also DL subframes in the SCell configuration. It should be noted that the SCell may have extra DL subframes allocated beyond those of the PCell.

In particular, FIG. 6 illustrates example B 645b, where the set of DL subframes indicated by the PCell configuration is a subset of the DL subframes indicated by the SCell configuration. More specifically, example B 645b illustrates SCell configuration two (e.g., "2") 637c and PCell configuration one (e.g., "1") 637d. In example B 645b, PCell DL subframes 0, 1, 4, 5, 6 and 9 are a subset of SCell DL subframes 643b.

Figure 7:
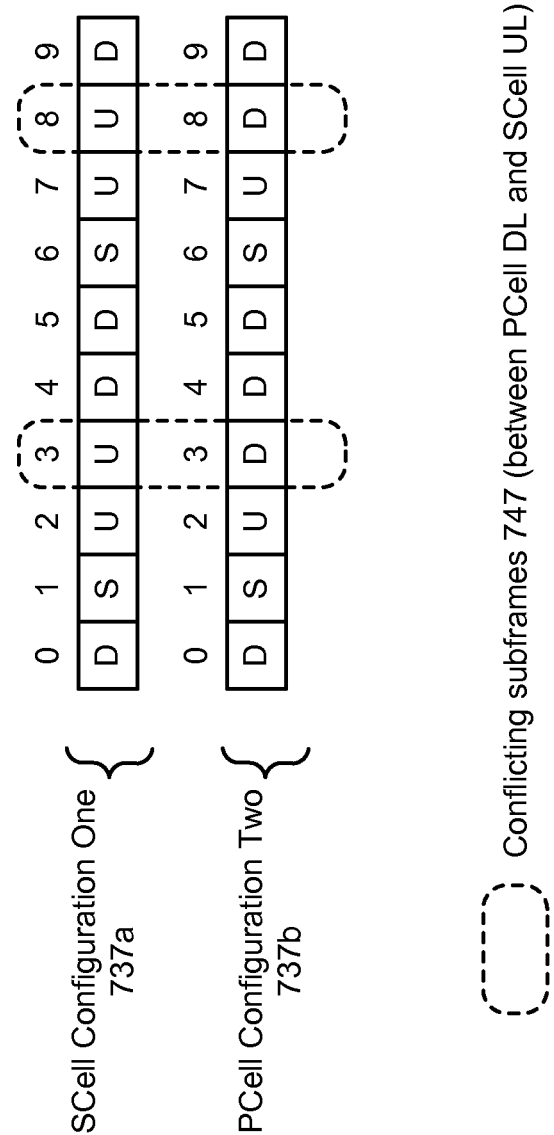
FIG. 7 is a diagram illustrating an example of conflicting subframes between a PCell configuration and an SCell configuration.

FIG. 7 is a diagram illustrating an example of conflicting subframes 747 between a PCell configuration 737b and an SCell configuration 737a. A conflicting subframe may occur when a subframe in one UL-DL configuration is a DL (or special subframe) and is an UL subframe in another UL-DL configuration. In this example, subframes 3 and 8 are conflicting subframes 747 between SCell configuration one 737a and PCell configuration two 737b, since subframes 3 and 8 are UL subframes in SCell configuration one 737a and PCell configuration two 737b.

In accordance with the systems and methods disclosed herein, a number of conflicting subframes m may be utilized in some of the approaches described above. For example, the feedback parameter $M_c$ of an SCell may be defined as $M_{Eff}$, where $M_{Eff}$ is the effective M of the reference configuration for which the PDSCH HARQ-ACK timing is followed excluding the conflicting subframes where the PCell configuration or reference configuration includes a DL subframe (or special subframe, for example) and the SCell configuration includes an UL subframe (e.g., $M_{Eff}=M_{Ref}-m$). In FIG. 7, DL subframes are denoted with a "D," UL subframes are denoted with a "U," and special subframes (which may include both an UL component and a DL component, for example) are denoted as an "S" for convenience.

Figure 8:
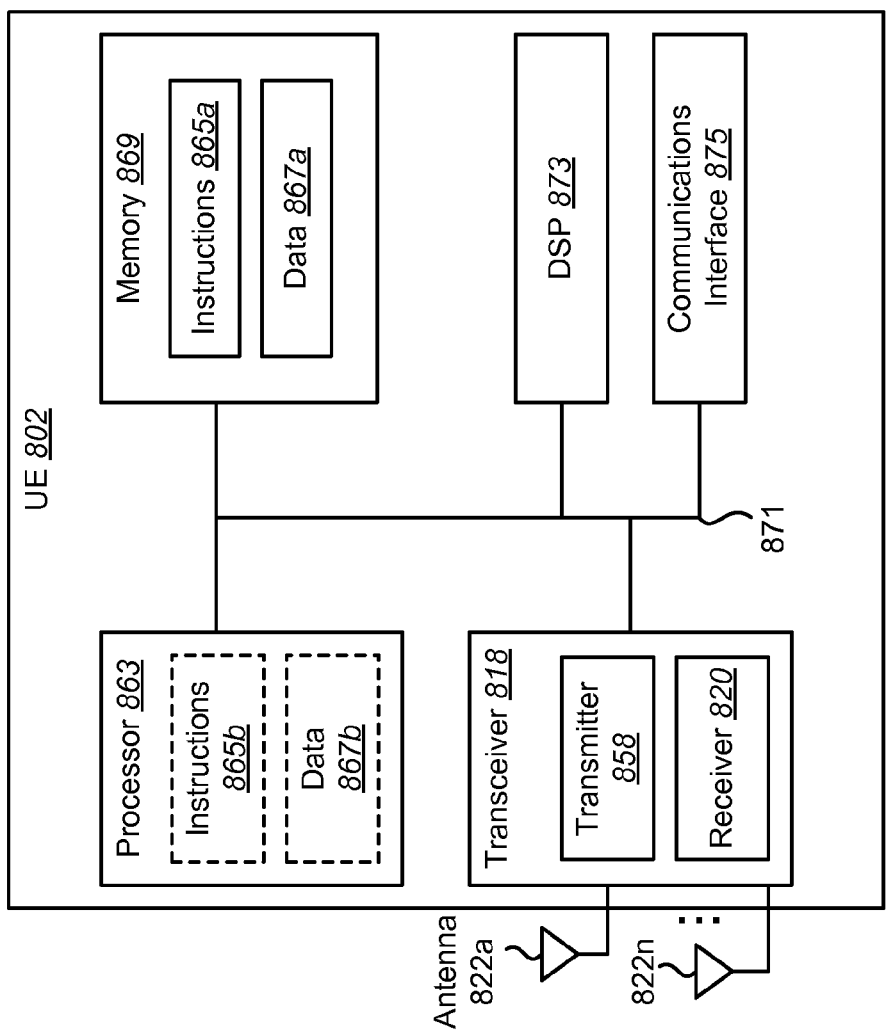
FIG. 8 illustrates various components that may be utilized in a UE.

FIG. 8 illustrates various components that may be utilized in a UE 802. The UE 802 described in connection with FIG. 8 may be implemented in accordance with the UE 102 described in connection with FIG. 1. The UE 802 includes a processor 863 that controls operation of the UE 802. The processor 863 may also be referred to as a central processing unit (CPU). Memory 869, which may include read-only memory (ROM), random access memory (RAM), a combination of the two or any type of device that may store information, provides instructions 865a and data 867a to the processor 863. A portion of the memory 869 may also include non-volatile random access memory (NVRAM). Instructions 865b and data 867b may also reside in the processor 863. Instructions 865b and/or data 867b loaded into the processor 863 may also include instructions 865a and/or data 867a from memory 869 that were loaded for execution or processing by the processor 863. The instructions 865b may be executed by the processor 863 to implement the method 200 described above.

The UE 802 may also include a housing that contains one or more transmitters 858 and one or more receivers 820 to allow transmission and reception of data. The transmitter(s) 858 and receiver(s) 820 may be combined into one or more transceivers 818. One or more antennas 822a-n are attached to the housing and electrically coupled to the transceiver 818.

The various components of the UE 802 are coupled together by a bus system 871, which may include a power bus, a control signal bus and a status signal bus, in addition to a data bus. However, for the sake of clarity, the various buses are illustrated in FIG. 8 as the bus system 871. The UE 802 may also include a digital signal processor (DSP) 873 for use in processing signals. The UE 802 may also include a communications interface 875 that provides user access to the functions of the UE 802. The UE 802 illustrated in FIG. 8 is a functional block diagram rather than a listing of specific components.

Figure 9:
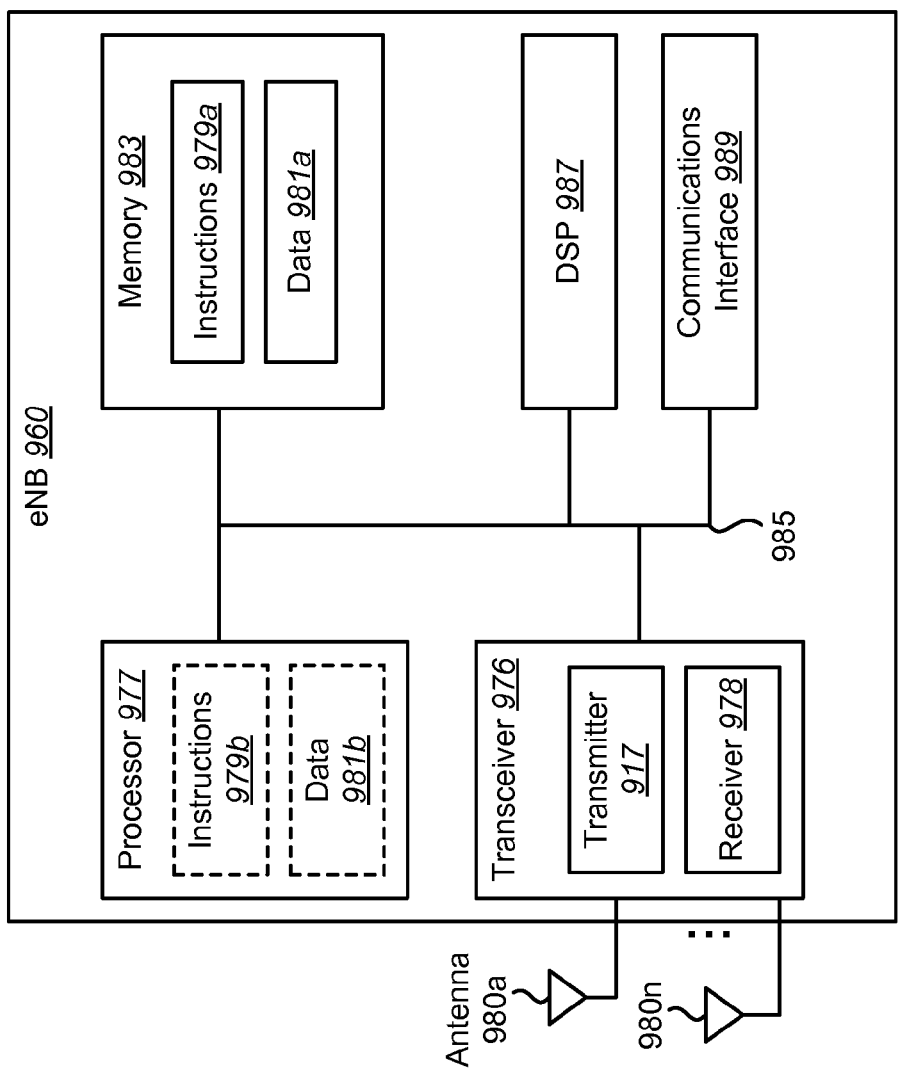
FIG. 9 illustrates various components that may be utilized in an eNB.

FIG. 9 illustrates various components that may be utilized in an eNB 960. The eNB 960 described in connection with FIG. 9 may be implemented in accordance with the eNB 160 described in connection with FIG. 1. The eNB 960 includes a processor 977 that controls operation of the eNB 960. The processor 977 may also be referred to as a central processing unit (CPU). Memory 983, which may include read-only memory (ROM), random access memory (RAM), a combination of the two or any type of device that may store information, provides instructions 979a and data 981a to the processor 977. A portion of the memory 983 may also include non-volatile random access memory (NVRAM). Instructions 979b and data 981b may also reside in the processor 977. Instructions 979b and/or data 981b loaded into the processor 977 may also include instructions 979a and/or data 981a from memory 983 that were loaded for execution or processing by the processor 977. The instructions 979b may be executed by the processor 977 to implement the method 300 described above.

The eNB 960 may also include a housing that contains one or more transmitters 917 and one or more receivers 978 to allow transmission and reception of data. The transmitter(s) 917 and receiver(s) 978 may be combined into one or more transceivers 976. One or more antennas 980a-n are attached to the housing and electrically coupled to the transceiver 976.

The various components of the eNB 960 are coupled together by a bus system 985, which may include a power bus, a control signal bus and a status signal bus, in addition to a data bus. However, for the sake of clarity, the various buses are illustrated in FIG. 9 as the bus system 985. The eNB 960 may also include a digital signal processor (DSP) 987 for use in processing signals. The eNB 960 may also include a communications interface 989 that provides user access to the functions of the eNB 960. The eNB 960 illustrated in FIG. 9 is a functional block diagram rather than a listing of specific components.

Figure 10:
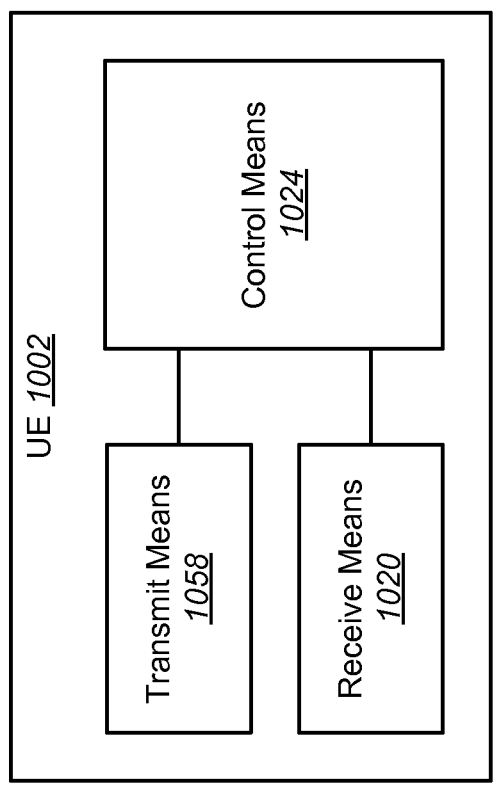
FIG. 10 is a block diagram illustrating one configuration of a UE in which systems and methods for sending feedback information may be implemented.

FIG. 10 is a block diagram illustrating one configuration of a UE 1002 in which systems and methods for sending feedback information may be implemented. The UE 1002 includes transmit means 1058, receive means 1020 and control means 1024. The transmit means 1058, receive means 1020 and control means 1024 may be configured to perform one or more of the functions described in connection with FIG. 2 and FIG. 8 above. FIG. 8 above illustrates one example of a concrete apparatus structure of FIG. 10. Other various structures may be implemented to realize one or more of the functions of FIG. 2 and FIG. 8. For example, a DSP may be realized by software.

Figure 11:
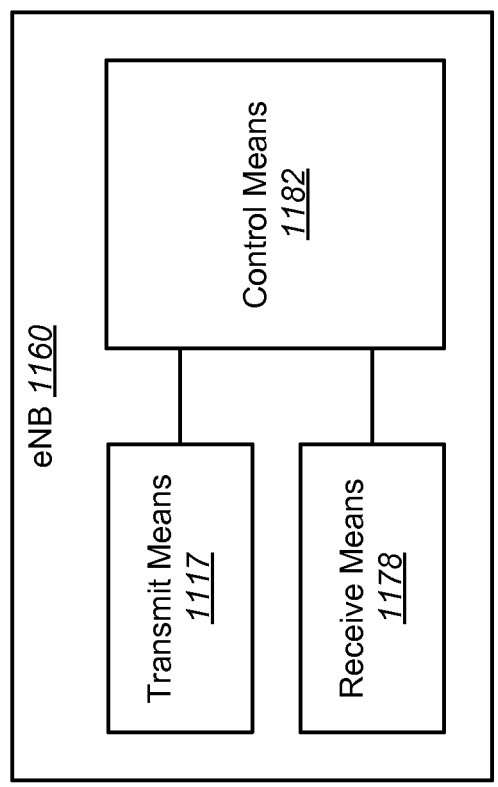
FIG. 11 is a block diagram illustrating one configuration of an eNB in which systems and methods for receiving feedback information may be implemented.

FIG. 11 is a block diagram illustrating one configuration of an eNB 1160 in which systems and methods for receiving feedback information may be implemented. The eNB 1160 includes transmit means 1117, receive means 1178 and control means 1182. The transmit means 1117, receive means 1178 and control means 1182 may be configured to perform one or more of the functions described in connection with FIG. 3 FIG. 9 above. FIG. 9 above illustrates one example of a concrete apparatus structure of FIG. 11. Other various structures may be implemented to realize one or more of the functions of FIG. 3 and FIG. 9. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A User Equipment for sending information to an evolved Node B (eNB), comprising:
    an operator configured to set a Time-Division Duplex (TDD) uplink-downlink (UL-DL) configuration of a primary cell (PCell) and a TDD UL-DL configuration of a secondary cell (SCell) which are signaled by the eNB, wherein the TDD UL-DL configuration of the PCell and the TDD UL-DL configuration of the SCell are not same; and
    a transmitter configured to transmit Hybrid Automatic Repeat Request Acknowledgement/Negative Acknowledgement information on a Physical Uplink Control Channel (PUCCH) Format 1b with channel selection based on whether TDD UL-DL configuration 5 is not utilized as a reference configuration of the SCell; wherein
    the PUCCH Format 1b with the channel selection is not supported in a case where the TDD UL-DL configuration 5 is utilized as the reference configuration of the SCell;
    the PUCCH Format 1b with the channel selection is supported in a case where: (a) two serving cells are configured, and (b) the TDD UL-DL configuration 5 is not utilized as the reference configuration of the SCell; and
    the reference configuration of the SCell is determined based on the TDD UL-DL configuration of the PCell and the TDD UL-DL configuration of the SCell.

2. An evolved Node B (eNB) for receiving information from a User Equipment, the eNB comprising:
    an operator configured to determine a Time-Division Duplex (TDD) uplink-downlink (UL-DL) configuration of a primary cell (PCell) and to determine a TDD UL-DL configuration of a secondary cell (SCell) which are signaled by the eNB, wherein the TDD UL-DL configuration of the PCell and the TDD UL-DL configuration of the SCell are not same; and
    a receiver configured to receive Hybrid Automatic Repeat Request Acknowledgement/Negative Acknowledgement information on a Physical Uplink Control Channel (PUCCH) Format 1b with channel selection based on whether TDD UL-DL configuration 5 is not utilized as a reference configuration of the SCell; wherein
    the PUCCH Format 1b with the channel selection is not supported in a case where the TDD UL-DL configuration 5 is utilized as the reference configuration of the SCell;
    the PUCCH Format 1b with the channel selection is supported in a case where: (a) two serving cells are configured and (b) the TDD UL-DL configuration 5 is not utilized as the reference configuration of the SCell; and
    the reference configuration of the SCell is determined based on the TDD UL-DL configuration of the PCell and the TDD UL-DL configuration of the SCell.

3. A method for sending information with a User Equipment, the method comprising:
    setting a Time-Division Duplex (TDD) uplink-downlink (UL-DL) configuration of a primary cell (PCell) and a TDD UL-DL configuration of a secondary cell (SCell) which are signaled by an evolved Node B (eNB), wherein the TDD UL-DL configuration of the PCell and the TDD UL-DL configuration of the SCell are not same; and
    transmitting Hybrid Automatic Repeat Request Acknowledgement/Negative Acknowledgement information on a Physical Uplink Control Channel (PUCCH) Format 1b with channel selection based on whether TDD UL-DL configuration 5 is not utilized as a reference configuration of the SCell; wherein
    the PUCCH Format 1b with the channel selection is not supported in a case where the TDD UL-DL configuration 5 is utilized as the reference configuration of the SCell;
    the PUCCH Format 1b with the channel selection is supported in a case where: (a) two serving cells are configured, and (b) the TDD UL-DL configuration 5 is not utilized as the reference configuration of the SCell; and
    the reference configuration of the SCell is determined based on the TDD UL-DL configuration of the PCell and the TDD UL-DL configuration of the SCell.

4. A method for receiving information with an evolved Node B (eNB), the method comprising:
    determining a Time-Division Duplex (TDD) uplink-downlink (UL-DL) configuration of a primary cell (PCell) and to determine a TDD UL-DL configuration of a secondary cell (SCell) which are signaled by the eNB, wherein the TDD UL-DL configuration of the PCell and the TDD UL-DL configuration of the SCell are not same; and
    receiving Hybrid Automatic Repeat Request Acknowledgement/Negative Acknowledgement information on a Physical Uplink Control Channel (PUCCH) Format 1b with channel selection based on whether TDD UL-DL configuration 5 is not utilized as a reference configuration of the SCell; wherein
    the PUCCH Format 1b with the channel selection is not supported in a case where the TDD UL-DL configuration 5 is utilized as the reference configuration of the SCell;
    the PUCCH Format 1b with the channel selection is supported in a case where: (a) two serving cells are configured, and (b) the TDD UL-DL configuration 5 is not utilized as the reference configuration of the SCell; and
    the reference configuration of the SCell is determined based on the TDD UL-DL configuration of the PCell and the TDD UL-DL configuration of the SCell.

* * * * *